United States Patent
Boyle et al.

(10) Patent No.: US 7,488,038 B2
(45) Date of Patent: Feb. 10, 2009

(54) PORTABLE RESTRAINT SYSTEM FOR A VEHICLE

(75) Inventors: Donald C. Boyle, Indianapolis, IN (US); Julia D. King, Zionsville, IN (US); Thomas Mashino, Kokomo, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 98 days.

(21) Appl. No.: 11/424,031

(22) Filed: Jun. 14, 2006

(65) Prior Publication Data

US 2007/0001495 A1    Jan. 4, 2007

Related U.S. Application Data

(63) Continuation-in-part of application No. 10/574,519, filed on Apr. 3, 2006, now Pat. No. 7,347,494.

(60) Provisional application No. 60/715,295, filed on Sep. 8, 2005, provisional application No. 60/695,192, filed on Jun. 29, 2005.

(51) Int. Cl.
*A47D 1/10* (2006.01)
*A47D 15/00* (2006.01)

(52) U.S. Cl. ............... 297/255; 297/254; 297/484; 297/250.1

(58) Field of Classification Search ............. 297/253, 297/484, 406, 250.1, 254, 255
See application file for complete search history.

(56) References Cited

U.S. PATENT DOCUMENTS

| | | | |
|---|---|---|---|
| 3,158,399 A * | 11/1964 | Pragnell | 297/484 |
| 3,325,213 A * | 6/1967 | Levy | 297/467 |
| 3,954,234 A | 5/1976 | Frost et al. | |
| 3,954,280 A * | 5/1976 | Roberts et al. | 280/801.2 |
| 3,992,028 A | 11/1976 | Abe et al. | |
| 4,099,770 A * | 7/1978 | Elsholz et al. | 297/216.11 |
| 4,362,334 A | 12/1982 | Ross et al. | |
| 4,411,473 A | 10/1983 | Ettridge | |
| 4,488,691 A | 12/1984 | Lorch | |
| 4,660,889 A | 4/1987 | Anthony et al. | |
| 4,679,852 A | 7/1987 | Anthony et al. | |
| 4,927,211 A | 5/1990 | Bolcerek | |
| 5,121,965 A | 6/1992 | Skold et al. | |
| 5,299,855 A * | 4/1994 | Zubeck | 297/485 |

(Continued)

FOREIGN PATENT DOCUMENTS

EP    650872 A1    5/1995

OTHER PUBLICATIONS

Century Safe-T-Rider Information Sheet, 1998 SafetyBeltSafe U.S.A. 1-98, p. 42.

(Continued)

*Primary Examiner*—Sarah B McPartlin
(74) *Attorney, Agent, or Firm*—Woodard, Emhardt, Moriarty, McNett & Henry LLP

(57) ABSTRACT

A portable restraint system mountable to a vehicle seat may comprise a booster seat, a restraint harness mounted to the booster seat and a mounting harness coupled to the restraint harness. The restraint harness may be configured to restrain a passenger positioned on the booster seat. The mounting harness may have a connector attached thereto configured to releasably engage an anchorage of the vehicle.

17 Claims, 47 Drawing Sheets

U.S. PATENT DOCUMENTS

| | | | |
|---|---|---|---|
| D353,947 S | 1/1995 | Gain | |
| 5,630,645 A | 5/1997 | Lumley et al. | |
| 5,641,200 A | 6/1997 | Howell | |
| 5,678,887 A | 10/1997 | Sher | |
| 5,685,604 A | 11/1997 | Kain | |
| 5,797,654 A | 8/1998 | Stroud | |
| 5,829,834 A | 11/1998 | Silverman | |
| 5,839,793 A | 11/1998 | Merrick et al. | |
| 5,845,967 A | 12/1998 | Kane et al. | |
| 5,873,635 A | 2/1999 | Merrick | |
| 5,915,787 A | 6/1999 | Brookman | |
| 6,045,183 A * | 4/2000 | Weber | 297/250.1 |
| 6,089,662 A | 7/2000 | Lambert et al. | |
| 6,220,662 B1 | 4/2001 | Franco-Vila et al. | |
| 6,254,184 B1 | 7/2001 | Kontos | |
| 6,293,588 B1 * | 9/2001 | Clune | 280/808 |
| 6,322,143 B2 | 11/2001 | Kassai et al. | |
| 6,450,576 B1 | 9/2002 | Rhein et al. | |
| 6,481,800 B2 | 11/2002 | Duncan | |
| 6,485,098 B1 | 11/2002 | Vits et al. | |
| 6,499,786 B2 | 12/2002 | Takahashi | |
| 6,554,357 B2 * | 4/2003 | Moffa | 297/253 |
| 6,601,804 B2 | 8/2003 | Bisch | |
| 6,601,917 B1 | 8/2003 | Christopherson | |
| 6,616,242 B1 * | 9/2003 | Stoll | 297/485 |
| 6,869,141 B2 * | 3/2005 | Yamaoka et al. | 297/253 |
| 6,886,889 B2 | 5/2005 | Vits et al. | |
| 6,955,403 B1 | 10/2005 | Weaver | |
| 6,962,394 B2 | 11/2005 | Anthony et al. | |
| 2002/0017808 A1 * | 2/2002 | Kain | 297/250.1 |
| 2002/0109381 A1 | 8/2002 | Duncan | |
| 2003/0155797 A1 * | 8/2003 | Amirault et al. | 297/250.1 |
| 2003/0197415 A1 | 10/2003 | Dingman | |
| 2004/0007910 A1 | 1/2004 | Skelly | |
| 2004/0084940 A1 * | 5/2004 | Morita | 297/253 |
| 2005/0168026 A1 | 8/2005 | Kau | |

OTHER PUBLICATIONS

Cosco Travel Vest Information Sheet, 1998 SafetyBeltSafe U.S.A. 1-98, p. 56.
Strolee #601, 604 Information Sheet, 1998 SafetyBeltSafe U.S.A. 1-98, p. 186.
Strolee #602 Information Sheet, 1998 SafetyBeltSafe U.S.A. 1-98, p. 187.
Cosco Travel Hi-Lo Information Sheet, 1998 SafetyBeltSafe U.S.A. 1-98, p. 76.
Kolcraft Tot-Rider Information Sheet, 1998 SafetyBeltSafe U.S.A. 1-98, p. 164.
Kolcraft Tot-Rider XL Information Sheet, 1998 SafetyBeltSafe U.S.A. 1-98, p. 165.
International Astrorider Information Sheet, 1998 SafetyBeltSafe U.S.A. 1-98, p. 140.
Boosters With Tethered Harness Information Sheet, 1998 SafetyBeltSafe U.S.A. 1-98, p. 20.

* cited by examiner

PORTABLE RESTRAINT SYSTEM FOR A VEHICLE

CROSS-REFERENCE TO RELATED U.S. PATENT APPLICATIONS

This patent application claims priority to, and the benefit of, provisional patent application Ser. No. 60/695,192, filed Jun. 29, 2005, and provisional patent application Ser. No. 60/715,295, filed Sep. 8, 2005, the disclosures of which are both incorporated herein by reference, and is a continuation-in-part of U.S. patent application Ser. No. 10/574,519, filed Apr. 3, 2006 7,347,494.

FIELD OF THE INVENTION

This disclosure relates generally to passenger restraint systems for use in vehicles, and more particularly, to portable, add-on restraint systems.

BACKGROUND

Conventional vehicle restraint or seat belt systems combining a lap belt and an upper torso or shoulder belt to restrain an occupant or passenger in a vehicle are well known. These three-point restraint systems integral to the vehicle are usually used with seats offering rigid support for the belts. As typically used in a vehicle, the three-point restraint system consists of a single belt having its opposite ends mounted to a pair of retractors with a seat belt tongue connected to the belt intermediate to the belt ends. The tongue may be swung across the person and engaged with a buckle affixed to the seat thereby positioning one portion of the belt across the lap and another portion of the belt across the upper torso. In some systems, only one end of the belt is mounted to a retractor while the other end is anchored to the seat or vehicle. These seat belt systems are active restraint devices, generally requiring a passenger to positively engage the restraints about the person for them to be effective.

Vehicles, such as buses, which require the passive protection provided by deforming or deflecting seats, present certain challenges regarding the integration of active restraint seat belt systems. In a school bus seat combining active and passive restraint systems, both of the restraint systems may need to be able to perform their functions and the seat may still need to conform to the regulations set forth in FMVSS 222, which is incorporated herein by reference. In addition to two-point active lap restraint systems, examples of vehicle seats designed to combine both active and passive restraint systems in conformity with FMVSS 222 are found in commonly owned U.S. Pat. No. 6,485,098, and U.S. Pat. No. 6,886,889, the disclosures of which are now incorporated herein by reference.

Two or three-point restraint systems may cooperate with various add-on restraint systems, for example, torso harnesses, positioning harnesses, portable child seats and booster seats, for use on buses and other vehicles. For example, portable seats for children up to about 100 pounds may be mounted to a vehicle for restraint of a passenger or occupant. Commonly owned U.S. patent application Ser. No. 10/245,983 discloses supplemental restraint systems for use with a school bus seat in accordance with FMVSS 222. Examples of booster seats are disclosed in U.S. Pat. No. 5,797,654 to Stroud, U.S. Pat. No. 5,829,834 to Silverman, and U.S. Pat. No. 5,685,604 to Kain, which are incorporated by reference herein.

These add-on child restraint systems may be coupled to a vehicle seat using various connectors and anchorage systems. The federal government has mandated that child restraint anchorage systems be installed in most vehicles, including cars, trucks, vans, sports utility vehicles (SUVs) and certain school buses. These regulations, codified at 49 C.F.R. § 571.225 (FMVSS 225), incorporated herein by reference, require two lower anchorages and an upper tether anchorage of specified configuration, location and strength parameters. Similarly, 49 C.F.R. § 571.213 (FMVSS 213), incorporated herein by reference, specifies the dimensions of tether hooks used to attach a tether strap to a tether anchorage.

SUMMARY

The present invention may comprise one or more of the features recited in the attached claims, and/or one or more of the following features and combinations thereof.

An add-on restraint system or restraining device may be mounted to the vehicle seat of any of a number of vehicles including, but not limited to, cars, school buses, tour buses, vans, SUVs, recreational vehicles (RVs), air planes, watercraft, and other vehicles or modes of conveyance.

A mounting system for securing a booster seat to a vehicle seat may comprise a first web coupled to the booster seat, at least one connector attached to the first web, a locking web adjuster mounted to the booster seat, and a second web attached to the first web and extending through the locking web adjuster. The at least one connector may be configured to releasably engage a first anchorage of the vehicle seat. The second web may be configured to be drawn through the locking web adjuster to remove slack in the first web after the at least one connector engages the fist anchorage. The locking web adjuster may be lockable to secure the second web thereto.

The mounting system may further comprise a multiple-point restraint harness mounted to the booster seat and configured to restrain a passenger positioned on the booster seat.

The mounting system may further comprise a mounting harness coupled to the multiple-point restraint harness. The mounting harness may have at least one connector attached thereto and configured to releasably engage with an anchorage of the vehicle. The anchorage of the vehicle may comprise a second anchorage of the vehicle seat. The multiple-point restraint harness may be a five-point restraint harness.

The mounting system may further comprise a cover configured to extend at least partially about at least a portion of the multiple-point restraint harness.

The mounting system may further comprise a head rest member having one end configured to be received within the cover and an opposite end defining first and second head rest protrusions each extending from opposite sides of the head rest member. The head rest member may be configured to receive at least a portion of the passenger's head between the first and second head rest protrusions. The head rest member may be adjustably positionable relative to the cover. Alternatively, the head rest member may be configured to be coupled to the restraint harness. The head rest member may be adjustably positionable relative to the restraint harness.

The restraint harness may be removably mounted to the booster seat.

The mounting system may further comprise a restraint harness coupled to the vehicle seat and configured to extend about and restrain a passenger positioned on the booster seat. The restraint harness may be a three-point restraint harness comprising a shoulder portion and a lap portion.

The mounting system may further comprise first and second arm rests extending from the booster seat adjacent opposite sides thereof. The first and second arm rests may be configured to allow the lap portion of the three-point restraint harness to extend about the passenger between each of the first and second arm rests and the booster seat.

The mounting system may further comprise an auxiliary harness having one end mounted to the booster seat and an opposite end, and an engagement member mounted to the opposite end of the auxiliary harness. The engagement member may be configured to engage the lap portion of the three-point restraint harness. The three-point restraint harness and the auxiliary harness may cooperatively define a four-point restraint harness.

The mounting system may further comprise a height adjustment assembly configured to be coupled to the booster seat and to the shoulder portion of the restraint harness. The height adjustment assembly may be configured to adjust a location, relative to an occupant of the booster seat, that the shoulder web engages the occupant. The height adjustment assembly may include a third web, a web clamp coupled to one end of the third web and configured to be selectively secured to the shoulder portion along its length, and a connector coupled to an opposite end of the third web and configured to engage with the booster seat. The height adjustment assembly may further include a web length adjuster configured to adjust a length of the third web.

The first web may have a first length. The mounting system may further comprise an elastic web coupled to the first web. The elastic web may normally bias the first web to a second length shorter than the first length. The elastic web may be extendable under tension applied between opposing ends of the first web to allow the first web to assume lengths between the first and second lengths. The booster seat may define at least one connector storage port configured to receive the at least one connector. The first web may draw, under bias of the elastic web, the at least one connector into the at least one connector storage port when the at least one connector is not engaged with the anchorage of the vehicle seat. The elastic web may bias the first web to a length shorter than the first length when the at least one connector is engaged with the anchorage of the vehicle seat. The slack in the first web may result from the first web being biased by the elastic web to the length shorter than the first length.

The at least one connector may include a first connector attached to one end of the first web and configured to releasably engage a first anchorage of the vehicle seat, and a second connector attached to an opposite end of the first web and configured to releasably engage a second anchorage of the vehicle seat. The booster seat may define a first connector port adjacent one side thereof and a second connector storage port adjacent an opposite side thereof. The first and second connector ports may be configured to receive the first and second connectors respectively. The first web may draw, under bias of the elastic web, the first and second connectors into the first and second connector storage ports respectively when the first and second connectors are not engaged with the first and second anchorages respectively of the vehicle seat. The elastic web may bias the first web to a length shorter than the first length when the first connector is engaged with the first anchorage of the vehicle seat and the second connector is engaged with the second anchorage of the vehicle seat. The second web may remove the slack in the first web, resulting from the first web being biased by the elastic web to the length shorter than the first length, when the second web is drawn through the locking web adjuster.

The locking web adjuster may comprise a web locking member having a biased position relative to the locking web adjuster that normally secures the second web to the locking web adjuster, the web locking member movable away from the biased position to allow movement of the second web through the locking web adjuster.

The mounting system may further comprise a seat cover mounted to the booster seat.

The mounting system may further comprise first and second armrest covers configured to be mounted to the first and second armrests respectively.

The mounting system may further comprise a cup holder mounted to the booster seat.

The mounting system may further comprise a carrying bag sized to receive the booster seat therein when not secured to the vehicle seat. At least one carrying strap may be mounted to the carrying bag.

The mounting system may further comprise a web length adjuster having the first web extending therethrough so that the first web is adjustable in length. The web length adjuster may be positioned between the booster seat and the at least one connector.

The at least one connector may comprise a first connector attached to one end of the first web and configured to releasably engage a first anchorage of the vehicle seat, and a second connector attached to an opposite end of the first web and configured to releasably engage a second anchorage of the vehicle seat. The mounting system may further include a web length adjuster having the first web extending therethrough so that the first web is adjustable in length. The web length adjuster may be positioned between the booster seat and one of the first and second connectors. The mounting system may further include first and second web length adjusters having the first web extending therethrough so that the first web is adjustable in length. The first web length adjuster may be positioned between the booster seat and the first connector and the second web length adjuster positioned between the booster seat and the second connector.

The first web may be a fixed-length web having one end secured to the booster seat and an opposite end. The at least one connector may comprise a first connector mounted to the opposite end of the first web. The one end of the first web may be secured to one side of the booster seat. The system may further include a second fixed-length web having one end secured to an opposite side of the booster seat and an opposite end, and a second connector mounted to the opposite end of the second web, the second connector configured to releasably engage a second anchorage of the vehicle seat.

A portable restraint system mountable to a vehicle seat may comprise a booster seat, a locking web adjuster mounted to the booster seat, and a mounting assembly configured to secure the booster seat to the vehicle seat. The mounting assembly may comprise a first web coupled to the booster seat. The first web may have at least one connector attached thereto and configured to releasably engage a first anchorage of the vehicle seat. A second web may be attached to the first web and it may extend through the locking web adjuster. The second web may be configured to be drawn through the locking web adjuster to remove slack in the first web after the at least one connector engages the anchorage. The locking web adjuster may be configured to secure the second web thereto.

The restraint system may further comprise a multiple-point restraint harness mounted to the booster seat and configured to restrain a passenger positioned on the booster seat.

The restraint system may further comprise a mounting harness coupled to the multiple-point restraint harness. The mounting harness may have at least one connector attached thereto and configured to releasably engage an anchorage of the vehicle. The anchorage of the vehicle may comprise a second anchorage of the vehicle seat. The multiple-point restraint harness may be a five-point restraint harness.

The multiple-point restraint harness may be removably mounted to the booster seat.

The restraint system may further comprise a restraint harness coupled to the vehicle seat and configured to extend about and restrain a passenger positioned on the booster seat. The restraint harness may be a three-point restraint harness comprising a shoulder portion and a lap portion.

The restraint system may further comprise first and second arm rests extending from the booster seat adjacent opposite sides thereof. The first and second arm rests may be configured to allow the lap portion of the three-point restraint harness to extend about the passenger between each of the first and second arm rests and the booster seat.

The restraint system may further comprise an auxiliary harness having one end mounted to the booster seat and an opposite end, and an engagement member mounted to the opposite end of the auxiliary harness. The engagement member may be configured to engage the lap portion of the three-point restraint harness. The three-point restraint harness and the auxiliary harness may cooperatively define a four-point restraint harness.

The first web may have a first length. The restraint system may further including an elastic web coupled to the first web. The elastic web may normally bias the first web to a second length shorter than the first length. The elastic web may be extendable under tension applied between opposing ends of the first web to allow the first web to assume lengths between the first and second lengths. The booster seat may define at least one connector storage port configured to receive the at least one connector. The first web may draw, under bias of the elastic web, the at least one connector into the at least one connector storage port when the at least one connector is not engaged with the anchorage of the vehicle seat. The elastic web may bias the first web to a length shorter than the first length when the at least one connector is engaged with the anchorage of the vehicle seat. The slack in the first web may result from the first web being biased by the elastic web to the length shorter than the first length.

The at least one connector may include a first connector attached to one end of the first web and configured to releasably engage a first anchorage of the vehicle seat, and a second connector attached to an opposite end of the first web and configured to releasably engage a second anchorage of the vehicle seat. The booster seat may define a first connector port adjacent one side thereof and a second connector storage port adjacent an opposite side thereof. The first and second connector ports may be configured to receive the first and second connectors respectively. The first web may draw, under bias of the elastic web, the first and second connectors into the first and second connector storage ports respectively when the first and second connectors are not engaged with the first and second anchorages respectively of the vehicle seat. The elastic web may bias the first web to a length shorter than the first length when the first connector is engaged with the first anchorage of the vehicle seat and the second connector is engaged with the second anchorage of the vehicle seat. The second web may remove the slack in the first web, resulting from the first web being biased by the elastic web to the length shorter than the first length, when the second web is drawn through the locking web adjuster.

A portable restraint system mountable to a vehicle seat may comprise a booster seat, and a carrying bag configured to receive the booster seat therein. The carrying bag may have at least one carrying strap mounted thereto.

The portable restraint system may further comprise a multiple-point restraint harness mounted to the booster seat and configured to restrain a passenger positioned on the booster seat. The carrying bag may be configured to receive a combination of the booster seat and the multiple-point restraint harness therein.

The portable restraint system may further comprise a multiple-point restraint harness mounted to the booster seat and configured to restrain a passenger positioned on the booster seat, and a mounting harness coupled to the multiple-point restraint harness. The mounting harness may have at least one connector attached thereto and configured to releasably engage an anchorage of the vehicle. The carrying bag may be configured to receive a combination of the booster seat, the multiple-point restraint harness and the mounting harness therein.

The portable restraint system may further comprise a multiple-point restraint harness mounted to the booster seat and configured to restrain a passenger positioned on the booster seat, and a cover extending at least partially about at least a portion of the multiple-point restraint harness. The carrying bag may be configured to receive a combination of the booster seat, the multiple-point restraint harness and the cover therein.

The portable restraint system may further comprise a multiple-point restraint harness mounted to the booster seat and configured to restrain a passenger positioned on the booster seat, a cover extending at least partially about at least a portion of the multiple-point restraint harness, and a mounting harness coupled to the multiple-point restraint harness, the mounting harness having at least one connector attached thereto and configured to releasably engage an anchorage of the vehicle. The carrying bag may be configured to receive a combination of the booster seat, the multiple-point restraint harness, the cover and the mounting harness therein.

The portable restraint system may further comprise a multiple-point restraint harness mounted to the booster seat and configured to restrain a passenger positioned on the booster seat, a mounting harness coupled to the multiple-point restraint harness, the mounting harness having at least one connector attached thereto and configured to releasably engage an anchorage of the vehicle, a cover extending at least partially about at least a portion of the multiple-point restraint harness, and a head rest member having one end configured to be received within the cover, or configured to be coupled to the restraint harness, and an opposite end defining first and second head rest protrusions each extending from opposite sides of the head rest member. The carrying bag may be configured to receive a combination of the booster seat, the multiple-point restraint harness, the cover, the mounting harness and the head rest member therein. The portable restraint system may further include first and second arm rests extending from the booster seat adjacent opposite sides thereof.

The carrying bag, with the combination of the booster seat, the multiple-point restraint harness, the cover, the mounting harness and the head rest member received therein, may sized to be stowed under a passenger seat of a commercial air craft. Alternatively or additionally, the carrying bag, with the combination of the booster seat, the multiple-point restraint harness, the cover, the mounting harness and the head rest member received therein, may be sized to be stowed in an overhead storage compartment of a commercial air craft.

The first and second arm rests may extend outside of the carrying bag when the booster seat is received within the carrying bag.

The carrying bag may further include means for securely closing the carrying bag with the combination of the booster seat, the multiple-point restraint harness, the cover, the mounting harness and the head rest member received therein.

The at least one carrying strap may be sized to extend over a shoulder of a person transporting the carrying bag. Alternatively or additionally, the at least one carrying strap may include first and second carrying straps sized to extend over opposite shoulders of a person transporting the carrying bag. Alternatively or additionally, the at least one carrying strap may comprise a carrying handle.

A portable restraint system mountable to a vehicle seat may comprise a booster seat, a restraint harness mounted to the booster seat, and a mounting harness coupled to the restraint harness. The restraint harness may be configured to restrain a passenger positioned on the booster seat. The mounting harness may have a connector attached thereto configured to releasably engage an anchorage of the vehicle.

The vehicle seat may have a seat bottom and a seat back, and the seat back may define a front surface and an opposite rear surface. The anchorage of the vehicle may be mounted to the vehicle seat and positioned on the rear surface of the seat back. The mounting harness may extend over the seat back and along the rear surface to the anchorage. Alternatively, the anchorage of the vehicle may be mounted to the seat bottom. The mounting harness may extend over the seat back and along the rear surface. Alternatively, the anchorage of the vehicle may be mounted to the vehicle behind the vehicle seat. For example, the vehicle may have a rear shelf located behind the vehicle seat. The anchorage of the vehicle may be mounted to the rear shelf. As another example, the vehicle may have a rear wall located behind the vehicle seat. The anchorage of the vehicle may alternatively be mounted to the rear wall. As a further example, the vehicle may have a cargo floor located behind the vehicle seat. The anchorage of the vehicle may be mounted to the cargo floor. As still another example, the vehicle may have one of a ceiling and a frame located above the vehicle seat. The anchorage of the vehicle may be mounted to the one of the ceiling and the frame.

The restraint system may further comprise means for securing the booster seat to the vehicle seat.

The restraint harness may be a multiple-point restraint harness. The restraint harness may be removably mounted to the booster seat.

The restraint system may further comprise another restraint harness coupled to the vehicle seat and configured to extend about and restrain the passenger positioned on the booster seat. The restraint harness may be a three-point restraint harness comprising a shoulder portion and a lap portion. The restraint system may further comprise first and second arm rests extending from the booster seat adjacent opposite sides thereof. The first and second arm rests may be configured to allow the lap portion of the three-point restraint harness to extend about the passenger between each of the first and second arm rests and the booster seat.

The restraint system may further comprise an auxiliary harness having one end mounted to the booster seat and an opposite end, and an engagement member mounted to the opposite end of the auxiliary harness. The engagement member may be configured to engage the lap portion of the three-point restraint harness, the three-point harness and the auxiliary harness cooperatively defining a four-point restraint harness.

The restraint system may further comprise a carrying bag sized to receive the booster seat, restraint harness and mounting harness therein. The restraint system may further include at least one carrying strap mounted to the carrying bag. The restraint system may further include a carrying handle mounted to the carrying bag.

The restraint system may further comprise another restraint harness coupled to the vehicle seat and configured to releasably engage an engagement member mounted to the seat. At least one web may have one end attached to the vehicle seat and an opposite end. The opposite end of the web may be configured to engage the another restraint harness and the engagement member to secure the booster seat to the vehicle seat. The opposite end of the web may define a loop. The loop may be configured to receive the another restraint harness therethrough with the another restraint harness thereafter engaging the engagement member to secure the booster seat to the vehicle seat. The at least one web may comprise two webs each having one end attached to the booster seat and each having an opposite end configured to engage the another restraint harness to secure the booster seat to the vehicle seat.

The restraint system may further comprise a headrest member configured to be coupled to the restraint harness. The headrest member may comprise a first protrusion configured to extend along one side of a head of an occupant of the booster seat and a second protrusion configured to extend along an opposite side of the head of the occupant. The first and second protrusions may be adjustably positionable toward and away from the head of the occupant. The restraint system may further comprise a cushion configured to be coupled to the restraint system and positioned adjacent to the head rest between the first and second protrusions.

A mounting system for securing a booster seat to a vehicle seat may comprise a first web coupled to the booster seat, a first web length adjuster attached to one end of the first web, and a first connector coupled to the first web length adjuster and configured to releasably engage a first anchorage of the vehicle seat.

The booster seat may define opposing sidewalls with a seat surface extending therebetween configured to support an occupant of the booster seat. The vehicle seat may comprise a seat bottom and a seat back defining a bight therebetween. The first anchorage of the vehicle seat may be located in the bight. The first web may extend over and in contact with one of the opposing sidewalls when the first connector engages the first anchorage of the vehicle seat. The seat surface of the booster seat may define a front end and a back end. The booster seat may further comprise opposing arm rests extending from opposite sides thereof adjacent to the back end. The first web may extend over and in contact with one of the opposing sidewalls between the booster seat and one of the opposing arm rests when the first connector engages the first anchorage of the vehicle seat. The booster seat may define a front end and a back end. The booster seat may be configured to be received on the vehicle seat with the back end facing the seat back of the vehicle seat. One of the opposing sidewalls may be sloped downwardly from the back end of the booster seat toward the front end thereof.

An opposite end of the first web may be attached to the booster seat. The opposite end of the first web may extend into the seat surface. The opposite end of the first web may extend through the seat surface to an opposite bottom surface of the booster seat. The mounting system may further include a first web receiving member attached to the opposite end of the first web. The first web receiving member and the booster seat may be configured to disallow passage of the first web receiving member through the booster seat.

The mounting system may further include a second web coupled to the booster seat, a second web length adjuster attached to one end of the second web, and a second connector coupled to the second web length adjuster and configured to releasably engage a second anchorage of the vehicle seat. The booster seat may define opposing sidewalls with a seat surface extending therebetween configured to support an occupant of the booster seat. The first web may extend from the booster seat over one of the opposing sidewalls when the first connector engages the first anchorage of the vehicle seat. The second web may extend from the booster seat over the other one of the opposing sidewalls when the second connector engages the second anchorage of the vehicle seat.

With a booster seat that may comprise opposing sidewalls defining a seat surface therebetween, a first arm rest extending from the booster seat adjacent one of the opposing sidewalls and a second arm rest extending from the booster seat adjacent the other of the opposing sidewalls, a mounting system for securing the booster seat to a vehicle seat may comprise a first web having one end coupled to the booster seat and an opposite end coupled to a first connector configured to releasably engage a first anchorage of the vehicle seat, and a second web having one end coupled to the booster seat and an opposite end coupled to a first connector configured to releasably engage a first anchorage of the vehicle seat. The first web may extend over and in contact with the one of the opposing sidewalls between the first arm rest and one end of the booster seat when the first connector engages the first anchorage. The second web may extend over and in contact with the other of the opposing sidewalls between the second arm rest and the one end of the booster seat when the second connector engages the second anchorage.

The opposing sidewalls may each be downwardly sloped between corresponding ones of first and second arm rests and the one end of the booster seat.

The first and second webs may comprise a single web.

The one end of the first web may be attached to the booster seat and the one end of the second web may be attached to the booster seat. The one end of the first web may extend into the booster seat and the one end of the second web may extend into the booster seat.

The first and second anchorages may be positioned between a seat back and a seat bottom of the vehicle seat.

The mounting system may further include a first web length adjuster attached to the opposite end of the first web and to the first connector, and a second web length adjuster attached to the opposite end of the second web and to the second connector. The first and second web length adjusters may be configured to provide for adjustment of lengths of the first and second webs respectively.

The mounting system may further include a restraint harness configured to attach to the booster seat and to a third anchorage, the restraint harness configured to restrain an occupant of the booster seat.

A mounting system for securing a booster seat to a vehicle seat may comprise a first web coupled to the booster seat and to a first connector. The first connector may be configured to releasably engage a first anchorage of the vehicle seat. The booster seat may define therein a first cavity configured to receive and retain therein the first connector for storage thereof when not otherwise engaged with the first anchorage.

The booster seat may comprise opposing sidewalls with a seat surface extending therebetween configured to support an occupant of the booster seat. The first web may extend over and in contact with one of the opposing sidewalls. One end of the first web may extend into the booster seat and an opposite end of the first web may be coupled to the first connector. The one end of the first web may extend into the seat surface of the booster seat. The booster seat may further comprise a bottom surface opposite the seat surface. The one end of the first web may extend through the seat surface and may be supported by the bottom surface of the booster seat. The booster seat may further comprise a bottom surface opposite the seat surface. The first cavity may be defined in the bottom surface of the booster seat.

The mounting system may further comprise a first web length adjuster attached to the one end of the first web and also to the first connector. The first web length adjuster may be configured to provide for adjustment of a length of the first web.

The mounting system may further include a second web coupled to the booster seat and to a second connector. The second connector may be configured to releasably engage a second anchorage of the vehicle seat. The booster seat may define therein a second cavity configured to receive and retain therein the second connector for storage thereof when not otherwise engaged with the second anchorage. The booster seat may comprise opposing sidewalls with a seat surface extending therebetween configured to support an occupant of the booster seat. The second web may extend over and in contact with one of the opposing sidewalls. One end of the second web may extend into the booster seat and an opposite end of the second web may be coupled to the second connector. The one end of the second web may extend into the seat surface of the booster seat. The booster seat may further comprise a bottom surface opposite the seat surface. The one end of the second web may extend through the seat surface and may be supported by the bottom surface of the booster seat.

The booster seat may further comprise a bottom surface opposite the seat surface. The second cavity may be defined in the bottom surface of the booster seat.

The mounting system may further comprise a second web length adjuster attached to the one end of the second web and also to the second connector. The second web length adjuster may be configured to provide for adjustment of a length of the second web.

The mounting system may further include a multiple-point restraint harness configured to attach to the booster seat and to a second anchorage. The multiple-point restraint harness may be configured to restrain an occupant of the booster seat. The multiple-point restraint harness may be removably attachable to the booster seat.

BRIEF DESCRIPTION OF THE DRAWINGS

FIG. 5A is a partial view showing the connector of FIG. 5 in a stowed position;

DESCRIPTION OF THE ILLUSTRATIVE EMBODIMENTS

Figure 1:
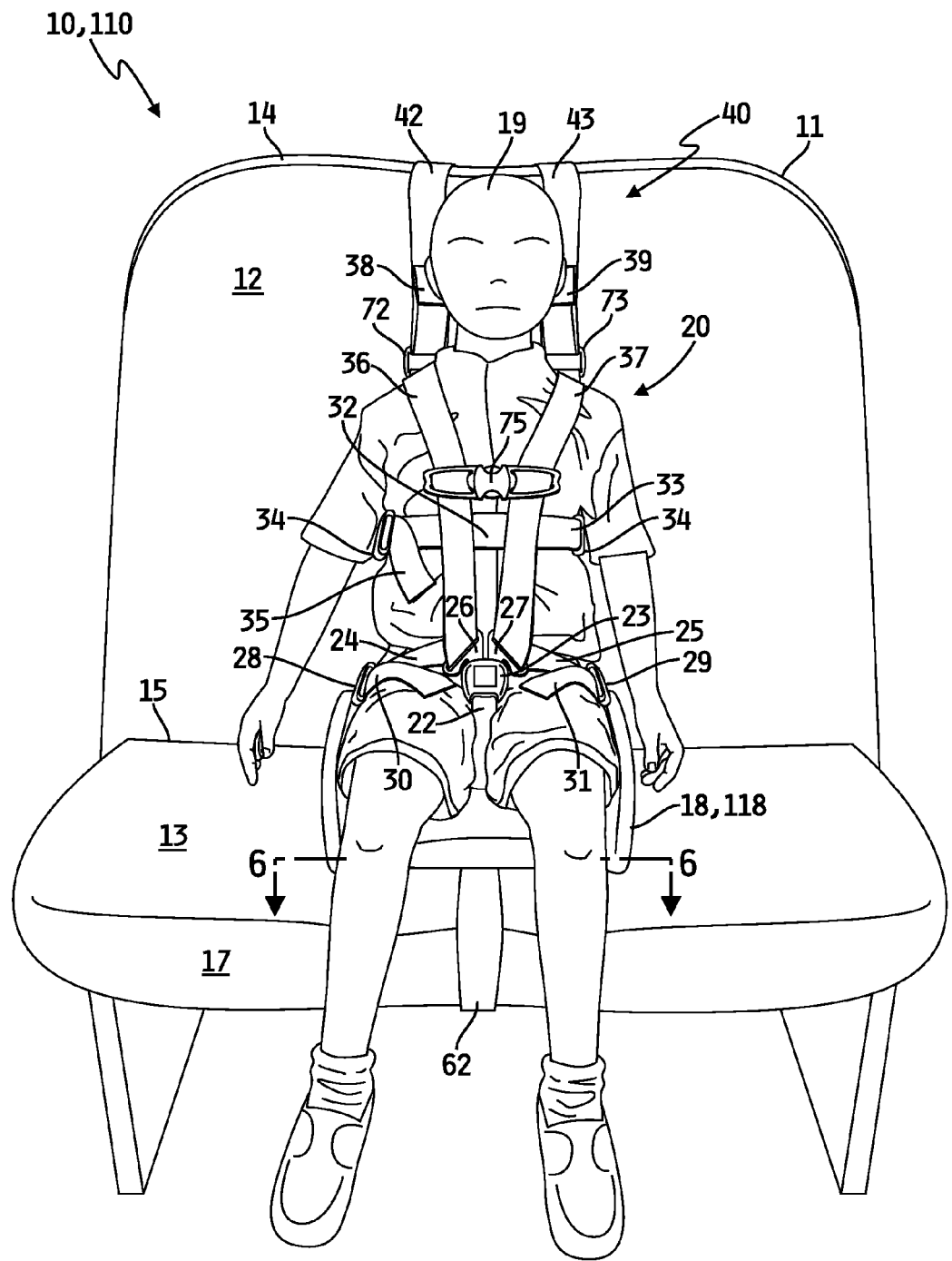
FIG. 1 is a front view of a seat having one exemplary embodiment of an illustrative restraint system mounted thereto.

For the purposes of promoting an understanding of the principles of the invention, reference will now be made to a number of illustrative embodiments shown in the attached drawings and specific language will be used to describe the same.

The drawings depict several illustrative embodiments, which will be described now in detail. Throughout the description and drawings, the same reference numerals are used to refer to identical components in the different embodiments, with the same description of those components applying throughout. In addition, reference numerals incremented by 100 or 200 generally are used to refer to substantially identical components, with the differences between the embodiments described herein. In addition, it will again be appreciated that unless specified otherwise the various components described herein may be made from any suitable non-metallic, metallic, or composite materials, or a combination thereof if desired.

Referring to FIGS. 1-13, illustrative embodiments of the vehicle restraint system are depicted. In the illustrative embodiments, the illustrative restraint systems 10, 110, 210, 310 are configured for use with a vehicle seat 11 comprising a generally vertically extending back portion 12 and a generally horizontally extending seat portion 13. The back portion or seat back 12 and the seat portion 13 converge and meet in an area generally known as the bight 15 of the seat. As used herein below, vehicle seat 11 in FIGS. 1-4 and 8-9 may be any conventional vehicle seat found in for example a bus, a van, a truck, an SUV, an RV, a watercraft, or an aircraft, or, with the exception of the embodiment illustrated in FIG. 9A, one-half or one-third of a two-passenger or three-passenger seat etc. found in any such vehicle.

Figure 2:
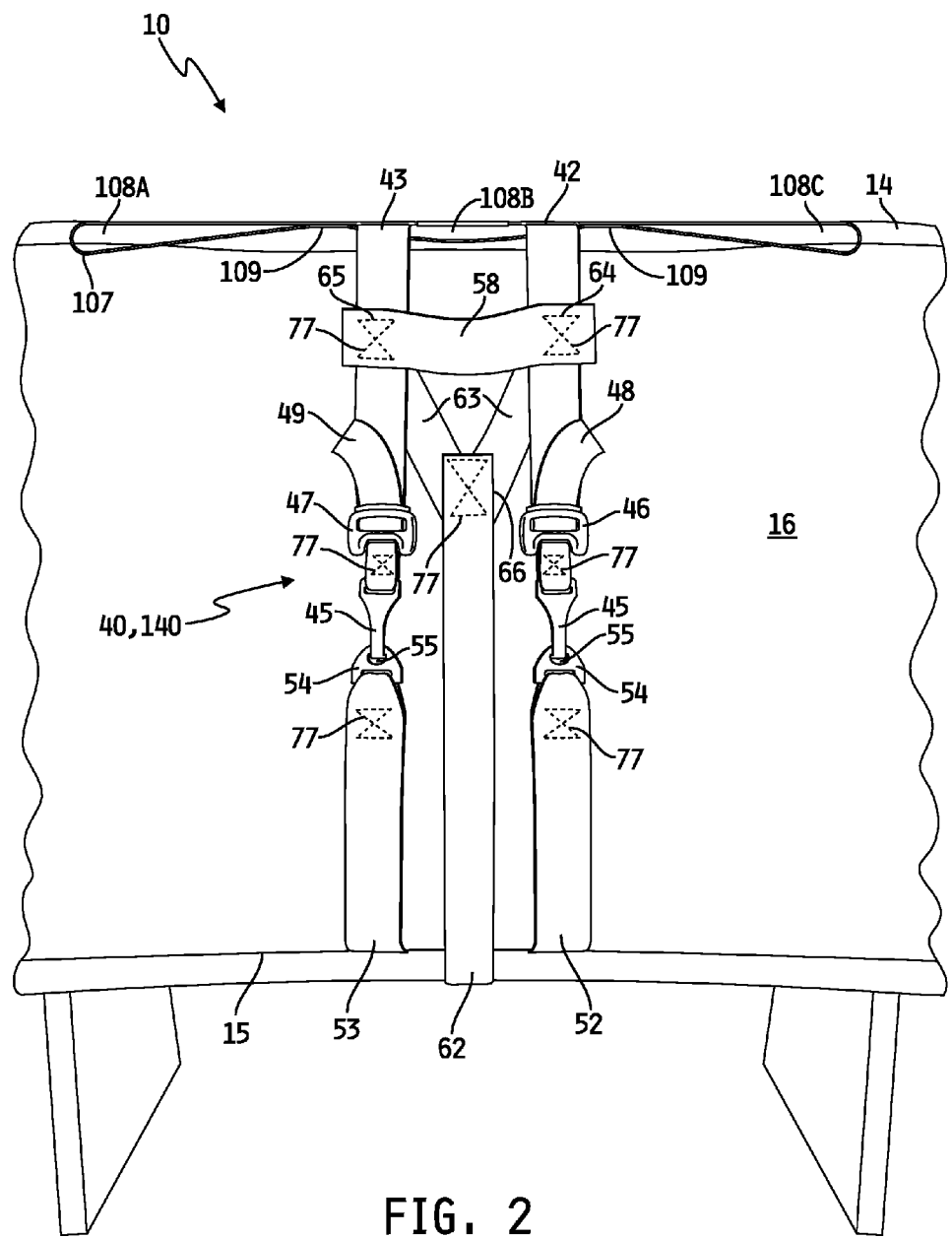
FIG. 2 is a rear view of the seat of FIG. 1 depicting the back of the illustrative restraint system of FIG. 1.
Figure 5:
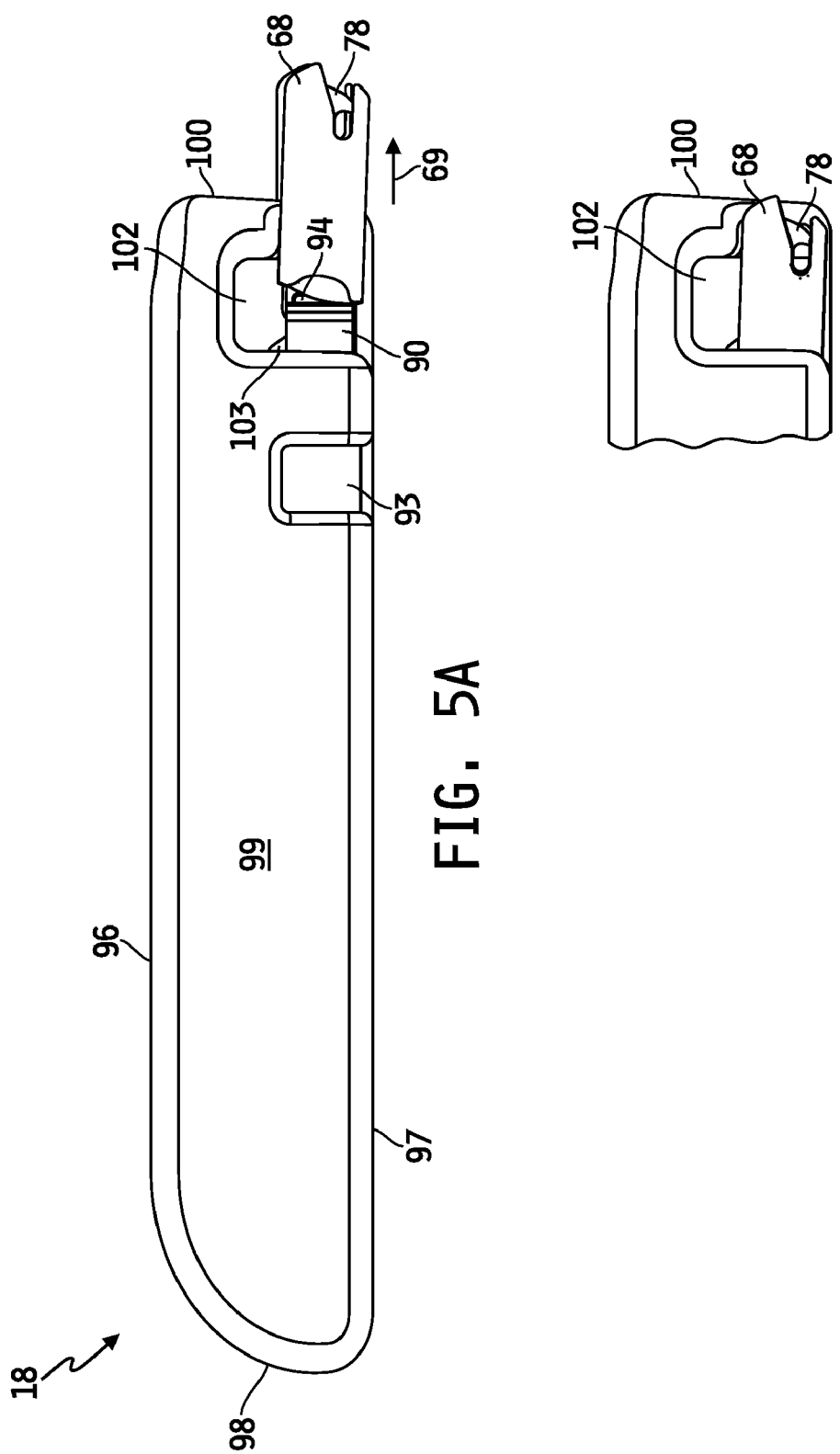
FIG. 5 is a side elevation view of an illustrative seat portion showing a connecter in an extended position.
Figure 9A:
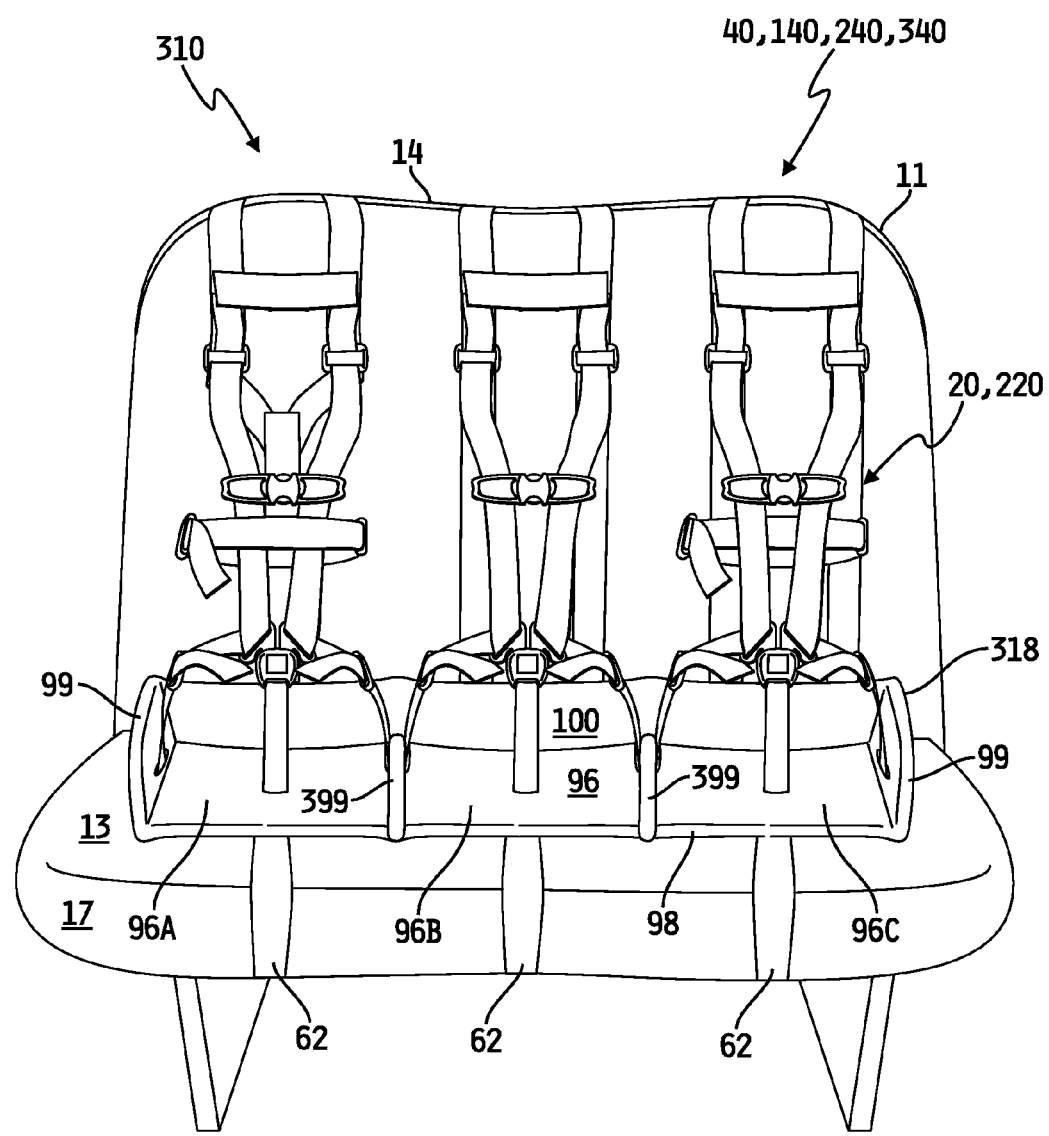
FIG. 9A is a front view of a seat having another exemplary embodiment of an illustrative restraint system mounted thereto.
Figure 9B:
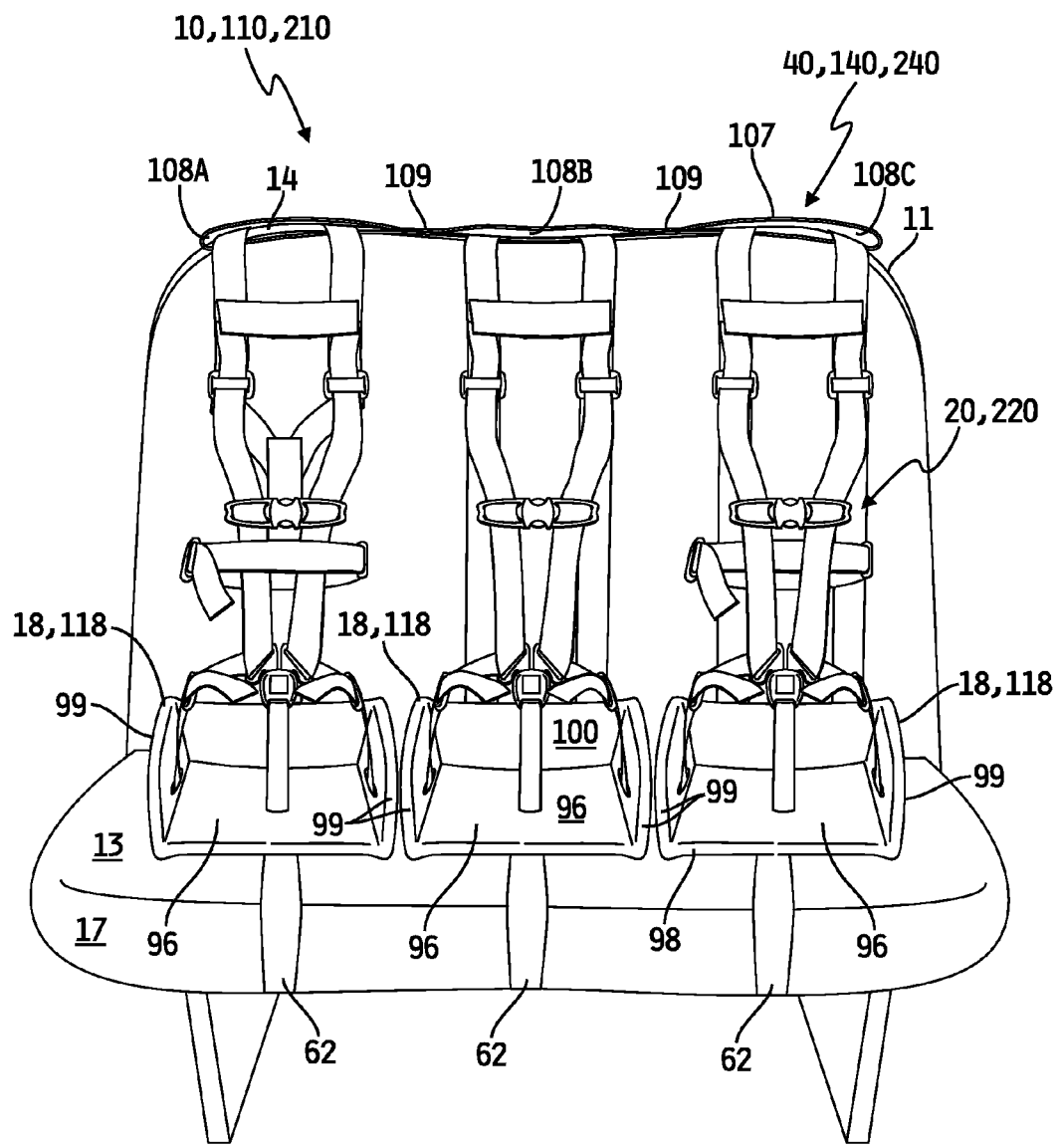
FIG. 9B is a front view of a seat having three exemplary embodiments mounted thereto.
Figure 10:
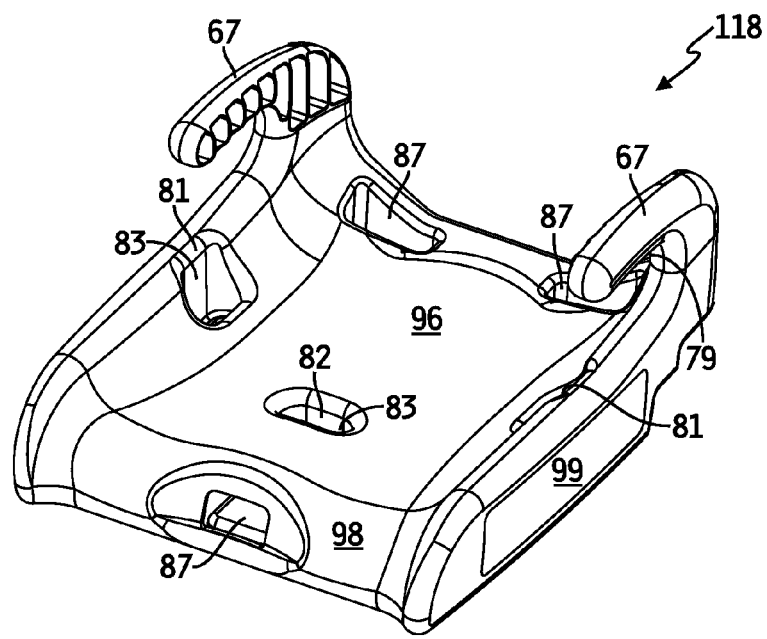
FIG. 10 is a top perspective view of another illustrative seat portion.
Figure 11:
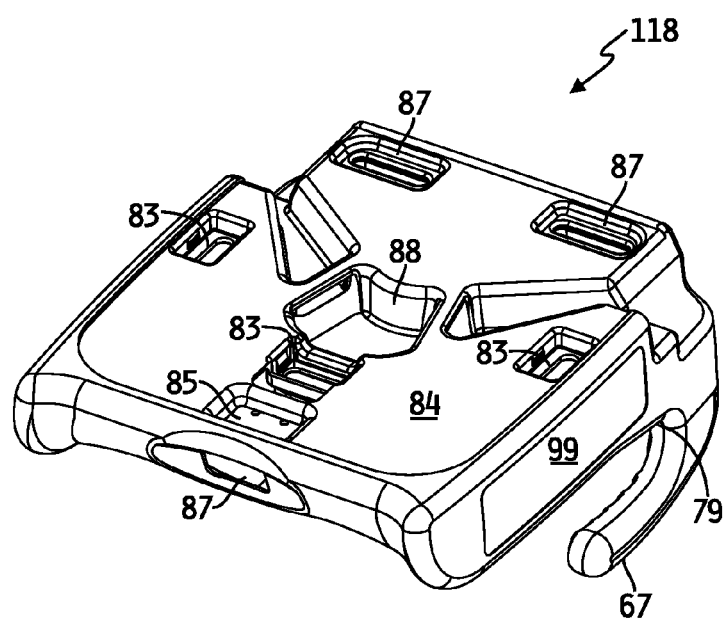
FIG. 11 is a bottom perspective view of the illustrative seat portion of FIG. 10.

Illustrative restraint systems 10, 110, 210, 310 comprise generally a seat base 18, 118, 318 such as for example a booster seat 18, 118, 318, a restraint assembly 20, 220 and a mounting assembly 40, 140, 240, 340. As will be explained further, the vehicle's own restraint system may be used in addition to or in lieu of mounting assembly 40, 140, 240 to mount booster seat 118. The booster seat 18, 118, 318 may be of any suitable design. For example, and without limitation, it may be molded from plastic, or other suitable metallic, non-metallic or suitable composite material and may be contoured. Illustratively, as best seen in FIGS. 5, 10, and 11, booster seat 18, 118 comprises a top surface 96, a bottom surface 97 opposite and spaced apart from the top surface 96, a front surface 98 spaced apart and opposite a rear surface 100, and spaced apart side surfaces 99 disposed generally between or adjacent to the top 96, bottom 97, front 98 and rear 100 surfaces. The top surface 96 may be contoured to conform to a human body. As seen in FIG. 9A, booster seat 318 comprises intervening side surfaces 399 that divide the top surface 96 into multiple top surfaces 96A, 96B and 96C to accommodate or support a passenger or occupant on each of these surfaces 96A-C. The side surfaces 99 depicted in FIG. 9A are somewhat exaggerated for illustrative purposes and may or may not be of lesser height in actual commercial embodiments. In any event, the intervening side surfaces 399 may be formed in the booster seat 318 with a vertical height less than the height of the side surfaces 99. While two intervening side surfaces 399 are depicted, it will be appreciated that a single intervening side surface 399, in excess of two intervening side surfaces, or no intervening side surfaces 399 at all would fall within the scope of the invention. For example and without limitation, base 318 might be formed with a single intervening side surface 399 to accommodate only two occupants, or formed with three intervening side surfaces 399 to accommodate four occupants as desired, or might be formed with no intervening side surfaces 399 to accommodate two to four occupants depending on the number of restraint assemblies. No matter the number of passenger or occupant sections desired, it will be appreciated that the booster seat base 318 of system 310 may be of monolithic construction. Such monolithic construction may be rigid across the length of the booster seat 318, or it may be for example collapsible. For example, though integrally connected to each other, as by a hinge, occupant section 96A may fold over on top of section 96B and section 96C may fold under section 96B. In other embodiments, the various occupant sections 96A-C may comprise wholly separate sections that may be releasably joined together for occupant use and then disassembled for ease of transport. It will be appreciated, however, that when the booster seat base 318 is mounted to the vehicle seat 11, it may be desirable that the base 318 be rigidly assembled. It is also the case, as noted above, that two or three or more restraint systems 10, 110, 210 may separately be disposed on a two-passenger or three-passenger seat such that two or three separate booster seats 18, 118 are disposed on the vehicle seat 11 as shown for example in FIG. 9B. In such a case, or even if only one booster seat 18, 118 is mounted to the vehicle seat as seen in FIG. 2, it might be desirable to use a positioning member 107, such as for example and without limitation the illustrative positioning member depicted in FIG. 13. Positioning member 107, which illustratively (FIGS. 2 and 9B) may be adjacent to or even coupled to the seat back top portion 14, comprises a plurality of voids or loops 108A-C configured to position the mounting assemblies on the seat 11. Illustratively, positioning member 107 may be fashioned from any suitable flexible, semi-flexible, semi-rigid or rigid material and such material may be metallic, non-metallic or composite in composition. For example and without limitation, positioning member 107 may be fashioned out of a flexible or semi-flexible belt or web material looped back on itself and coupled together at various points 109 to form loops or voids 108A-C. The coupling points 109 may be formed using for example and without limitation sewing, gluing, melting, cementing, riveting, hook and loop, tacking and the like. It will be appreciated that while three loops or voids 108A-C are illustrated, the positioning member could be fashioned with two loops or four or more loops as desired. For example, in the case of a vehicle having seats with only one or two positions, the positioning member 107 may be formed with only one or two loops 108. Positioning member 107 may be permanently or non-permanently coupled to the vehicle seat, for example and without limitation to the top portion 14 of the seat back portion 12 (FIG. 2), or to the back portion 12 itself or to the opposite back surface 16 of the back portion 12. The positioning member 107 could even be used with system 310 of FIG. 9A. As can be seen in FIG. 2, the positioning member 107 need not be coupled to the vehicle seat at all as the one or more sets of straps 42, 43, will keep the positioning member 107 in place. It will be appreciated that the use of a positioning member 107 may necessitate the elimination of cross member 58 and V-member 63, or the use of a non-permanently attached or removable cross member 58 and V-member 63 as further described below.

The illustrative booster seats 18, 118, 318 may be equipped with any desired amount and composition of cushioning and may be covered by cloth or other suitable material such as for example the cover 180 depicted in FIG. 7 as will be explained further below. The booster seat or base 18, 118, 318 illustratively may be formed with various indentations 93, 102 (FIGS. 5 and 6), which may for example provide rigidity while reducing weight. The booster seat or base 18, 118, 318 illustratively may accommodate occupants from about 30 pounds up to about 90 pounds. Looking at FIGS. 6, 10 and 11, it can be seen that the booster seat 18, 118, 318 may also be formed with various anchor points, such as for example mounting assembly anchor points 86 and 85, each illustratively formed with a void 87 therethrough, and restraint assembly anchor points 81 and 82, each also illustratively formed with a void 83 therethrough. Also formed through at least a portion of each side surface 99 and the rear surface 100 may be one or more recesses 103, which are sized to receive any of a number of suitable connectors such as for example and without limitation connector 68. Additional recesses (not shown), each sized to receive therein an additional connector 68, may also be formed through rear surface 100. For example, additional recesses might be desired in the vicinity of intervening side surface(s) 399. Examples of some suitable illustrative connectors 68 are disclosed in co-owned U.S. Pat. No. 6,962,394, the disclosure of which is incorporated herein by reference. As will be explained, indentations 102 also facilitate the grasping and manipulation of illustrative connector 68 by a user. The booster seat 18, 118, 318 further comprises a web guide 88, which is formed with a void 89 therethrough. The various voids 83, 87, 89 illustratively help lighten the base 18, 318 and may provide rigidity, as well as anchor points. It will be appreciated that the booster seat 18, 118, 318 could also serve as a carrying case, similar to for example and without limitation, a suitcase or brief case, having a handle (67 and not shown) and configured to hold and store therein or thereon the restraint and mounting assemblies. The booster seat 18, 118, 318 may be configured to mount to vehicle seat 11 and properly position an occupant for use of the restraint assembly 20, 220, which is attached to the booster seat 18, 118, 318 as will now be explained.

The restraint assembly 20, 220 and the mounting assembly 40, 140, 240, 340 may each be attached to the booster seat 18, 118, 318 and associated or coupled to each other as described herein. Each mounting assembly 40, 140, 240, 340 generally comprises one or more flexible or semi-flexible members such as for example without limitation webs, belts, straps, ropes, or the like. Illustratively, the restraint assembly 40 of the exemplary embodiment of FIGS. 1 and 2 comprises five wrap around flexible or semi-flexible members, namely, a pair of over webs 42, 43, a pair of under webs 52, 53 and a third under strap or web 62. The illustrative pair of over webs 42 and 43 straddle over the top portion 14 of the back portion 12 with each web 42, 43 having opposing ends that proceed over and downwardly away from the top portion 14 along at least a portion of the front surface of back portion 12 and along at least a portion of the opposite back surface 16 of back portion 12. The first opposing end portions of webs 42, 43 proceed down the front surface of back portion 12 and are coupled to the booster seat 18, 118, 318 by any suitable means, such as for example, without limitation, by rivet, screw, cement, tack, slot and spindle, snap, hook and loop, zipper, button, melting, tongue and buckle and the like, and even illustrative connector 68 may be used. For example, the first opposing end portions of webs 42, 43 may couple to the seat 18, 118, 318 at one or more of the mounting assembly anchor points 86 formed in the booster seat 18, 118, 318 as seen for example in FIG. 6. Those skilled in the art will appreciate that other mounting assemblies, such as for example the illustrative mounting assembly 140 depicted in FIG. 3, fall within the scope of the invention. In mounting assembly 140, the first opposing end portions of webs 42, 43 illustratively form connecting member 44. Connecting member 44 may be made from any suitable flexible, semi-flexible, rigid or semi-rigid material. It may comprise a strap, web, rope, belt or the like. So too, it may be fashioned from any suitable plastic, metallic, non-metallic, or composite material. The connecting member 44 illustratively forms a V-shape. It may be a single monolithic member or it may be comprised of several members which form the V-shape, converging toward and coupling to member 41 as depicted. So too, for example, web portions 42, 43 may fold back on themselves, and illustratively, be sewn, melted, glued, cemented, riveted, tacked, or the like to themselves in order to create the angled, or V-portions 44. One of other suitable alternatives may be for example to couple the first opposing end portions of webs 42, 43 to separate lengths of web 44, or other suitable material, to form the V-portions. Member 41, may be any suitable flexible, semi-flexible or rigid member. Illustratively, member 41 comprises a flexible or semi-flexible member such as a web, belt, strap, or rope. Illustratively, connecting member 44 may be attached to web 41 by any suitable means such as for example and without limitation by sewing, gluing, melting, cementing, riveting, hook and loop, tacking and the like. Web 41 illustratively proceeds down at least a portion of the front surface 12 and attaches to the booster seat 18, 118, 318 at a suitable mounting assembly anchor point 86 depicted for example in FIG. 6, or at a mounting assembly anchor point (not shown) formed generally somewhere between the anchor points 86 depicted in FIG. 6, or even elsewhere on booster seat 18, 118, 318. It will be appreciated that even further illustrative mounting assembly embodiments are suitable, for example, web 41 could form or be connected to additional connecting member V-portions at the opposing end of web 41 opposite the depicted V-portions of connecting member 44, each of which in turn could attach to mounting assembly anchor points 86. So too, one or more additional members (not shown) could be placed adjacent the webs 42, 43 and proceed generally parallel thereto, attaching, for example, to cross member 58 (FIGS. 2 and 4) and/or to cross member 59 (FIGS. 1 and 3), each described in more detail below, and to booster seat 18, 118, 318 at one of the already described anchor points, or yet another mounting assembly anchor point 86.

Figure 3:
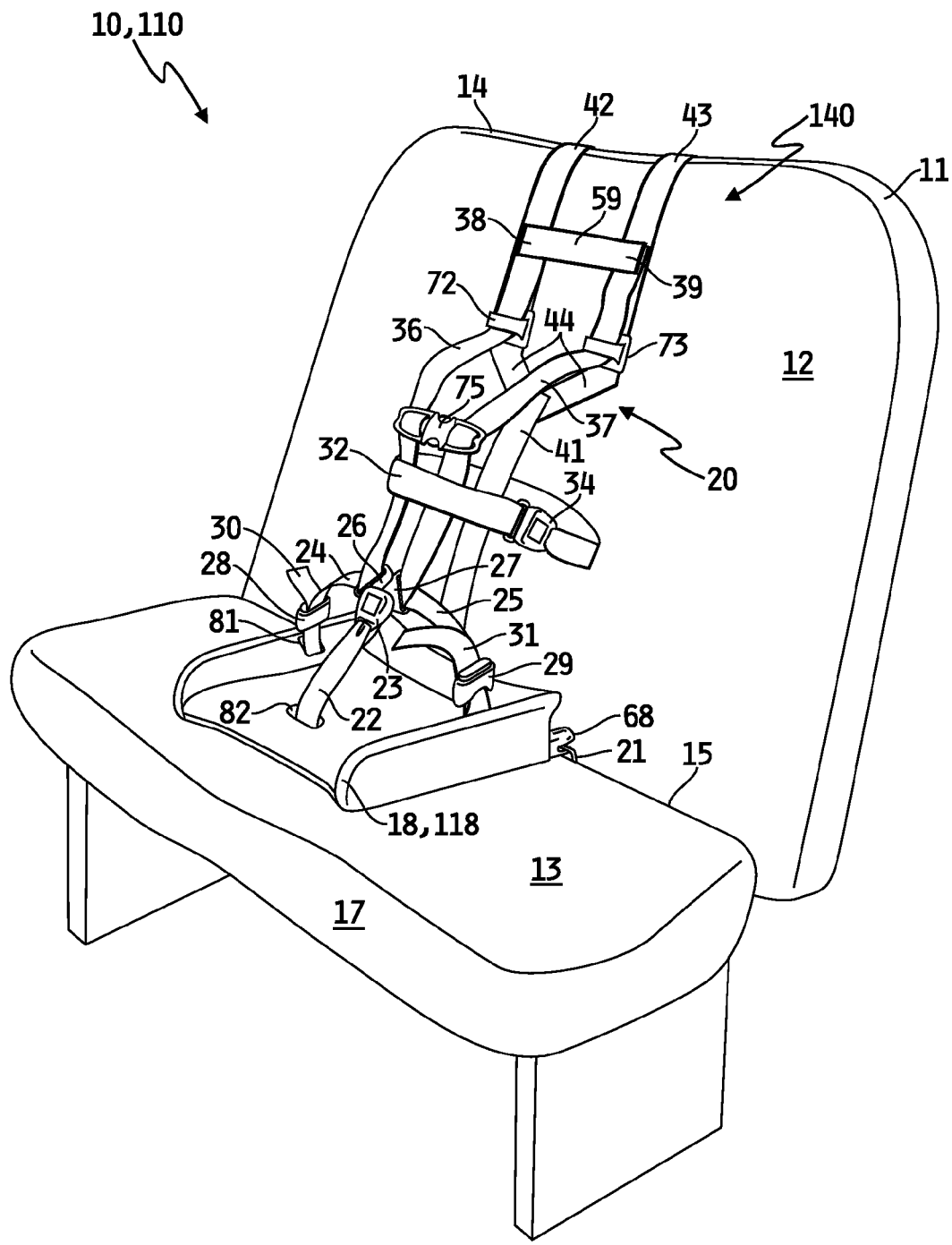
FIG. 3 is a perspective view of the seat of FIG. 1 depicting another exemplary embodiment of an illustrative restraint system.
Figure 4:
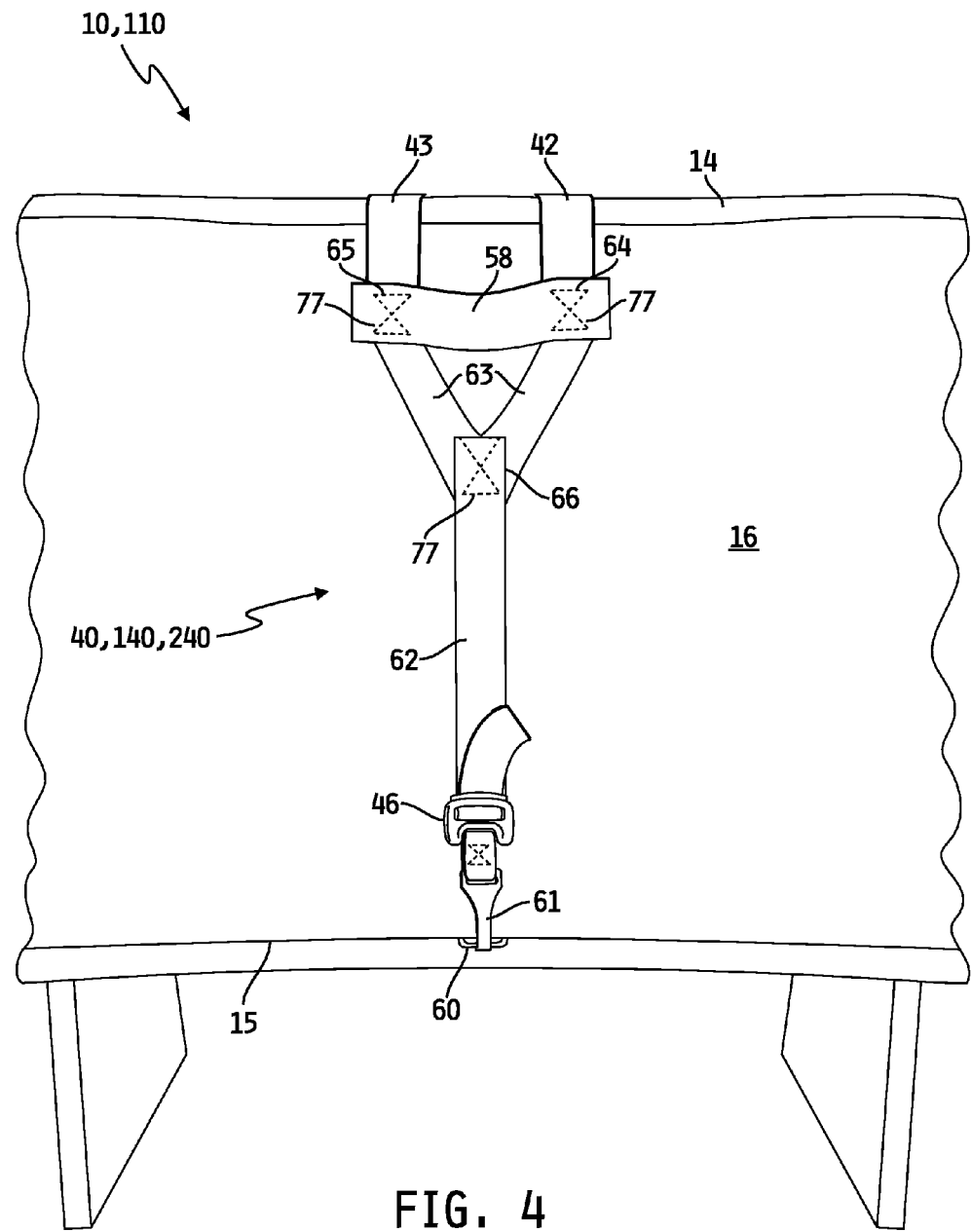
FIG. 4 is a rear view of the seat of FIG. 1 depicting the back of another illustrative restraint system.

The opposing second end portions of webs 42, 43 generally proceed down at least a portion of the opposite back surface 16 as best seen in FIGS. 2 and 4. Illustratively, web adjusters 46 and 47 are movably disposed on respective webs 42 and 43. Web adjusters 46 and 47 may each be equipped with a conventional fastener 45, such as for example, without limitation, the pictured snap hook 45. Although the snap hook 45 is connected to the web adjuster 46, 47 by a piece of web, it may also be an integral part of the web adjuster, or connected to the web adjuster through any other suitable means. Non-exclusive examples of suitable snap hooks 45 and snap hooks integrated with web adjusters are disclosed in commonly owned U.S. patent application Ser. No. 10/427,362, the disclosure of which is now incorporated herein by reference. Another non-exclusive example of a suitable fastener is the aforementioned connector 68, which is depicted in FIG. 5. Other fasteners or connectors known in the art could be used as well. Webs 42 and 43 may, but need not be associated by one or more cross-members 58, 59 which may be any suitable flexible, semi-flexible, rigid, or semi-rigid member. Illustratively, the cross-member 58 shown in FIGS. 2 and 4, and the cross-member 59 best seen in FIG. 3 may be a length of web, strap, rope, belt, and the like, without limitation. So too, the cross-members 58, 59 may be a piece of plastic or other rigid or semi-rigid member.

Referring to FIG. 2, the illustrative pair of flexible or semi-flexible members or under webs 52 and 53 each have opposing end portions. The first opposing end portions of each web 52 and 53 proceed down at least a portion of the back surface 16, proceed through the bight 15 of the seat emerging at the bottom of the front surface of the back 12, and are coupled to the booster seat 18, 118, 318 by any suitable means, such as for example, without limitation, by rivet, screw, cement, tack, slot and spindle, snap, hook and loop, zipper, button, melting, tongue and buckle, or other suitable fastener or connector, such as for example connector 68, and the like. Any such suitable coupling or fastener means may attach to the booster seat at one or more of the aforementioned mounting assembly anchor points 86 shown in FIG. 6, or as described herein. The second opposing end of each web 52 and 53 is equipped with a coupling member 54 which defines a coupling hole 55 therethrough. The coupling hole 55 is sized to receive and couple with the fastener 45 or other suitable connector in order to couple together webs 42 and 43 with respective webs 52 and 53. It will be appreciated that the webs 42 and 43 may be coupled together with webs 52 and 53 using any other suitable means. By way of example, and without limitation, webs 42 and 43 may be coupled together with webs 52 and 53 using: hooks and loops, seat belt buckles and tongues, snaps, zippers and the like or any suitable connector such as for example connector 68, or any combination thereof. So too, as will be explained, webs 42 and 52, and/or webs 43 and 53 respectively may be combined together each to form a single web. In other words, a single web may replace the combination of webs 42 and 52, and/or the combination of webs 43 and 53, which single web(s) 42/52 and/or 43/53 could connect directly to anchor points 86 using fastener 45 or connector 68, for example. Also, one or both fasteners 45, or connector 68 for example, could couple directly to a tether anchorage such as for example the anchorage 60 of FIG. 4, or to a lower anchorage 21 of FIG. 3, rather than to webs 52, 53 and/or directly to any of the anchor points 86 on booster seat 18, 118, 318

Illustratively, a third under strap 62 may by positioned between the over webs 42, 43 and between the under webs 52, 53 as depicted in FIG. 2. Although each of these webs 42, 43, 52, 53, 62 is shown in spaced-apart relation to each other, they need not be spaced apart. Like the other webs 42, 43, 52, 53, under web 62 may be made of any suitable flexible or semi-flexible material. Under web 62 comprises two opposing ends. First opposing end of under web 62 illustratively is coupled to each of webs 42, 43 by the use of connecting member 63. Like connecting member 44, connecting member 63 may be any suitable flexible member such as for example a strap, web, rope, belt or the like. Connecting member 63 may also be a semi-flexible, semi-rigid or rigid member, for example a piece of plastic or other metallic, non-metallic or composite material. As depicted, connecting member illustratively forms a substantially V-shaped member. It will be appreciated, as described above in conjunction with connecting member 44, that this V-shaped connecting member 63 may be a monolithic member or it may comprise two or more pieces joined together by any suitable means such as for example by sewing, melting, gluing, cementing, riveting, tacking, or the like. It will also be appreciated that the connecting member 63 may be eliminated altogether, as for example in the case where the third under web 62 is coupled directly to the cross-member 58. So too, under web 62 could be coupled directly to only one of the over webs 42, 43. In any event, the connecting member 63 illustratively is coupled to over web 42 at position 64, to over web 43 at position 65, and to third under web 62 at position 66 by stitching 77. While these couplings illustratively are accomplished using stitching 77, as are the couplings of cross web 58 at positions 64, 65 and as are the fasteners 45 and coupling members 54 to respective webs 42, 43, 52, 53, those skilled in the art will recognize that other suitable couplings, both permanent and releasable or non-permanent such as for example and without limitation, snaps, rivets, tacks, hook and loop, glue, cement, melting, and the like may be used. It will be appreciated that the transition between a single web, for example webs 41, 62, and a V-shaped connecting member, for example connecting members 44, 63, may be aided by a rigid or semi rigid spreader (not shown) as is known in the art. One of many examples of a suitable spreader bar is found in U.S. Pat. No. 4,660,889, the disclosure of which is enclosed herein by reference.

The second opposing end of under web 62 proceeds downwardly away from cross-member 58 along at least a portion of the back surface 16, past the bight 15, under seat portion 13 passing along the bottom surface of the seat portion 13, upwardly around the front facing surface 17 of seat portion 13, and across at least a portion of the top surface of seat portion 13 to couple with booster seat 18, 118, 318 at mounting assembly anchor point 85 by any suitable means, such as for example, without limitation, by a snap hook 45, hook and loop, snaps, buttons, slot and spindle, tongue and buckle, cement, or connector 68, and the like. Although not shown in FIG. 2, it will be appreciated that under web 62 may be equipped with a web adjuster 46 as shown in the alternative embodiment of FIG. 4, in order to adjust the operable length of the web 62. The opposing end of under web 62 that couples with the booster seat 18, 118, 318 may form or be attached to a connector member (not shown), similar to connector members 44, 63, to allow coupling to the booster seat 18, 118, 318 at more than one anchor point 85 (and not shown). In addition, the opposing end of under web 62 that couples with the booster seat 18, 118, 318 may be attached to a fastener such as a snap hook 61 as shown in FIG. 4 or to a connector such as connector 68 which may couple directly with anchor point 85, as noted above, or directly to a tether anchorage 60 as shown in FIG. 4 and described herein below.

While FIGS. 1 and 2 depict five separate webs 42, 43, 52, 53 and 62, those skilled in the art will further appreciate that a single web, or two webs, or any other combination of one or more webs may be used to mount the booster seat base 18, 118, 318 to the vehicle seat 11. While this notion was briefly described above, further description now follows. For example, the webs 42 and 43, together with respective webs 52 and 53, conceptually may each comprise a single length of web, for use alone or in combination with one or more other webs. In such a case, for example, web 42 and web 52, or web 43 and web 53, would comprise a single length of web with the opposing ends of this length of web being attached to the booster seat 18, 118, 318 as described, for example using a central mounting assembly anchor point, and with at least one of the opposing end attachments being releasable. More particularly, the single web (not shown) conceptually formed by combining web 42 and web 52, or web 43 and web 53, could attach to booster seat 18, 118, 318 at an appropriately located mounting assembly anchor point 86 (or not shown), wrap around all or portions of the seat back 12, 14, 16, and either pass through the bight 15 and attach to one of the mounting assembly anchor points 86 (or not shown) or pass under the seat as web 62 may, and attach to mounting assembly anchor point 85. This first single strap formed by either webs 42, 52 or webs 43, 53, or perhaps any other suitable single strap or web, such as the single web 62 in FIG. 4, may be enough to mount the booster seat 18, 118, 318 to the vehicle seat 11, however, a second single strap, could also be used in conjunction with the first single strap to mount the booster seat 18, 118, 318 to the vehicle seat 11. For example, if the first single strap is formed by webs 42 and 52, then the second single strap could be formed by webs 43 and 53 to form a single length of web having at least one end attached to the booster seat in a non-permanent manner, and having the opposing end attached in either a permanent or non-permanent manner for use with the first single web conceptually formed by uniting web 42 and web 52, or vice versa. So too, a single web could be used with the separate combination of webs 42 and 52, or of webs 43 and 53 such that three webs would be used.

By way of example and without limitation, the booster seat 18, 118, 318 and mounting assembly 40 as just described may be mounted to seat 11 as follows. The booster seat 18 may be placed on a portion of the top surface of seat portion 13. Then the over webs 42, 43 may be coupled to the booster seat 18, if not already coupled to the booster seat 18 when placed on the seat portion 13. The webs 42, 43 may then be routed over the top portion 14 and down at least a portion of the back surface 16 as described and then coupled to the under webs 52 and 53 by mating of the fasteners 45 and couplers 54 as described. Illustratively, the webs 42, 43 could also, but need not be routed through any one of the voids or loops 108A-C of positioning member 107 as desired. If the third under web 62 is not already coupled to the over webs 42, 43, and/or if the cross-member 58 is not already coupled to the over webs 42, 43, then the third under web 62 and the cross-member or members 58 may be coupled to the webs 42, 43 as described. Then the under webs 52, 53 may be passed over at least a portion of the back surface 16 and through the bight 15 and then connected to the booster seat 18, 118, 318 as described, and the under web 62 may be passed under and across the bottom surface of seat 13 and attached to the booster seat 18, 118, 318 as described. Then the loose ends 48 and 49 are pulled away from respective adjusters 46, 47 to take the slack out of the webs 42, 43, 52, 53 as desired. So too, the slack may be taken out of under web 62 through the use of a web adjuster 46 (FIG. 4) or other suitable means known to those skilled in the art. It will be appreciated that the foregoing steps may be accomplished in any other suitable order or way. For example, the under webs 52, 53 may be attached to the booster seat 18, 118, 318 and then passed through the bight 15 and then passed upwardly for coupling with over webs 42, 43. It will also be appreciated that any of the above described webs 42, 52, 43, 53, 62 may be augmented by additional webs and fasteners, or may be combined and/or eliminated, as explained above, such that a single web could be passed down the back surface 16, and through the bight 15 to couple to the booster seat 18, 118, 318, or down the back surface to couple directly to a tether anchorage or a lower anchorage attached to the vehicle.

A non-exclusive example of an illustrative mounting assembly 240 utilizing a single web is shown in FIG. 4. For convenience, the single web is labeled as 62, but it could just as easily have been labeled 42, 43, 52, 53 since any single web is contemplated. Mounting assembly 240 is substantially similar in many respects to mounting assembly 40. Therefore, while additional webs such as for example under webs 52 and 53 have been eliminated, over webs 43, 42, under web 62, cross member 58 and connecting member 63 are constructed and operate substantially in accordance with the above description, with the exception that, as noted above, web 62 illustratively is equipped with a fastener 61 and web adjuster 46 configured to attach directly to a tether anchorage. Therefore, as shown in FIG. 3, web 62 need not attach to the front of base or booster 18, 118, 318; although, if desired, a web attached to the front of base 18, 118, 318 and a web attached to a tether anchorage is contemplated. It will be appreciated that fastener 61 is substantially similar to fasteners 45. Also, fastener 61 could be replaced by a connector, such as illustrative connector 68 and configured to attach directly to a lower anchorage such as anchorage 21. So too, any such fastener 45, 61 or connector 68 could pass through the bight 15 and attach directly to the booster seat 18, 118, 318 at, for example, mounting assembly anchor point 85. Although the tether anchorage 60 is shown attached to the vehicle generally at the bight of the vehicle seat, it will be appreciated that it may be attached or coupled to the floor of the vehicle, under the seat portion 13, to the back portion 12, to the parcel shelf (not shown) of a vehicle, or to another suitable location as desired and perhaps as described by rules and regulations such as for example and without limitation FMVSS 225. The single-strap 62 configuration of mounting assembly 240 could also be equipped with a V-shaped connecting member at one or both ends, such as connecting member 44 or 63, in order to provide more than one connection to mount to the booster seat 18, 118, 318 anchor points 85, 86 and/or to the vehicle's anchorages 21, 60. This just described single-strap 62 back portion of mounting assembly 240 may be combined with the front portion of mounting assembly 40 (FIG. 1 and as described) or the front portion of mounting assembly 140 (FIG. 3 and as described) or vice versa. It will be appreciated that the booster seat 18, 118, 318 may be equipped with fasteners 45, 61 and/or connectors 68 which couple with coupling members 54 attached to any of the end portions of any of the webs 42, 43, 52, 53, 62 of the various mounting assemblies 40, 140, 240, or directly to the vehicle as will now be described.

Restraint systems 110, 210, 310 represent further illustrative embodiments. As noted above, restraint systems 10, 110, 210, 310 generally comprise a seat base 18, 118 or 318, a restraint assembly 20, 220, and any of the mounting assemblies 40, 140, 240 previously described and combinations and/or variations thereof. Thus, looking at restraint systems 210 and 310 of FIGS. 8 and 9, while over webs 42, 43 and under web 62 are depicted generally as in FIG. 1, any of the configurations of mounting assemblies 40, 140, 240 may be used as depicted in FIGS. 1-4 and/or described herein. Indeed, the illustrative embodiment of FIG. 9 depicts a mounting assembly 340 comprising a mounting assembly portion having over webs 42, 43 connected to the base 318 as in assembly 40 as well as another mounting assembly portion having over webs connected to connecting member 44 in turn connected to the web 41 and in turn connected to the base 318 of FIG. 9 in for example the manner depicted for mounting assembly 140 in FIG. 3. It will be appreciated, therefore, that the illustrative embodiment 310 of FIG. 9 could have any of the mounting assemblies 40, 140, 240 applied consistently throughout the mounting portions associated with each passenger or occupant support surface or section 96A-C, or any combination of the mounting assemblies 40, 140, 240, such as for example has just been described. It will further be appreciated that the passenger support surfaces 96A-C depicted in FIG. 9 could be replaced by individual and generally unconnected booster seats 18, 118 representing any combination of mounting assemblies 40, 140, 240 and/or restraint assemblies 20, 220 associated therewith. One or more of the under straps 62 shown in FIG. 9 could be eliminated altogether, or attached to a tether anchorage as in FIG. 4. For example, just the center strap 62 in FIG. 9 could be eliminated altogether and the left and right straps 62 could be used and one or more of the remaining straps 62 may be attached as already described or may be attached to a tether anchorage rather than to the front of booster 318. So, too, in the illustrative embodiment of FIG. 8, the strap 62 could be eliminated altogether or attached to a tether anchorage 60, rather than to the front of the booster base 18, 118.

Figure 6:
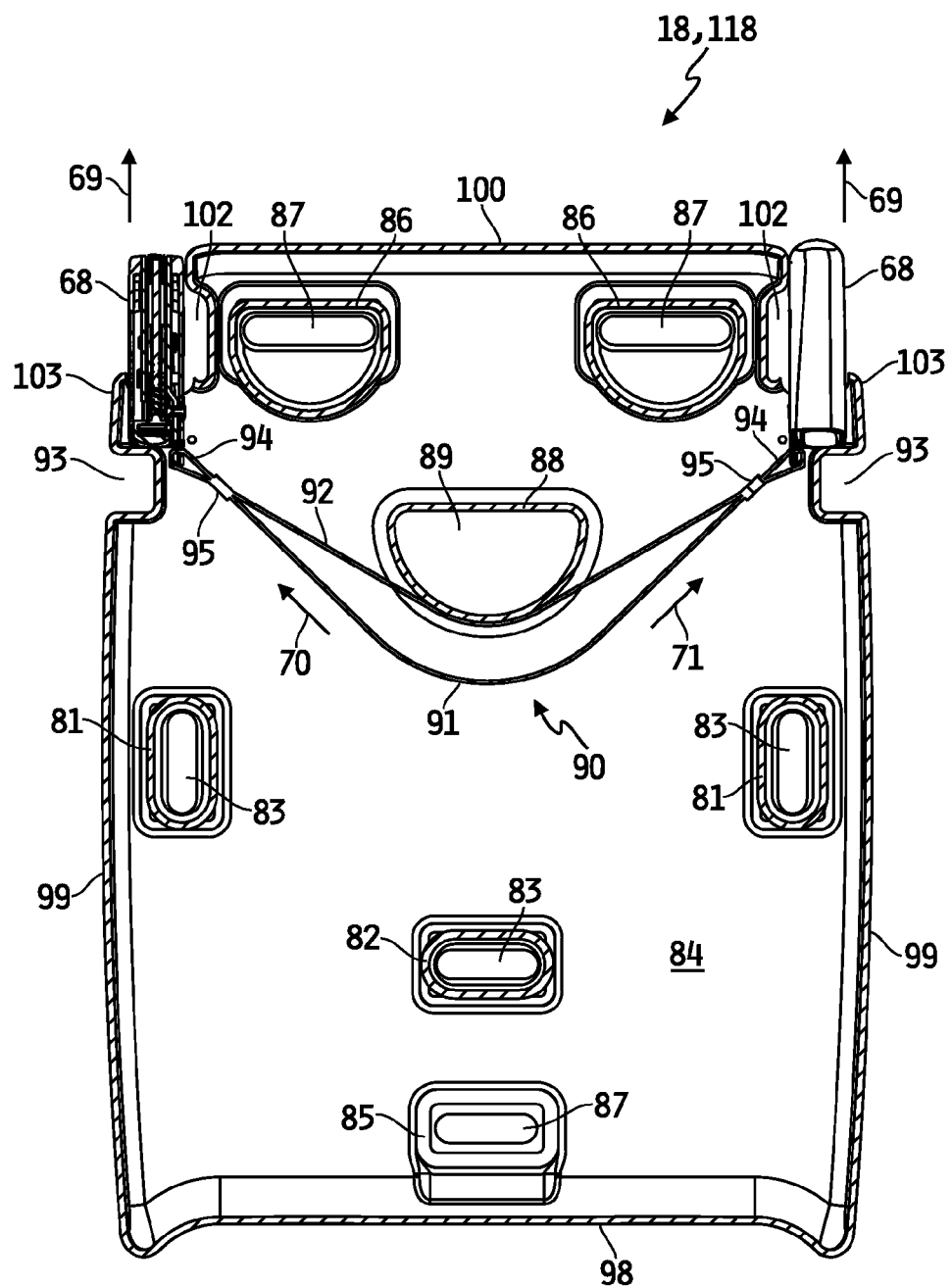
FIG. 6 is a sectional view of an illustrative seat portion taken generally along the line 6-6 of FIG. 1.

In addition to or in lieu of the mounting assemblies 40, 140, 240 described above, restraint system 110 uses mounting fasteners and/or connectors, which are also adaptable for use with restraint systems 210 and 310. Thus, restraint systems 10, 110, 210, 310 may comprise fasteners 45, 61 or connectors such as illustrative connector 68 carried by or attached directly to the booster seat 18, 118, 318. Referring to FIG. 6, for example, illustrative connectors 68 are received in recess 103 and are retained therein by one or more flexible, semi-flexible, or semi-rigid member, such as for example a web, belt, strap, rope or the like. For example, connector retention assembly 90 comprises web portion 91 and web portion 92 and illustratively retains the connectors 68. More specifically, web portion 91 and web portion 92 are coupled to each connector 68 at mounting aperture 94. While web portion 91 and web portion 92 may be separate and discrete lengths of web associated with each other by for example stitching, melting, hook and loop, snaps, rivets, gluing, cementing, and the like, they may also be associated by band or clamp 95, or they may be a single length of web. In any event, web portion 92 illustratively has an elastic or semi-elastic portion that allows the length of web portion 92 to increase as a force along the direction of the arrows 69 in FIGS. 5 and 6 is applied to web portion 92. For example a user may grasp one, or both, of the connectors, which grasp illustratively is facilitated by indentation 102, and pull the connector outwardly away from its recessed position (FIG. 5B) in the recess 103 in the direction of arrow 69. This force urges web portion 92 against the web guide 88, and causes the elastic portion of web portion 92 to expand. This force also urges web portion 91 against the web guide 88 as web portion 91 is also pulled or urged in the direction of arrow 70 and/or 71. However, web portion 91 illustratively does not comprise an elastic portion; therefore, when web portion 91 reaches web guide 88 under normal conditions it will not lengthen and the outward movement of connector 68 generally will be halted. Therefore, the degree of the connector's 68 travel outside of the recess 103 is generally limited both by the degree the elastic portion of web portion 92 may be expanded and by the length of web portion 91. Illustratively, it is the length of web portion 91 that provides the ultimate limitation on the degree of connector's 68 travel outside the recess.

In operation, the illustrative booster seat 18, 118 of restraint system 110 may be mounted to the vehicle seat 11 by pulling one of the connectors 68 out of recess 103 and engaging it with for example lower anchorage 21 (FIG. 3) or other suitable anchorage. In the engaged position, the lower anchorage 21, such as for example and without limitation a roundbar, is located behind the finger 78 of the connector 68. Thereafter, or at the same time, the other illustrative connector 68 may be engaged with another lower anchorage 21. It will be appreciated that the connector(s) 68 may be fixedly attached to the booster seat 18, 118, 318 in a ready position, rather than extending from and retracting into the recess 113. In such a case, for example, the connectors 68 might be covered by a door or other covering and the need for the retention web assembly 90 would be eliminated. So too, the connectors 68 might be fixedly attached to the booster seat 18, 118, 318 but pivot, whether up, down, laterally or obliquely, from a recess into position for engagement without need for the retention web assembly 90. It would also fall within the scope of the invention for the connectors 68 to telescope out of recess 103 on some type of rigid, perhaps lockable and retractable railing system or an equivalent thereof.

Even further ways of mounting the bases 18, 118, 318 to a vehicle seat 11 are contemplated. For example, and without limitation, a pair of opposing slots (not shown) may be formed through sides 99 to receive therethrough a belt or other flexible or semi-flexible member to mount the base 18, 118, 318 to a vehicle seat 11. For example and without limitation, a slot could be provided in each of indentations 93 and a vehicle's integral seat belt passed through one of the slots, around web guide 88 and through the opposite slot. Such a seat belt might for example and without limitation be the lap belt and tongue integral to an airplane seat, which tongue is passed through the opposing slots in succession and engaged with the buckle connected to the other lap belt on the airplane seat to mount the booster seat 18, 118 to the airplane seat. In another embodiment depicted in FIGS. 10 and 11, the use of a vehicle's integral seat belt restraint system to mount the booster seat 118, or the other booster seats 18, 318 if desired, to the vehicle is facilitated by arms, appendages or handles 67. Appendages 67 may but need not be an integrally formed part of booster seat 118 (or booster seat 18, 318 if desired) and may be shaped to form belt receiving channels 79. The lap belt of a two-point or a three-point vehicle restraint system may be received through the channels 79. It will be appreciated that booster seat 18 and 318 can also be formed with appendages 67 and in the case of booster seat 318, extensions to the vehicle's lap belt may need to be used. In another embodiment, more than one of the vehicle's lap belts may be used to mount booster seat 318 to the vehicle. The use of a vehicle's integrated seat belt system to mount booster seat 18, 118, 318 to the vehicle may be used alone or in combination with any of the mounting assemblies 40, 140, 240, 340 described herein and/or in combination with a connector 68 and anchorage system. Similarly, while engagement of the connectors 68, or even a single connector 68, or perhaps more than two connectors 68, as just described is sufficient to mount the booster seat 18, 118, 318 to the vehicle seat 11, the booster seat 18, 118, 318 may be further secured, if desired, using any of the mounting assemblies 40, 140, 240, 340 alone or in combination with the vehicle's integrated seat belt system(s) as already noted and described above. For example and without limitation, the connector(s) 68 may be engaged with the lower anchorages 21, and then web 62 may be wrapped over the top 14 of the seat back 12, or under the seat 13, and its connector 61 attached to any suitable tether anchorage 60 as described. The length of web 62 may be adjusted through the use of web adjuster 46, or other suitable device. As just noted, a center web 62 could be attached to anchor point 85 and routed downwardly to attach to a tether anchorage 60 on the floor, or routed downwardly under the seat 13 to attach to a tether anchorage 60 in the bight 15 or on the back 16 of the seat. So too, webs 42, 43, 52, 53, alone or in conjunction with web 62, could be routed and engaged as already described. Similarly, a single web could wrap around the seat and engage a tether anchorage 60, or attach directly to the booster seat as described herein to augment the mounting provided by connector(s) 68. In another embodiment, the connector(s) 68 could engage with one or more anchorages 21, 60, one or more of the vehicle's integral seat belts could be routed through the booster seat 18, 118, 318 slots (not shown) or channel(s) 79, and one or more webs connected to the booster seat 18, 118, 318 could be wrapped around the vehicle's seat in any suitable manner. In other embodiments, the vehicle's integral seat belts may be used alone, or the illustrative connectors 68 may be used alone, or one or more webs 41, 42, 43, 52, 53, 62, and/or 63 may be wrapped around the seat 11 alone to mount the booster seat 18, 118, 318. In short, any combination or permutation of the various mounting assemblies 40, 140, 240, 340 of restraint systems 10, 110, 210, 310 may be used alone or in conjunction with each other and/or with the vehicle's integrated seat belt system, which in turn may be used alone, as described herein and equipped with any of the illustrative restraint assemblies 20, 220 which will now be described.

The restraint assembly 20 configured for use with the vehicle restraint systems 10, 110, 310 illustratively may comprise a four-point or a five-point restraint system. The illustrative restraint assembly 20 generally and illustratively comprises two lengths 36 and 37 of any suitable flexible or semi-flexible material such as for example without limitation a web, belt, rope, strap, and the like, having respective first ends 30 and 31 and respective opposing second ends 38 and 39. Second end 38 is attached to over web 42 and second end 39 is attached to over web 43 by any suitable means, such as for example without limitation by stitching, tape, hook and loop, cement, glue, melting, snaps, buttons, zippers, tacks and the like. Illustratively, a cross-member 59 (FIG. 3), as described above, may extend between over webs 42 and 43 and may be attached thereto and to webs 36 and 37 over or adjacent to ends 38 and 39. Other cross-members (not shown) may be spaced apart along the lengths of over webs 42 and 43 to further associate over webs 42 and 43. Opposing ends 30 and 31 are threaded through respective web adjusters 28 and 29. The web adjusters 28 and 29 illustratively may each be equipped with an integrated conventional tongue configured to mate with a conventional buckle (not shown) attached to the booster seat 18, 118, 318. In the alternative, the web adjusters 28 and 29 may be attached directly to the booster seat 18, 118, 318. Disposed on the webs between the opposing ends 30 and 38 and opposing ends 31 and 39 are conventional tongues 26 and 27, which are configured to mate with conventional buckle 23, which in turn is attached to booster seat 18, 118, 318 by connecting member 22. Connecting member 22 may be any suitable flexible, semi-flexible, rigid, or semi-rigid material and may be attached to the booster seat 18, for example, at restraint assembly anchor point 82 (FIGS. 3 and 6). Although not shown, connecting member 22 may optionally be equipped with a web adjuster operable to vary the length of connecting member 22. So too, as just noted, web adjusters 28 and 29 may be integrated with the tongues 26 and 27 as is known in the art. In addition, a central type adjust system could be used, such as for example and without limitation as disclosed in commonly owned U.S. Pat. No. 4,679,852, the disclosure of which is now incorporated herein by reference. Also, those skilled in the art will appreciate that an optional harness clip 75, described below, may be integrated with mid-belt adjusters (not shown) to replace or augment web adjusters 28, 29.

In operation, the webs 36 and 37 are placed over the shoulders of an occupant or passenger 19 sitting on the booster seat 18, 118, 318 which has been mounted to the seat 11 in any of the ways previously described. The tongues 26, 27 are then mated or engaged with the buckle 23 thereby forming a five-point restraint with the webs 36 and 37 being divided by the tongues 26 and 27 into respective lap portions 24 and 25 and torso portions extending between the tongues 26 and 27 and the ends 38 and 39. The ends of webs 36 and 37 proximate to the lap portions 24 and 25 illustratively are attached to the restraint assembly anchor points 81 (FIGS. 3, 6 and 10). The fit of the five-point restraint assembly 20 may be adjusted using the web adjusters 28 and 29. The fit may further be adjusted by use of optional and conventional height adjusters 72 and 73 and the optional harness clip 75. Examples, without limitation, of suitable height adjusters are found in commonly owned U.S. Pat. No. 6,886,889, the disclosure of which previously has been incorporated herein by reference, and commonly owned and co-pending U.S. patent application No. 60/617,160, entitled WEB POSITION ADJUSTING DEVICE, filed Oct. 8, 2004, the disclosure of which is now incorporated herein by reference. The various web adjusters mentioned throughout the illustrative embodiments illustratively may also be in accordance with and implement the disclosure of the WEB POSITION ADJUSTING DEVICE application if desired. As explained in U.S. Pat. No. 6,886,889, the height adjusters 72, 73 are movably mounted to and configured to associate restraint webs 36 and 37 and respective mounting webs 42 and 43. Adjuster 72, which may for example be of a conventional 3-bar construction, slides up and down the lengths of web 42 and web 36 in order to increase or decrease the operative length of web 36 and thereby properly size the restraint assembly 20 about the shoulders of the passenger or occupant 19. Similarly, adjuster 73 slides up and down the lengths of web 43 and web 37 in order to increase or decrease the operative length of web 37 and thereby properly size the restraint assembly 20 about the shoulders of the occupant 19. It will be appreciated that cross-member 59 illustratively would set the upper limit of movement of the adjusters 72, 73, while the shoulders of the occupant 19 generally would set the lower limit of movement, provided that the occupant's shoulders are higher than the optional chest strap 32 and/or the connecting member 44, which would otherwise set the lower limit of movement. Of course, in order to accommodate taller occupants, the cross-member 59 could be placed further up on the mounting webs 42, 43, or, as noted, could be removed altogether if desired. Examples, without limitation, of suitable harness clips are found in commonly owned U.S. Pat. No. 5,839,793 and U.S. Pat. No. 5,873,635, both of the disclosures of which are now incorporated herein by reference.

As another option, the restraint assembly 20 may be equipped with the aforementioned chest web or strap 32 or other suitable flexible or semi-flexible member. One end of the optional chest web 32 may be attached directly to either over web 42 or over web 43, with the opposing end of web 32 being coupled to a tongue 33, or a buckle 34, configured to mate with a corresponding buckle or tongue attached to the other over web 42 or 43 as the case may be. In the alternative, as seen in FIGS. 1 and 3, each opposing end of chest web 32 may be equipped with either a buckle or a tongue, or one end could have a tongue and the other end a buckle, which is configured to mate with a buckle or tongue, as the case may be, attached to the respective over web 42, 43. Illustratively, a web adjuster may be included on one or both ends of the chest web 32 to adjust the operable length and fit of the chest web 32 about an occupant 19. The chest web 32 may be eliminated (FIG. 9) or may underlie (FIGS. 1 and 9) or overlie (FIGS. 3 and 9) the shoulder webs 36 and 37 as desired in any of the illustrative embodiments.

Figure 8:
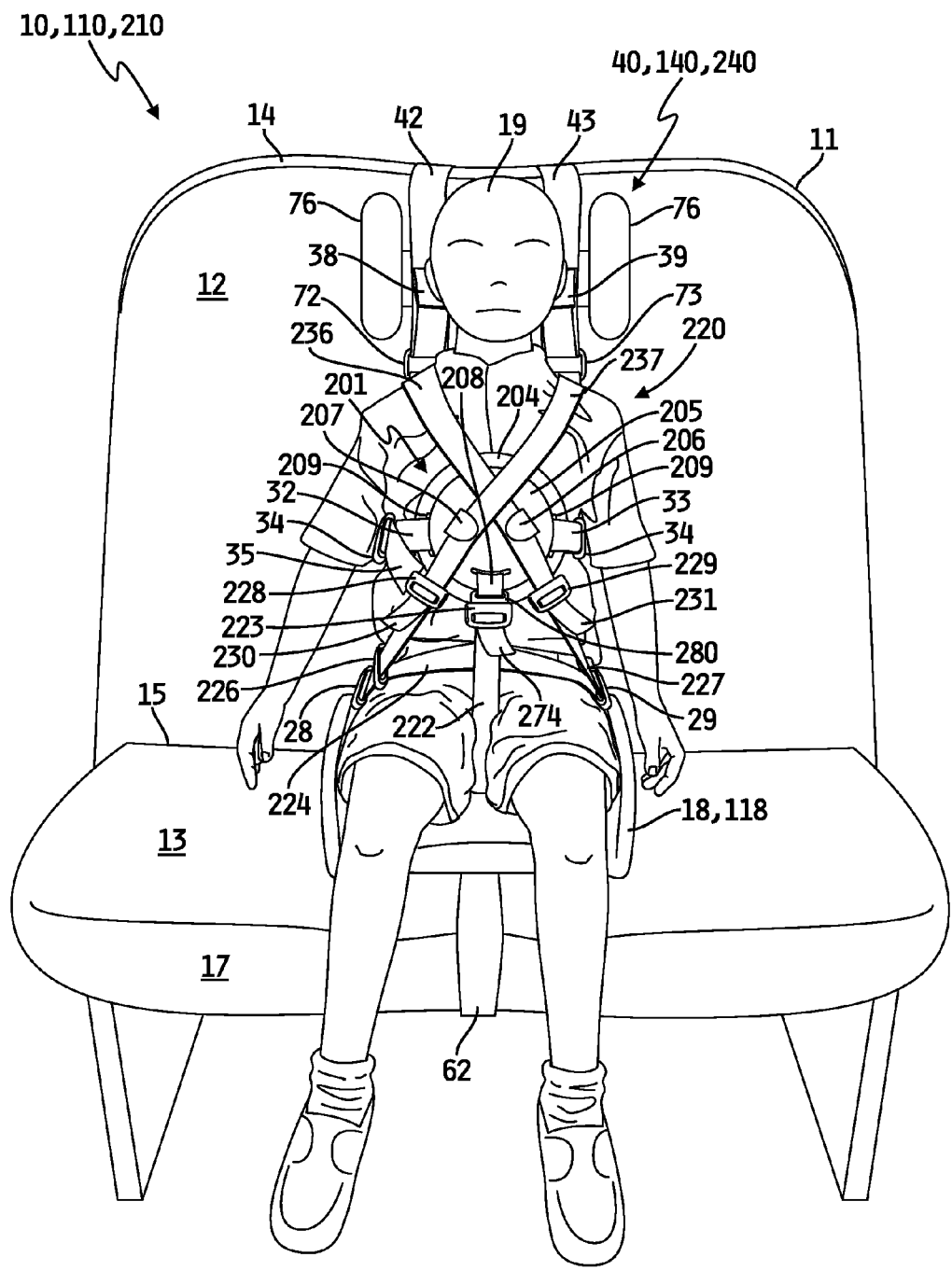
FIG. 8 is a front view of a seat having another exemplary embodiment of an illustrative restraint system mounted thereto.

The embodiment of FIG. 8 comprises another illustrative restraint assembly 220 that may provide additional support for an occupant, including without limitation a special needs passenger. Restraint assembly 220 illustratively is configured for use with any of vehicle restraint systems 10, 110, 210, 310 and generally comprises a torso or chest support assembly 201, a connecting member 222, and two lengths 236 and 237 of any suitable flexible or semi-flexible material such as for example without limitation a web, belt, rope, strap, and the like, having respective first ends 230 and 231 and respective opposing second ends 38 and 39. Second end 38 is attached to over web 42 and second end 39 is attached to over web 43 by any suitable means, such as for example without limitation by stitching, tape, hook and loop, cement, glue, melting, snaps, buttons, zippers, tacks and the like. A cross-member 59 (FIG. 3), as described above, may extend between over webs 42 and 43 and may be attached thereto and to webs 236 and 237 over or adjacent to ends 38 and 39. Other cross-members (not shown) may be spaced apart along the lengths of over webs 42 and 43 to further associate over webs 42 and 43. Opposing end 231 illustratively is threaded through tongue 227 and one or more web adjusters, such as for example and without limitation web adjuster 229. In any event, tongue 227 is configured to engage with a conventional buckle and or combination buckle/adjuster 29 attached to the base 18, 318 at for example anchor point 81 (FIGS. 6 and 10) to releasably lock or secure the length of web 236 to the booster or base 18, 118, 318. Alternative configurations are also contemplated. For example, and without limitation, tongue 227 could be integrated with a web adjuster to replace web adjuster 229. Illustratively, the opposing end of web 237 opposite to end 39 may be attached to base 18, 118, 318, for example at anchor point 81 (FIGS. 6 and 10) in the vicinity of adjuster 28 in FIG. 8. Alternatively, the opposite end may be attached to an illustrative midbelt web adjuster 228. Another length of web 224 could be attached at one end to the booster base 18, 118, 318 at for example anchor point 81 (FIGS. 6 and 10) in the vicinity of adjuster 28 depicted in FIG. 8, with opposing end 230 threaded through web adjuster 228. In either event, a tongue 226 may be disposed on the web portion between the torso portion 337 and where the opposing end attaches to the base 18, 118, 318; illustratively between the web adjuster 228 and the base attachment. When the tongue 226 engages a buckle or combination adjuster and buckle 28, a lap portion 224 is formed. Illustratively, connecting member 222 is attached at one end to the base 18, 118, 318 for example at anchor point 82 (FIGS. 6 and 10) and is equipped at its opposite end 274 with a web adjuster 223. Connecting member 222 may be any suitable flexible, semi-flexible, rigid, or semi-rigid material. In addition, a central type adjust system could be used, such as for example and without limitation as disclosed in commonly owned and previously incorporated by reference U.S. Pat. No. 4,679,852.

Restraint assembly 220 illustratively further comprises a chest or torso support assembly 201. Torso support assembly 201 generally comprises a chest pad 204 and a web guide member 205. Illustratively, chest pad 204 may be formed of a cushioning material such as for example and without limitation rubber or foam, while the web guide member 205 may be formed of a rigid or semi-rigid metallic, non-metallic or composite material such as for example and without limitation plastic. Illustratively, the chest pad 204 and web guide member 205 have a generally circular shape, although all shapes are contemplated, such as for example triangular, square, rectangular, ovate, octagonal and the like without limitation. It will also be appreciated that the chest pad 204 and web guide member 205 could comprise a single member. In any event, a pair of guide clips 206 and 207 are formed on, and a guide channel 209 is formed through the torso support assembly 201. A web extension member 208, which may be any suitable flexible, semi-flexible, semi-rigid or rigid member, is formed on or attached to the torso support assembly 201 by any suitable means. The extension member 208 is illustratively equipped with a tongue 280 configured to engage combination buckle and web adjuster 223, it being appreciated that the combination buckle/adjuster could just be a buckle 223. It will further be appreciated that the tongue/buckle portion of the tongue 280 and buckle/adjuster 223 combination may be of the quick disconnect type of tongue 280 and buckle 223. Illustratively, chest web or strap 32 or other suitable flexible, semi-flexible or semi-rigid member is threaded through the guide channel 209. One end of the chest web 32 may be associated or coupled directly to either over web 42 or over web 43, with the opposing end of web 32 being coupled to a tongue or a buckle 34, configured to mate with a corresponding buckle or tongue attached to the other over web 42 or 43 as the case may be. In another embodiment, as seen in FIGS. 1 and 3, each opposing end of chest web 32 may be equipped with either a buckle or a tongue, or one end could have a tongue and the other end a buckle, which is configured to mate with a buckle or tongue, as the case may be, attached to the respective over web 42, 43. Illustratively, a web adjuster may be included in the buckle/tongue 34 combination on one or both ends of the chest web 32 to adjust the operable length and fit of the chest web 32 about an occupant or passenger 19.

In operation, the chest web 32 is wrapped about the occupant 19 and the tongue/buckle/adjuster 34 operated to lock and adjust the fit of the web 32 about the occupant or passenger 19 and to properly position the torso support assembly 201 on the occupant or passenger 19. The shoulder webs 236 and 237 may then be drawn across the occupant or passenger 19 as follows. Web 236 illustratively is drawn across the passenger 19, threaded through guide portion or clip 206, and secured by engaging tongue 227 with its corresponding buckle. The fit of the web 236 may then be adjusted by operation of the web adjuster 229. Similarly, web 337 may be drawn diagonally across the occupant 19 and the tongue 226 engaged with its corresponding buckle as shown and thereby drawing the lap portion 224 across the lap of the occupant 19. The fit of the lap portion 224 and the web 337 may be adjusted with the web adjuster 228 or other suitable web adjuster. It will be appreciated that the lap portion 224 could also be attached at one end to a web retractor. Tongue 280 may be engaged with buckle/adjuster 223, with the adjuster 223 operable to adjust or vary the length of the extension member 222. It will be appreciated that the above sequence is illustrative only, such that any of the webs 32, 236, 237, 222 and their associated tongue/buckle connections may be made in any desired order. Moreover, the webs 236 and 237 could be threaded under the guide members or clips 206 and 207 after the tongue 226, 227 and buckle engagements are made. The fit of the restraint assembly 220 may be further adjusted, at any desired time, by use of optional and conventional height adjusters 72 and 73 as described herein above or in the previously incorporated co-pending and co-owned WEB POSITION ADJUSTING DEVICE application No. 60/617,160. The restraint assembly 220 may be configured for use with any of the mounting assemblies 40, 140, 240, 340 and systems 10, 110, 210, 310 and variations thereof described herein.

Figure 12A:
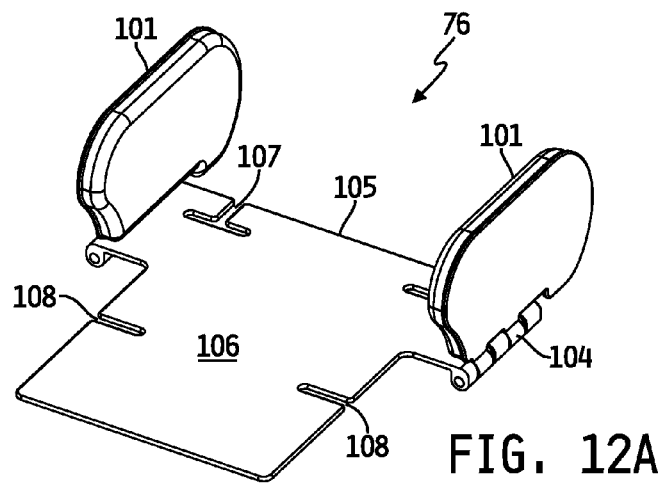
FIG. 12A depicts another illustrative cover for use with any of the illustrative embodiments and having another illustrative lateral support assembly in a deployed position.
Figure 12B:
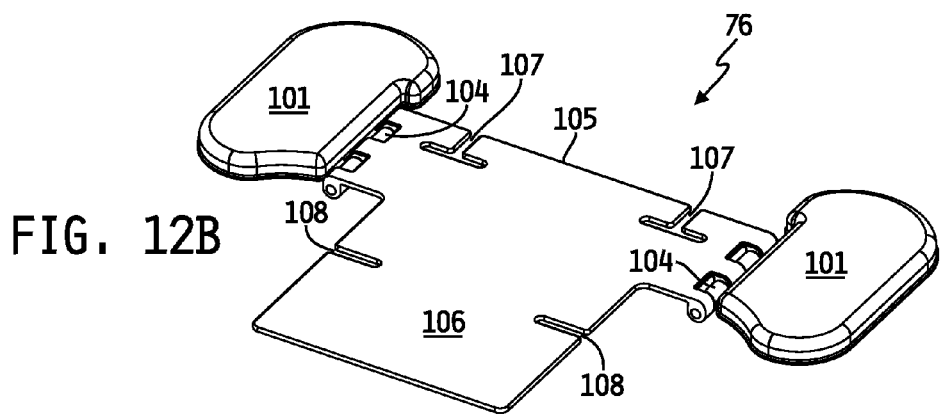
FIG. 12B depicts the illustrative cover of FIG. 12 with the lateral support assembly in a stowed position.
Figure 12C:
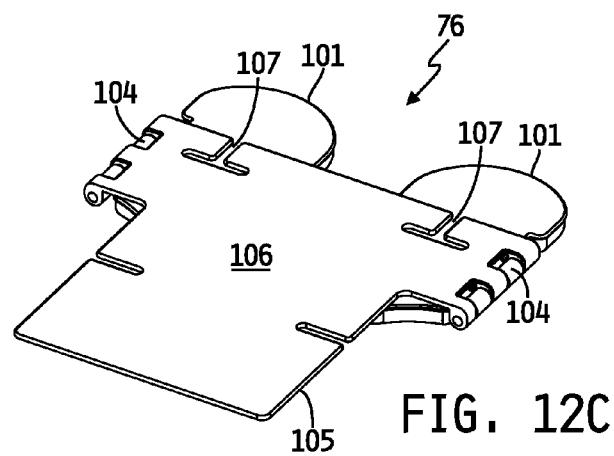
FIG. 12C depicts the illustrative cover of FIG. 12 with the lateral support assembly in an intermediate position between the stowed and the deployed positions.
Figure 13:
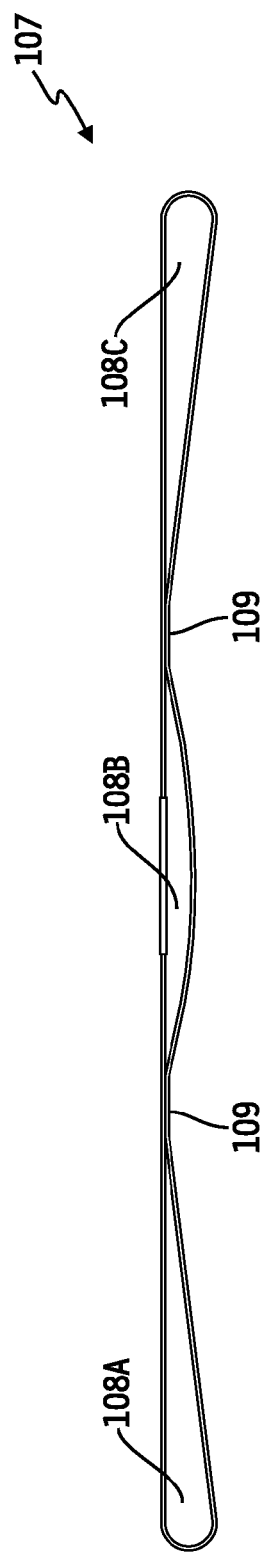
FIG. 13 depicts an illustrative positioning piece for use with any of the illustrative embodiments.

Also depicted in FIG. 8 is an illustrative lateral support assembly 76. As best seen in FIGS. 12A-12C, lateral support assembly 76 illustratively comprises a pair of spaced apart wings 101 movably coupled to a mounting member 105 having a front facing-surface 106, a pair of spaced-apart upper mounting slots 107, a pair of spaced-apart lower mounting slots 108. The wings 101 may have suitable cushioning over a suitable rigid or semi-rigid support structure (not shown). The support structure, and the mounting member 105 for example and without limitation may be formed from any suitable rigid or semi-rigid, metallic, non-metallic or composite material such as plastic or the like. The cushioning may be foam, rubber or other suitable material and may be covered by cloth or other suitable material if desired. The support assembly 76 may be removable and adjustable. For example, the support assembly 76 could be mounted to the seat 11 or to appropriate portions of the mounting assemblies 40, 140, 240, 340 and/or restraint assemblies 20, 220. For example and without limitation the over webs 42, 43 may be threaded through the respective mounting slots 107, 108 of illustrative mounting member 105. The webs 42, 43 could be threaded upwardly (relative to the page of FIG. 12A) through slots 108 and proceed across front-facing surface 106 and downwardly through slots 107; or, they could be thread downwardly through slots 108 and along the back-facing surface opposite to surface 106 and upwardly through slots 107. It is unimportant how or in what order the webs 42, 43 are threaded through the slots 107, 108. In addition, the support assembly 76 can be mounted to other webs, for example and without limitation, to webs 41, 44, and/or 59, alone or in combination with each other or with webs 42, 43. Additional mounting slots could be formed in the mounting member 105 to accommodate mounting via these other webs. The support assembly 76 could also be mounted by other suitable methods, alone or in combination with each other or with the mounting slots 107, 108, such as by for example hook and loops, snaps, zippers or by any other suitable method or structure. For example and without limitation the support assembly could be attached to the webs 42, 43, or even to the seat back portion 12 by hook and loops or the like. No matter whether mounting member 105 or one or more of the other suitable methods/structures for mounting is used, it is contemplated, that the support assembly 76 may be positioned up and down the length of the occupant or passenger 19 from the occupant's head down to just above the booster seat 18, 118, 318. In addition, multiple support assemblies 76 could be accommodated. So, for example, one support assembly 76 could be positioned about the occupant's head, and another support assembly 76 simultaneously may be positioned under the occupant's arms. Or, as depicted, a single assembly 76 may be positioned about the occupant's 19 head. The wings 101 are movably attached to the mounting member 105, or other suitable structure, by illustrative hinges 104. The hinges are configured with sufficient tension to allow the wings to be moved to a desired position without the need to actuate any type of release mechanism and generally retained in that position without the need to engage any type of locking mechanism. If desired, however, any suitable locking and/or release mechanism may be used. As best seen in FIGS. 12A-C, the illustrative wings 101 may be positioned and moved between a position generally parallel and adjacent to front-facing surface 106 (not shown), a position generally perpendicular to mounting member 105 (FIGS. 8 and 12A), a position generally parallel and co-planar with mounting member 105 (FIG. 12B), a position generally parallel and adjacent to the surface opposite front-facing surface 106 (FIG. 12C), and any intermediate positions therebetween.

It will be appreciated that the booster seats 18, 118, 318 may be equipped with a lap belt system alone in lieu of any of the restraint assemblies 20, 220 to restrain the occupant(s) 19. Furthermore, the booster seats 18, 118, 318 could be equipped with just a lap belt for use in combination with the chest web 32 alone or with the chest web and torso support assembly 201 alone. Those skilled in the art will further appreciate that the tongues 26 and 27 in restraint assembly 20 could be replaced by a single tongue configuration known to those skilled in the art. It will also be appreciated that the booster seat 18, 118, 318 could be equipped with a retractor mechanism such as for example and without limitation any automatic locking retractor, which could then be integrated with the restraint system 20, 220. Indeed, any conventional restraint system may be configured for use with the mounting assembly 40, 140, 240, 340 and booster seat 18, 118, 318 combinations.

Figure 7:
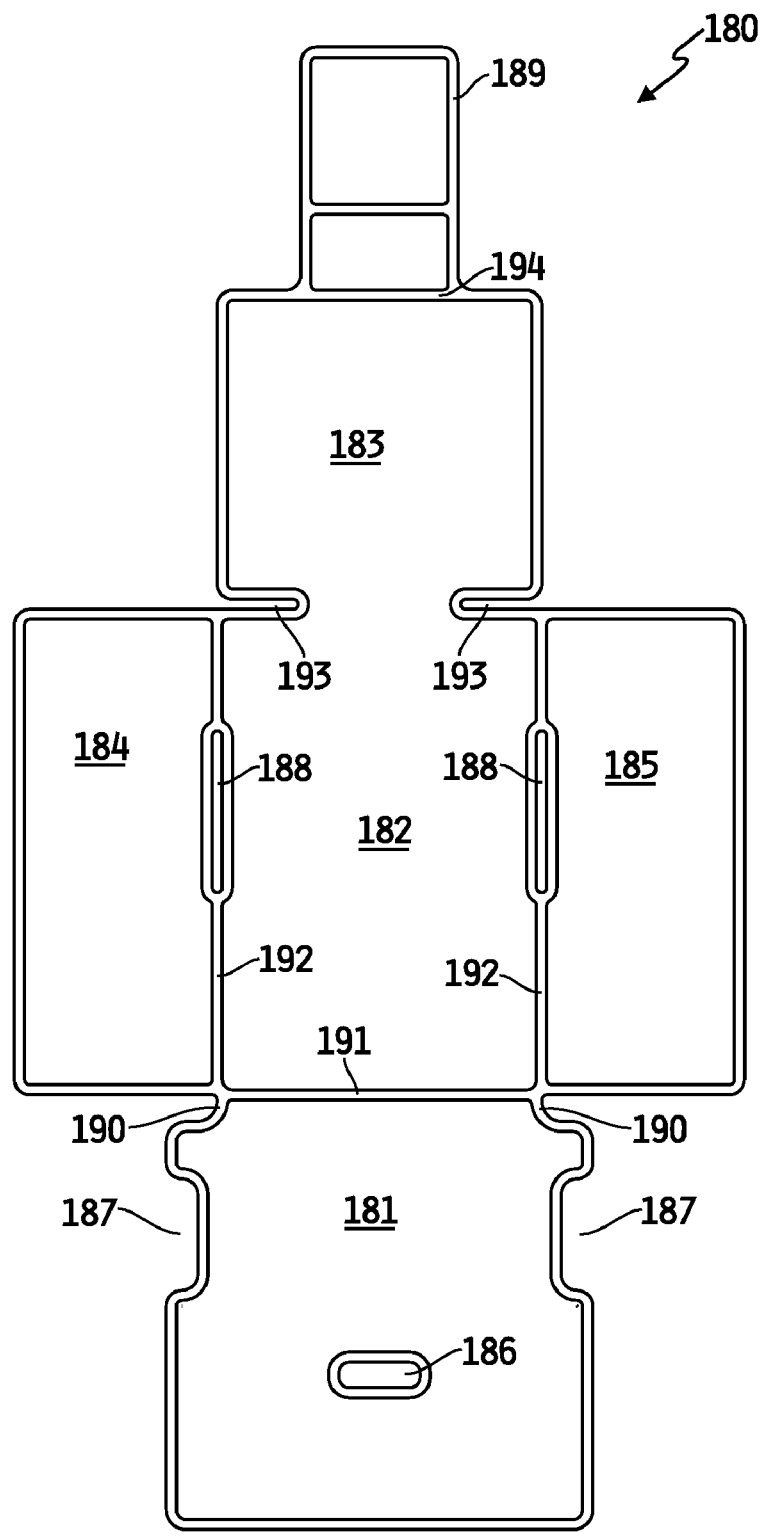
FIG. 7 is a plan view of an illustrative cover for use with any of the illustrative embodiments.

Referring to FIG. 7, an example of an illustrative cover and/or cushion 180 is depicted. The optional cover 180 generally comprises a plurality of panels or sections. For example, an illustrative cover may comprise a seat panel 181, a front panel 182, one or more back panels 184, 185, a head panel 183, and a securing tab 189. The cover 180 may further define a crotch slot 186, restraint belt indentations 187, chest strap slits 188, mounting indentations 190, and shoulder strap indentations 193. Creases or hinges 191, 192, and 194 are provided between the panels. In operation, seat panel 181 may be laid on the upward facing surface of the booster seat 18, then folded approximately 90 degrees at crease 191 so that front panel 182 and head panel 183 lie generally perpendicular to seat panel 181 adjacent the webs 41, 42, and/or 43. Back panels 184, 185 fold at creases 192 and wrap around the webs 41, 42, and/or 43 until the back panels are generally behind and opposite front panel 182 such that the webs 41, 42, and/or 43 are sandwiched between the front panel 182 and the back panels 184, 185. It will be appreciated that the back panels 184 and 185 may overlap each other in whole or in part, or may lie adjacent to each other in side-by-side relation. The webs 42 and 43 will be further sandwiched between the head panel 183 and the seat back 12. The connecting member 22 may be routed through slot 186, the web lap portions 24, 25 may be routed through the indentations 187, the optional chest strap 32 may be routed through the slits 188, and the shoulder straps 36, 37 may be routed through the indentations 193 and then wrapped around and engaged about a passenger 19 as described above. Mounting indentations 190 allow access to the connectors 68 and/or to mounting assembly anchor points 86. Securing panel or tab 189 folds back and around cross member 59 sandwiching the cross member 59 between tab 189 and head panel 183. The cover 180 may be held in place by any suitable method to include without limitation hook and loops, snaps, clasps, zippers, buttons, ties, and the like. The cover 180 may be fashioned out of any suitable natural, synthetic or composite material, such as for example and without limitation, leather, cotton, nylon, spandex, plastic, wool and the like and may contain any natural or synthetic cushioning such as latex, rubber, foam and the like. In addition, the cover 180 could incorporate rigid or semi-rigid materials, whether natural or synthetic, to provide further support if desired. It will be appreciated that the cover 180 may be fitted to any of the illustrative embodiments 10, 110, 210, 310 described and depicted herein. In addition, the support assembly 76 optionally may be mounted to the outside of cover 180 or mounted inside the cover 180 as desired and generally as described above.

Just as restraint system 310 may be mounted to a seat 11 using any one or combination of mounting assemblies 40, 110, 140, 240 described herein, so too any one or combination of the restraint assemblies 20, 220 and variations thereof or other restraint devices and methods described herein, may be used in restraint system 310. Illustratively, for example, FIG. 9 shows three variations of the over webs, chest webs, and mounting webs. So too, FIG. 9 could have depicted one or more of the positions 96A-C with restraint assembly 220. It will be appreciated, that a uniform version is also contemplated, for example each occupant position 96A-C may be equipped with restraint assembly 20, or with restraint assembly 220 and each with the same configuration of over webs, chest webs, and mounting webs.

Figure 14:
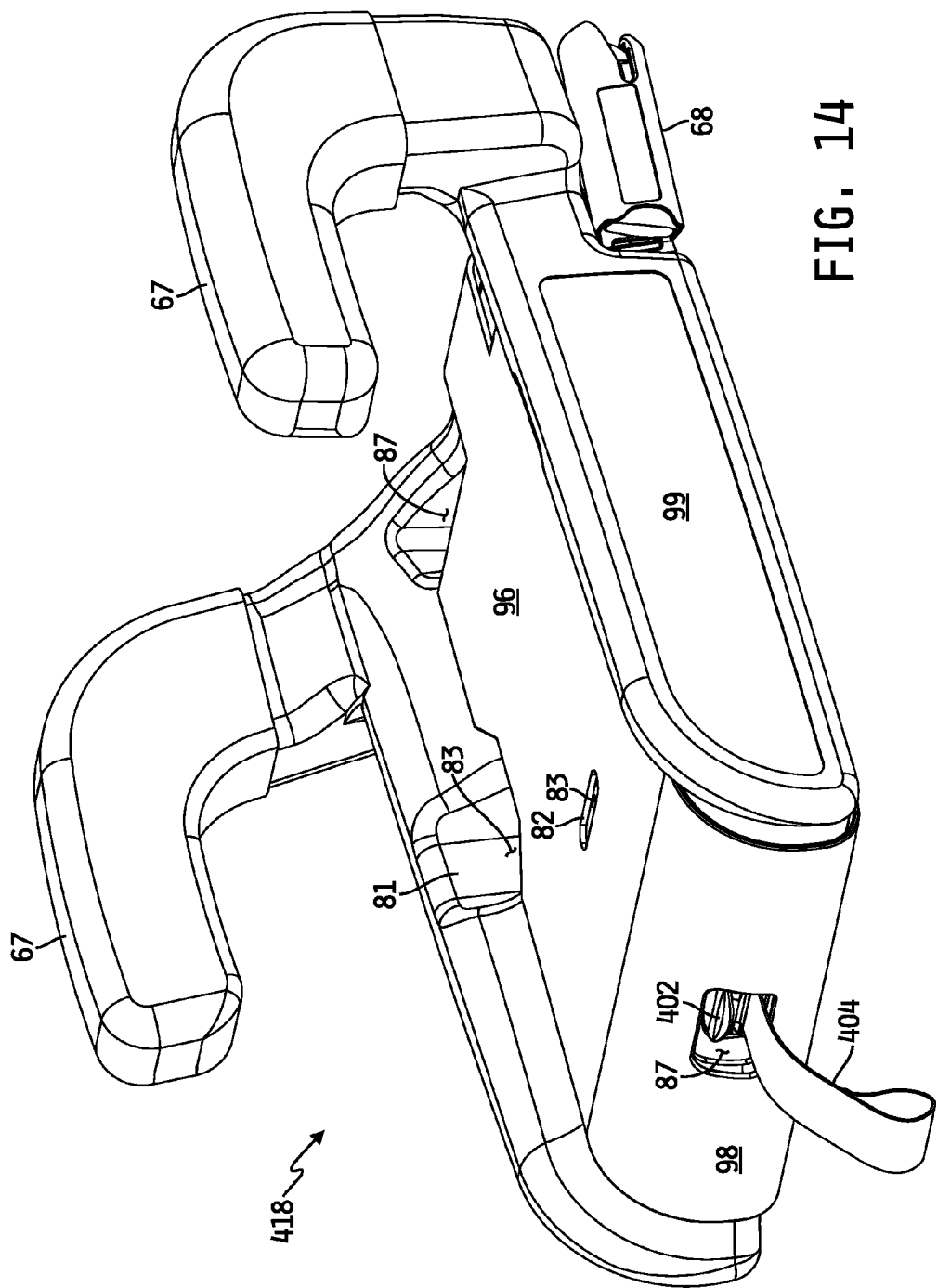
FIG. 14 is a top perspective view of one embodiment of a booster seat including a mounting system for securing the booster seat to a vehicle seat.
Figure 15:
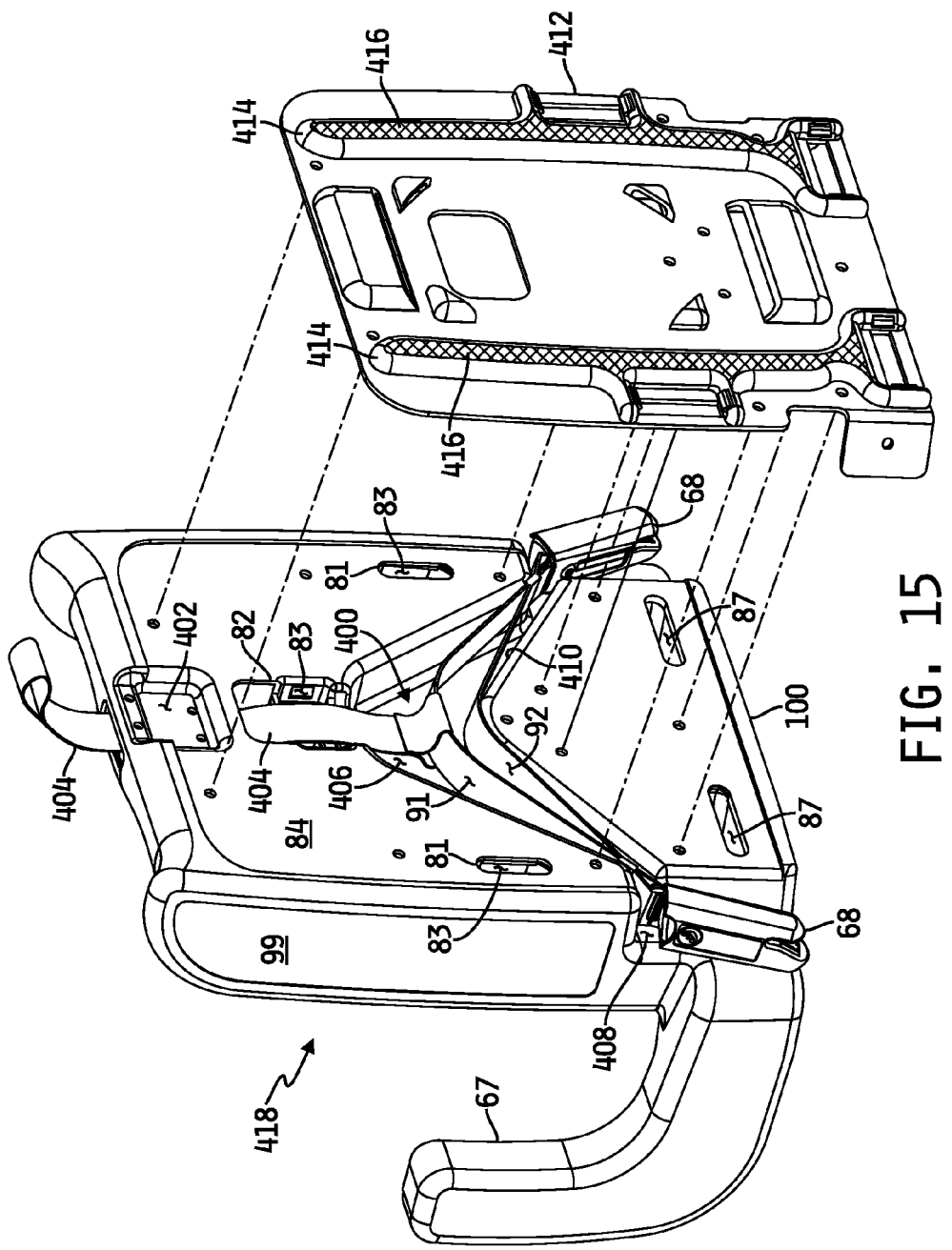
FIG. 15 is a bottom perspective view of the embodiment illustrated in FIG. 14 and shown in partial assembly.

Any of the booster seats 18, 118 and 318 illustrated and described hereinabove may be secured to the vehicle seat 11 via a booster seat mounting system. Referring to FIGS. 14 and 15, one illustrative embodiment of such a booster seat mounting system 400 is shown for mounting another illustrative embodiment of a booster seat 418. It will be understood, however, that the mounting system 400 may be adapted for use with any of the booster seats 18, 118 and 318 illustrated and described herein. In any case, the booster seat 418 is, like the booster seats 18, 118 and 318, a backless booster seat in the sense that it comprises a seat base with no back support. The top side of the booster seat 418 is substantially identical to the booster seat 118 illustrated and described with respect to FIG. 10, and like numbers are therefore used to identify like components and features. While the bottom side of the booster seat 418 is configured somewhat differently than the embodiment 118 illustrated and described with respect to FIG. 11, as will be described in detail hereinafter, it does include many of the features of the booster seat 118 and like numbers are therefore used to identify like components. Additionally, the booster seat 418, like the booster seat 118, is configured to cooperate with a connector retention assembly 90. The connector retention assembly 90 may be as illustrated and described hereinabove with respect to FIGS. 5A, 5B and 6, and like numbers are therefore used in FIGS. 14 and 15 to identify like components. In the embodiment illustrated in FIGS. 14 and 15, the booster seat mounting system 400 includes the connector retention assembly 90, at least one connector 68, a locking web adjuster 402, and a web, belt or tether 404 coupled to the web retention assembly 90 and extending through the locking web adjuster 402. The locking web adjuster 402 may illustratively be a locking web adjuster of the type illustrated and described in commonly owned U.S. Pat. No. 4,660,889, entitled HARNESS WEB ADJUSTER WITH CHILD RESTRAINT SEAT, the disclosure of which is incorporated herein by reference. Alternatively, the locking web adjuster may be any conventional web adjuster operable as described herein.

The locking web adjuster 402 is received within the recess 87 formed through the front face 98 of the booster seat 418, and the locking web adjuster 402 is affixed or otherwise mounted to the booster seat 418 within this recess 87 using one or more conventional fixation structures and/or techniques. The recess 87 formed through the front face 98 of the booster seat 418 is in communication with a generally V-shaped recess or channel 406 defined in the bottom 84 of the booster seat 418. One end of the web 404 is secured to the web portion 91 of the connector retention assembly 90 via a conventional web securing technique, and the opposite end of the web 404 extends through the locking web adjuster 402 as illustrated in FIGS. 14 and 15. The recess or channel 406 is also in communication with connector recesses or ports 408 formed in either side 99 of the booster seat 418 adjacent to a rear wall 100 of the booster seat 418. The recesses or ports 408 are sized to receive and store therein the connectors 68 as described hereinabove with respect to the recesses 103 illustrated in FIGS. 5A, 5B and 6.

In one exemplary embodiment, the locking web adjuster 402 is normally biased in a closed position so that it normally engages the web 404 extending therethrough and thereby inhibits movement of the web 404 therethrough. In this embodiment, the locking web adjuster 402 must be manually manipulated or actuated in a conventional manner to open the locking web adjuster 402, and then manually maintained in the actuated position to allow the web 402 to travel therethrough. When the locking web adjuster 402 then returns to its normally closed position when released. In one alternative embodiment, the locking web adjuster 404 may be manually manipulated or actuated to open the locking web adjuster 402 and allow the web 402 to travel therethrough, and must then be again manually manipulated or actuated to close the locking web adjuster 402. Such specific embodiments of the locking web adjuster 402 are provided only by way of example, and other alternative embodiments of the locking web adjuster 402 are contemplated by this disclosure.

The recesses 81, 83 and 87 formed through the top 96 of the booster seat 418 extend through the bottom 84 of the booster seat 418 as illustrated in FIG. 15. These recesses 81, 83 and 87 are configured to receive and retain web anchors therein as will be illustrated and described hereinafter with respect to FIGS. 16 and 17. A bottom plate 412 is configured to be mounted to the bottom 84 of the booster seat 418 via a number of conventional fixation members. In the illustrated embodiment, the bottom plate 412 defines a pair of elongated protrusions 414 oriented to extend generally between the front face or wall 98 and the rear wall 100 of the booster seat 418. A pair of anti-skid members 416 are sized to be affixed to the elongated protrusions 414. The anti-skid members 416 are formed of one or more conventional anti-skid materials, and may be attached to the bottom plate 412 as illustrated in FIG. 15 to inhibit movement of the bottom plate 412, and hence the booster seat 418, relative to the vehicle seat upon which the booster seat 418 is placed.

Figure 16:
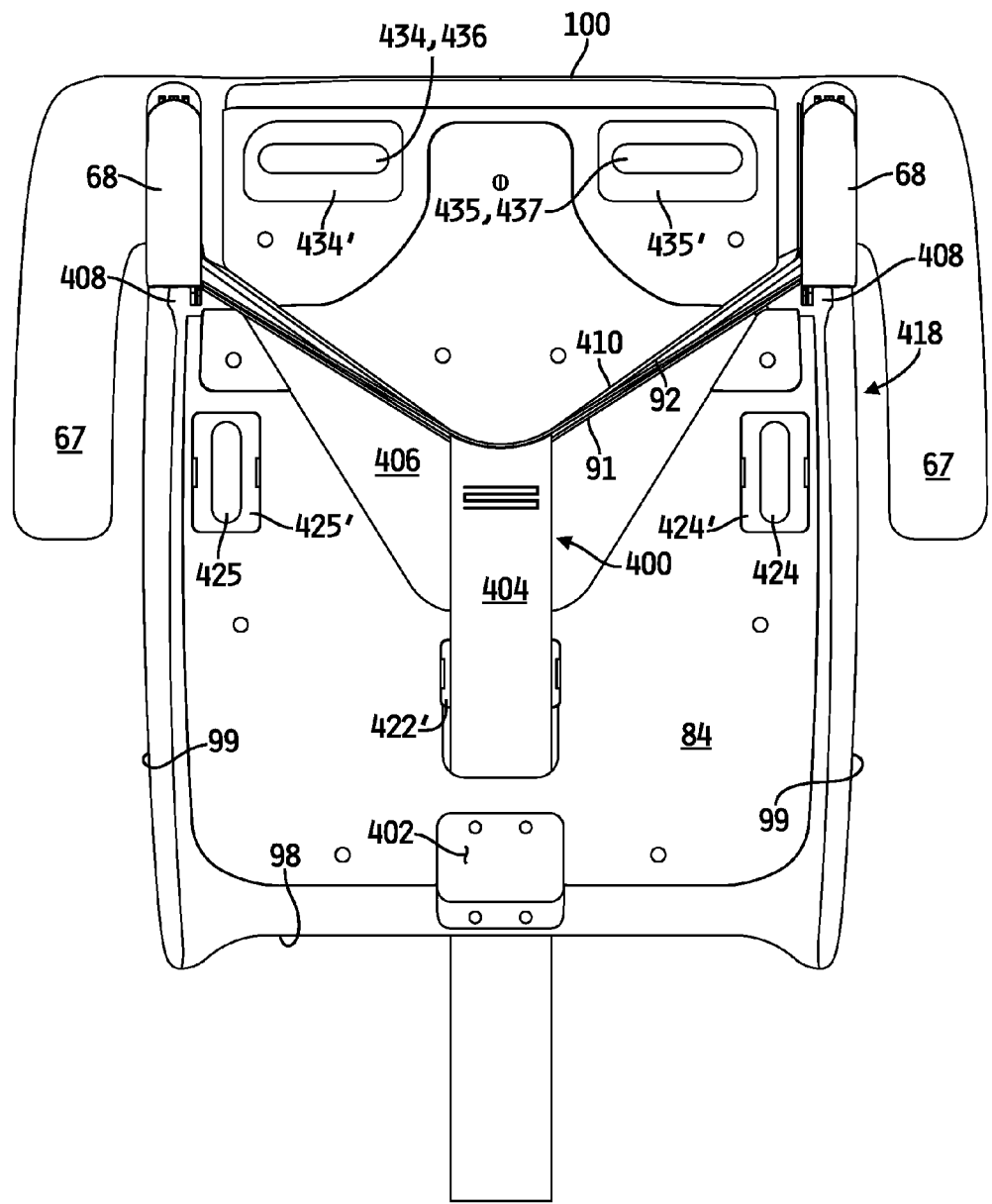
FIG. 16 is a bottom perspective view of the embodiment shown in FIGS. 14 and 15 illustrating operation of the mounting system for securing the booster seat to a vehicle seat.
Figure 17:
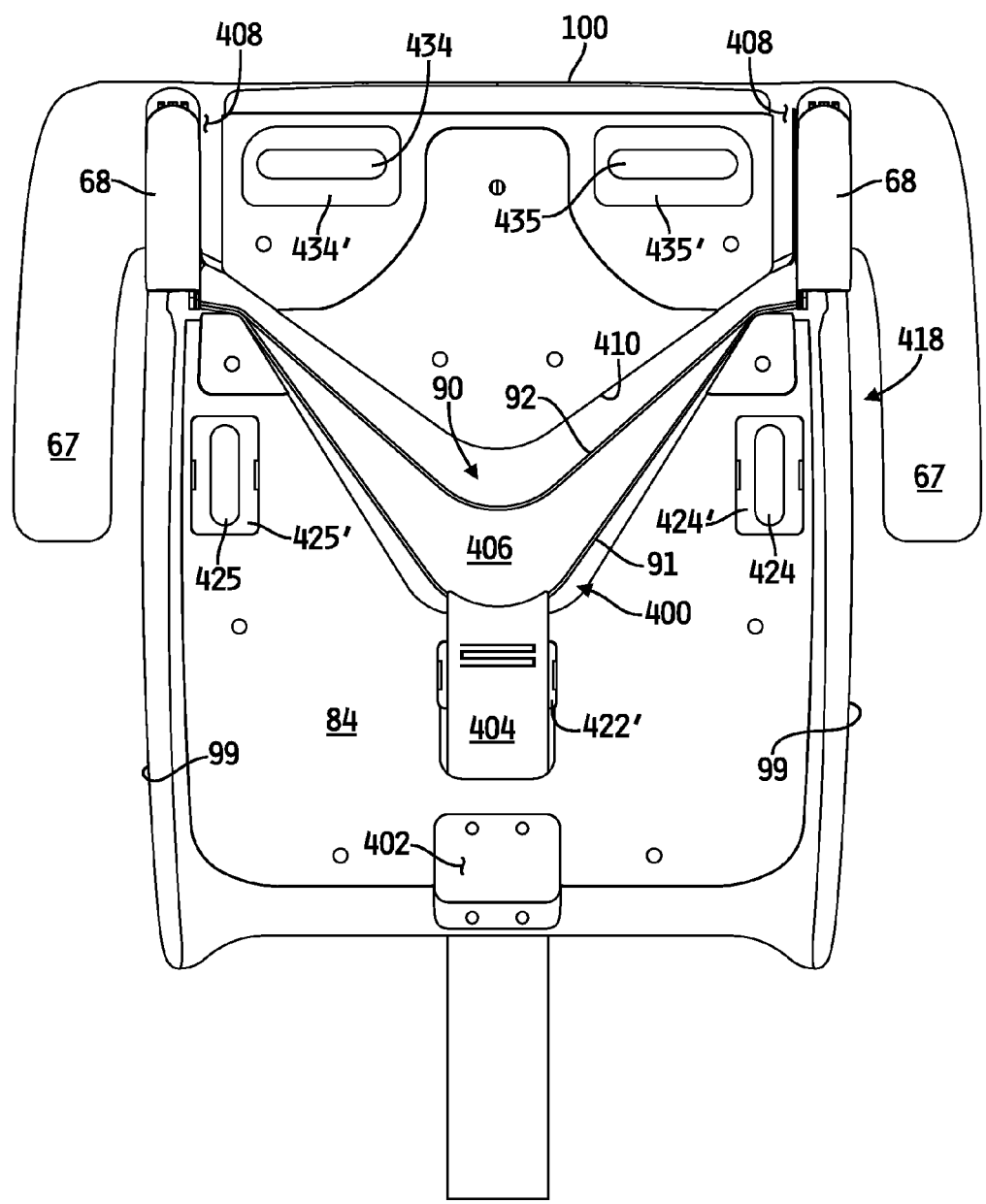
FIG. 17 is another bottom perspective view of the embodiment shown in FIGS. 14 and 15 illustrating operation of the mounting system for securing the booster seat to a vehicle seat.

Referring now to FIGS. 16 and 17, operation of the booster seat mounting system 400 will now be described. As described hereinabove with respect to FIGS. 5A, 5B and 6, the web 91 defines a length between the two connectors 68. The elastic or partially elastic web 92 is sized and suitably attached to the web 91 such that, with no tension applied to the opposing ends of the web 91, the elastic or partially elastic web 92 biases the web 91 to an effective length that is shorter than the otherwise full length of the web 91, as illustrated in FIG. 17. More specifically, with no tension applied to the opposing ends of the web 91, the effective length of the web 91 between its opposing ends is defined by the sum of the length of the web 91 between one end of the web 91 and its attachment point to the web 92, the length of the web 92 in its relaxed state, and the length of the web 91 between its opposite end and its attachment point to the web 92. The force of the web 92 biasing the web 91 to a shorter effective length has the effect of generally drawing and maintaining the connectors 68 into their respective recesses or ports 408, as illustrated in FIG. 17, when the connectors 68 are not otherwise engaged with an anchorage or other structure. With sufficient slack provided in the web 404, the web 92 is extendable under tension applied to either or both of the ends of the web 91 to allow the web 91 to assume lengths between the shorter effective length illustrated in FIG. 17 and its otherwise full length.

The webs 91 and 92 are illustratively sized to allow the connectors 68 to be drawn away from their respective recesses or ports 408 farther than is typically necessary for engagement with corresponding anchorages provided in the bight 15 of the vehicle seat 11, as illustrated by example in FIG. 3. The slack in the web 91 that provides for this feature facilitates connection of both connectors 68 to corresponding vehicle seat anchors, particularly in embodiments of the vehicle seat 11 where access by the both connectors 68 to the bight 15 of the seat is difficult. Accordingly, when the connectors 68 of the booster seat 418 are latched or engaged with corresponding anchorages of the vehicle seat 11, slack exists in the web 91. Any force applied to the booster seat 418 in a direction away from the bight 15 of the vehicle seat 11 that is sufficient to overcome the bias of the web 92 would thus, in the absence of the web 404 and locking web adjuster 402, allow corresponding movement of the booster seat 418 away from the bight 15 of the vehicle seat 11.

The locking web adjuster 402 and web 404 cooperate with the webs 91 and 92 and associated connectors 68 to provide a mechanism for securing the booster seat 418 tightly to the vehicle seat 11. Illustratively, the booster seat 418 may be securely mounted to the vehicle seat 11 by first manipulating or actuating the locking web adjuster 402 and advancing a sufficient amount of the web 404 through the locking web adjuster 402 in a direction toward the webs 91 and 92 so that the connectors 68 may be easily drawn away from their respective recesses or ports 408. The connectors 68 may then be latched or engaged with corresponding anchorages of the vehicle seat 11 as described hereinabove. After the connectors 68 are engaged with corresponding anchorages of the vehicle seat 11, the locking web adjuster 402 is again manipulated or actuated to allow movement of the web 404 therethrough. The web 404 is then drawn through the locking web adjuster 402 in a direction away from the webs 91 and 92. One end of the web 404 is affixed to the web 91 so that the travel of the web 404 away from the webs 91 and 92 pulls the web 91 in a direction away from the connectors 68, thereby reducing the slack in the web 91. When sufficient tension is applied to the web 404 in a direction away from the webs 91 and 92, all slack in the web 91 will be removed and the booster seat 418 will be secured to the vehicle seat 11. Further tension may be applied to the web 404 to overcome outward force of conventional seat upholstery and padding to thereby urge or force the rear wall 100 of the booster seat 418 into the bight 15 of the vehicle seat 11. In any case, when the booster seat is sufficiently secured to the vehicle seat 11 as just described, the locking web adjuster 402 is released so that it engages the web 404 and secures the web 404 thereto to inhibit movement of the web 404 in either direction. The booster seat 418 may be removed from the vehicle seat 11 by following the foregoing process in reverse.

Those skilled in the art will recognize other structures and/or techniques for securing the booster 418 to a vehicle seat. In one alternative embodiment, for example, the booster seat 418 may be provided with only a single connector 68. In this embodiment, the end of the web 404 extending into the booster seat 418 may be attached to, or near, the free end of the web 91, and the booster seat mounting system 400 may be otherwise operable as described. Alternatively still, the web 404 may be omitted and the free end of the web 91 may be passed through the locking web adjuster 402, wherein the booster seat mounting system 400 is then otherwise operable as described.

Figure 18:
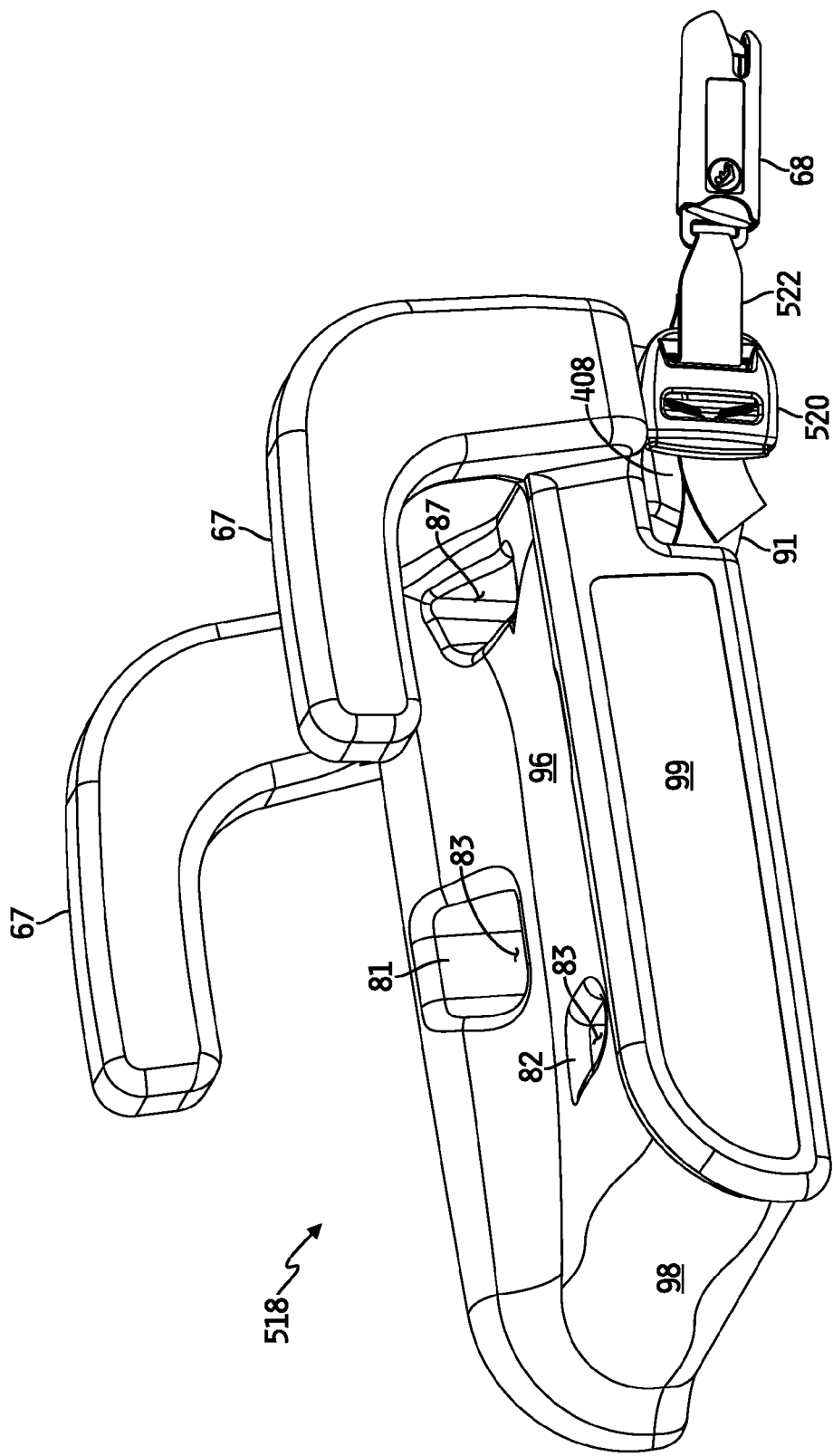
FIG. 18 is a top perspective view of another embodiment of a booster seat including an alternate mounting system for securing the booster seat to a vehicle seat.
Figure 19:
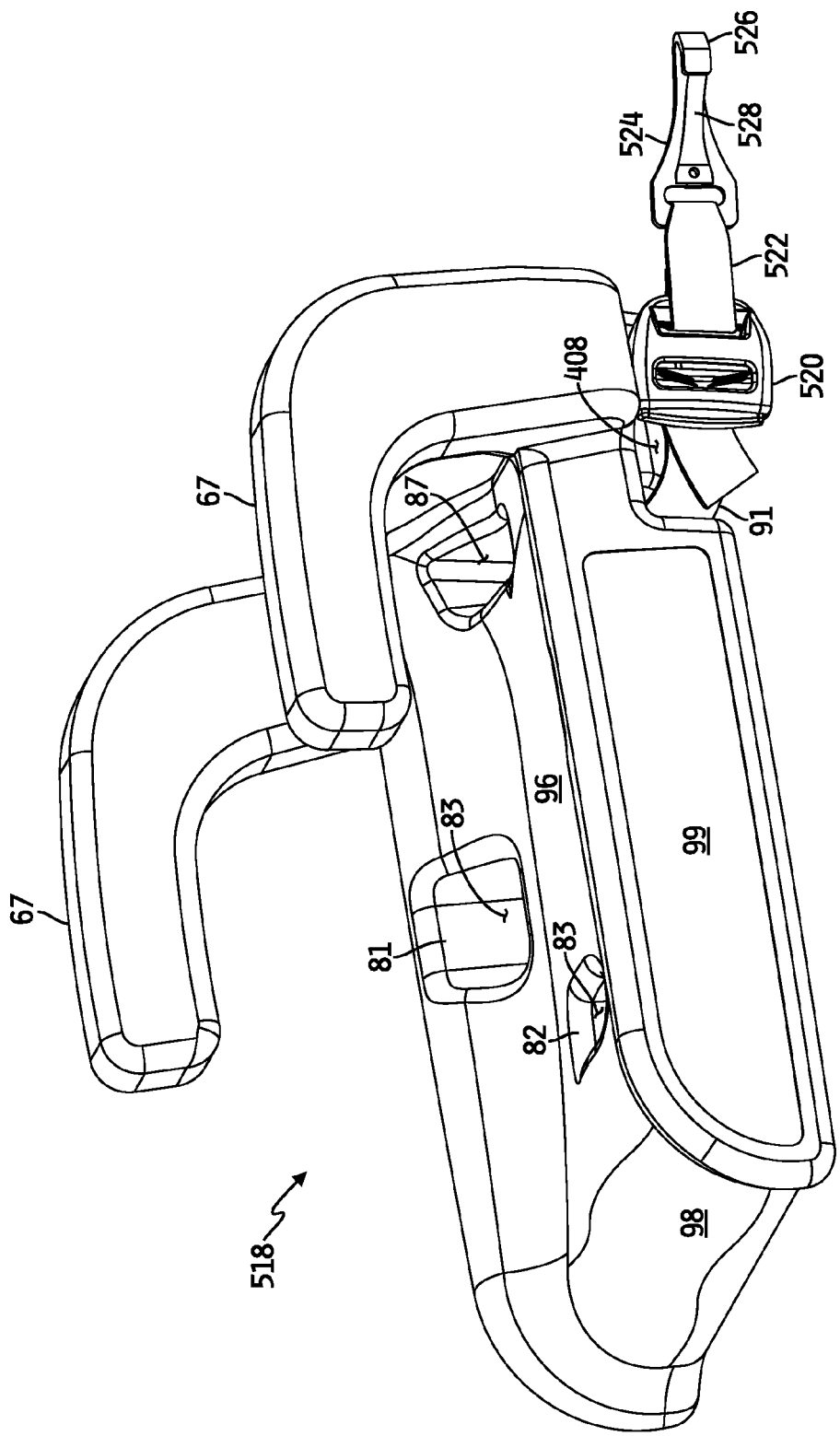
FIG. 19 is a top perspective view of the booster seat of FIG. 18 including another alternate mounting system for securing the booster seat to a vehicle seat.

Another illustrative embodiment of a system for securing a booster seat to a vehicle seat is illustrated in FIG. 18. In this embodiment, a booster seat 518 is provided that is identical to the booster seat 418 except that the recess 87 provided through the front face 98 of the booster seat 418 is omitted in the booster seat 518 of FIG. 18. In the illustrated embodiment, one of the free ends of the web 91 is fed through a conventional web length adjuster 520. The web length adjuster 520 is attached to the connector 68 via a fixed length web 522. After both connectors 68 are engaged with corresponding anchorages of the vehicle seat 11, slack in the web 91 is taken up by pulling the free end of the web 91 through the web length adjuster 520. In an alternative embodiment, a web length adjuster and web 522 may be interposed between each free end of the web 91 and its corresponding connector 68. Yet another illustrative embodiment of a system for securing a booster seat to a vehicle seat is illustrated in FIG. 19. This embodiment is identical to the embodiment illustrated in FIG. 18 except that the connector 68 is replaced by a conventional hook member 524 having a hook-shaped end 526. The hook member 524 may include a conventional stop member 528 configured to normally close the mouth of the hook-shaped end 526 as shown, or may instead omit the stop member 528. In either case, another hook member 524 may or may not replace the connector 68 (not shown) extending from the opposite side of the booster seat 518. The embodiment illustrated in FIG. 19 is otherwise identical in operation to the embodiment illustrated in FIG. 18.

Figure 20:
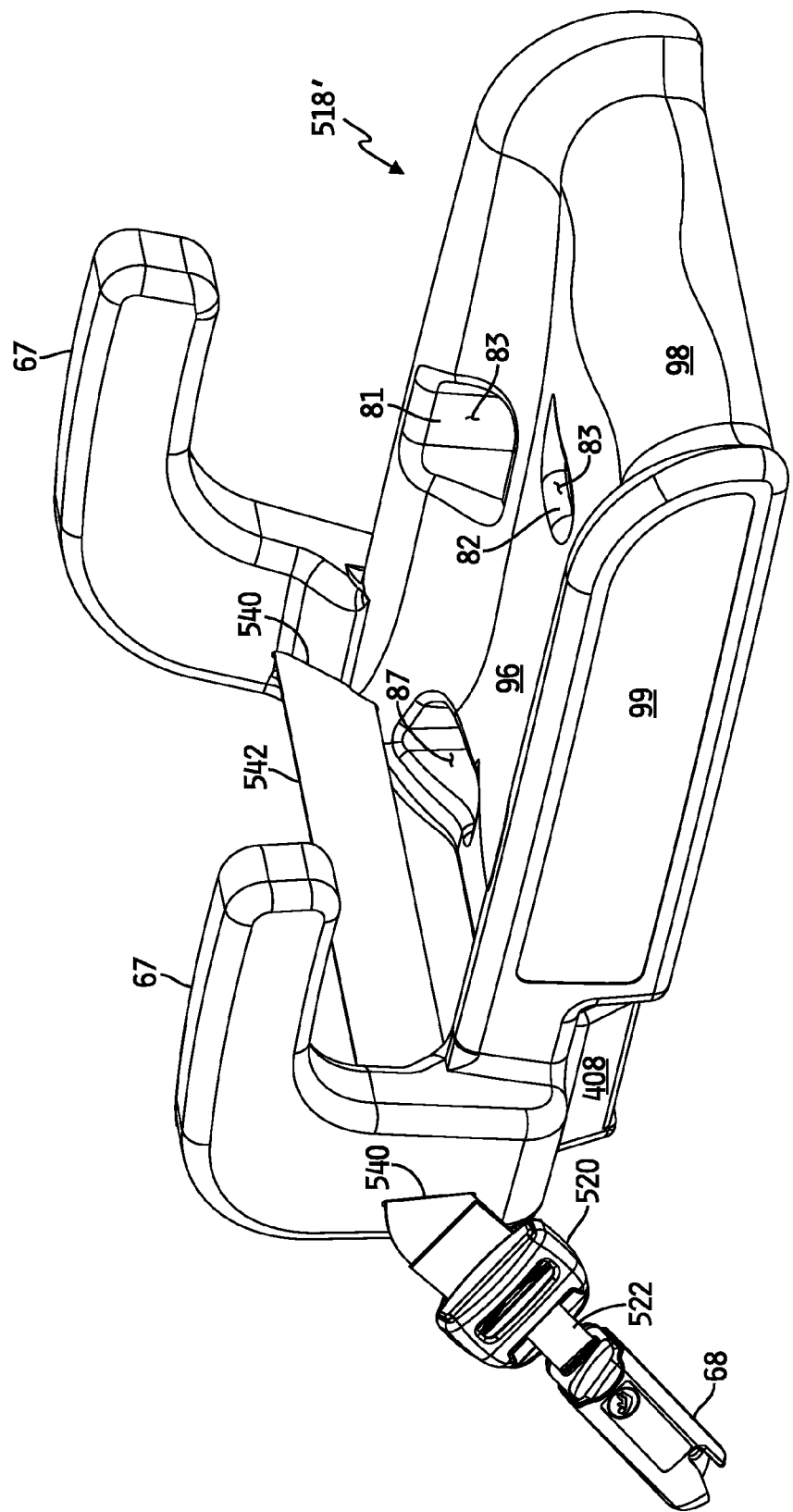
FIG. 20 is a top perspective view of yet another embodiment of a booster seat including an alternate mounting system for securing the booster seat to a vehicle seat.

Still another illustrative embodiment of a system for securing a booster seat to a vehicle seat is illustrated in FIG. 20. In this embodiment, a booster seat 518' is provided that is identical to the booster seat 518 except that each of the arms 67 define a slot 540 therethrough sized and configured to receive a web 542 therethrough. In the illustrated embodiment, one of the free ends of the web 542 is fed through a conventional web length adjuster 520, and the web length adjuster 520 is attached to the connector 68 via a fixed length web 522. The opposite end of the web 542 is, in one embodiment, connected directly to a connector 68 (not shown). After both connectors 68 are engaged with corresponding anchorages of the vehicle seat 11, slack in the web 542 is taken up by pulling the free end of the web 542 through the web length adjuster 520. In an alternative embodiment, a web length adjuster and web 522 may be interposed between each free end of the web 542 and its corresponding connector 68.

Figure 21:
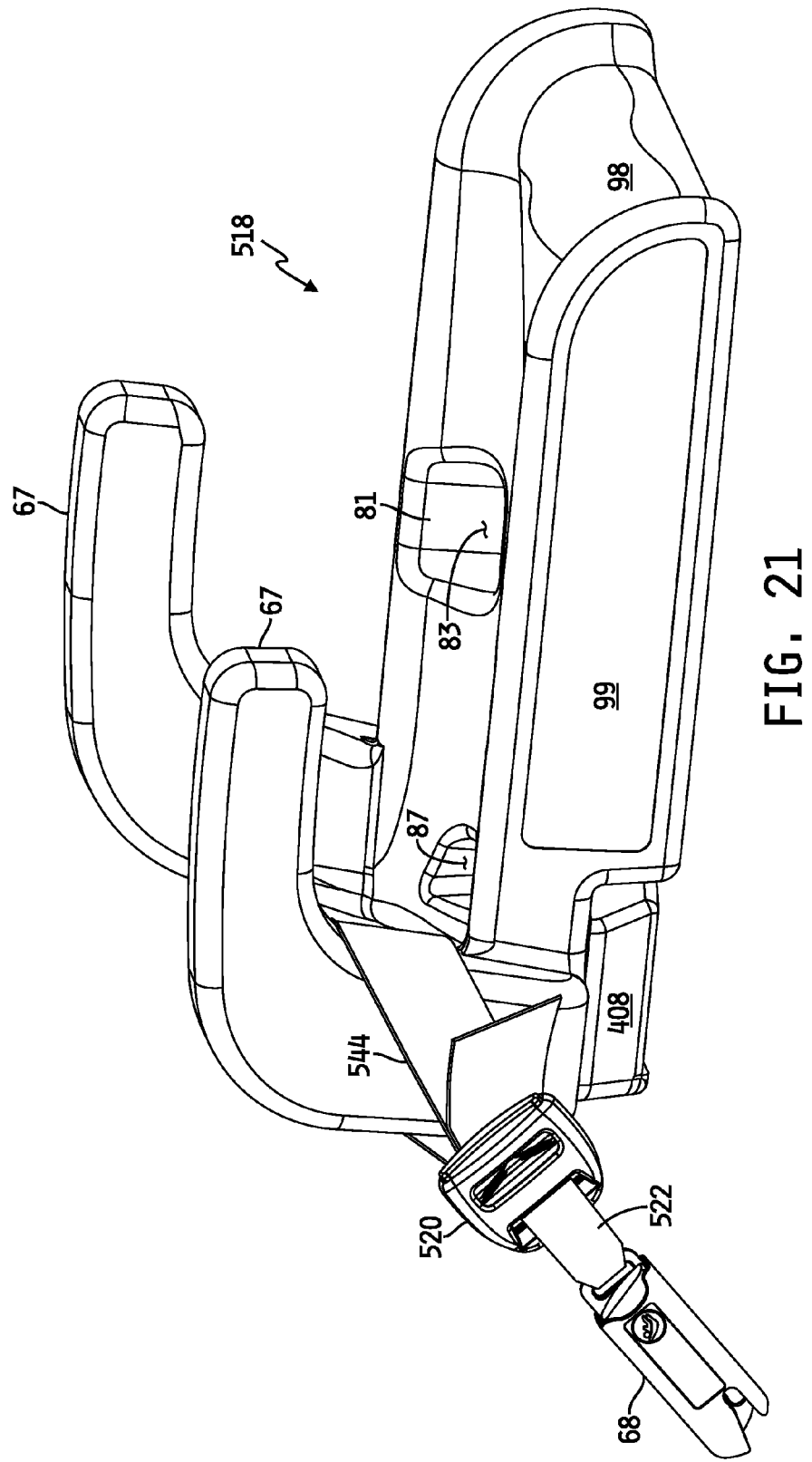
FIG. 21 is a top perspective view of the booster seat of FIG. 18 including yet another alternate mounting system for securing the booster seat to a vehicle seat.

A further illustrative embodiment of a system for securing a booster seat to a vehicle seat is illustrated in FIG. 21. In this embodiment, a web 544 has one free end connected to a conventional web length adjuster 520, and an opposite end extending through the web length adjuster 520. The web length adjuster 520 is attached to the connector 68 via a fixed length web 522. In the illustrated embodiment, the booster seat 518 is secured to a vehicle seat by first passing one of the arms 67 through the loop created by the web 544, and then latching the connector 68 to an anchorage of the vehicle seat. Slack in the web 544 is taken up by pulling the free end of the web 544 through the web length adjuster 520. In an alternative embodiment, the other arm 67 may be passed through a loop created by a second web 544 operatively attached to a web length adjuster 520, web 522 and connector 68 as just described. The connector 68 may then be latched to another anchorage of the vehicle seat, and slack in the web 544 may be taken up by pulling the free end of the second web 544 through the second web length adjuster 520.

Figure 22:
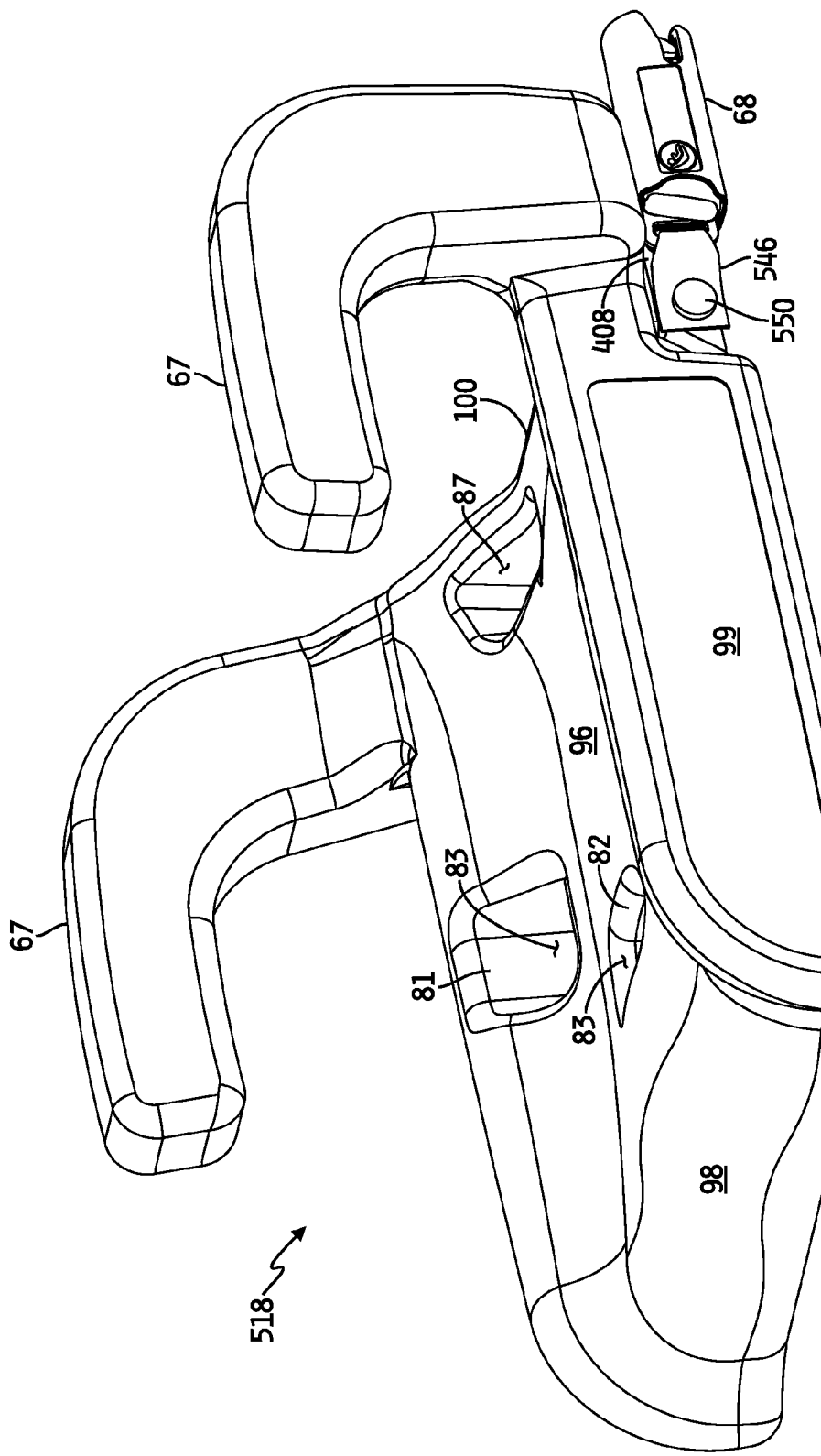
FIG. 22 is a top perspective view of the booster seat of FIG. 18 including still another alternate mounting system for securing the booster seat to a vehicle seat.

Still a further illustrative embodiment of a system for securing a booster seat to a vehicle seat is illustrated in FIG. 22. In this embodiment, one end of a fixed length of web 546 is attached to one side of the booster seat 518, e.g., at the recess or port 408, and the opposite end of the web 546 is attached to a connector 68. One end of another fixed length of web 546 is attached to the other side of the booster seat 518, e.g., at the recess or port 408, and the opposite end of the second web 546 is attached to another connector 68 (not shown). In this embodiment, the web 546 is sized to position the rear wall 100 of the booster seat 518 against or adjacent to the back of the vehicle seat.

Those skilled in the art will recognize other structures and/or techniques for securing the booster seat 418, 518, 518' to a vehicle seat, and any such other structures and/or techniques are contemplated by this disclosure.

Figure 23:
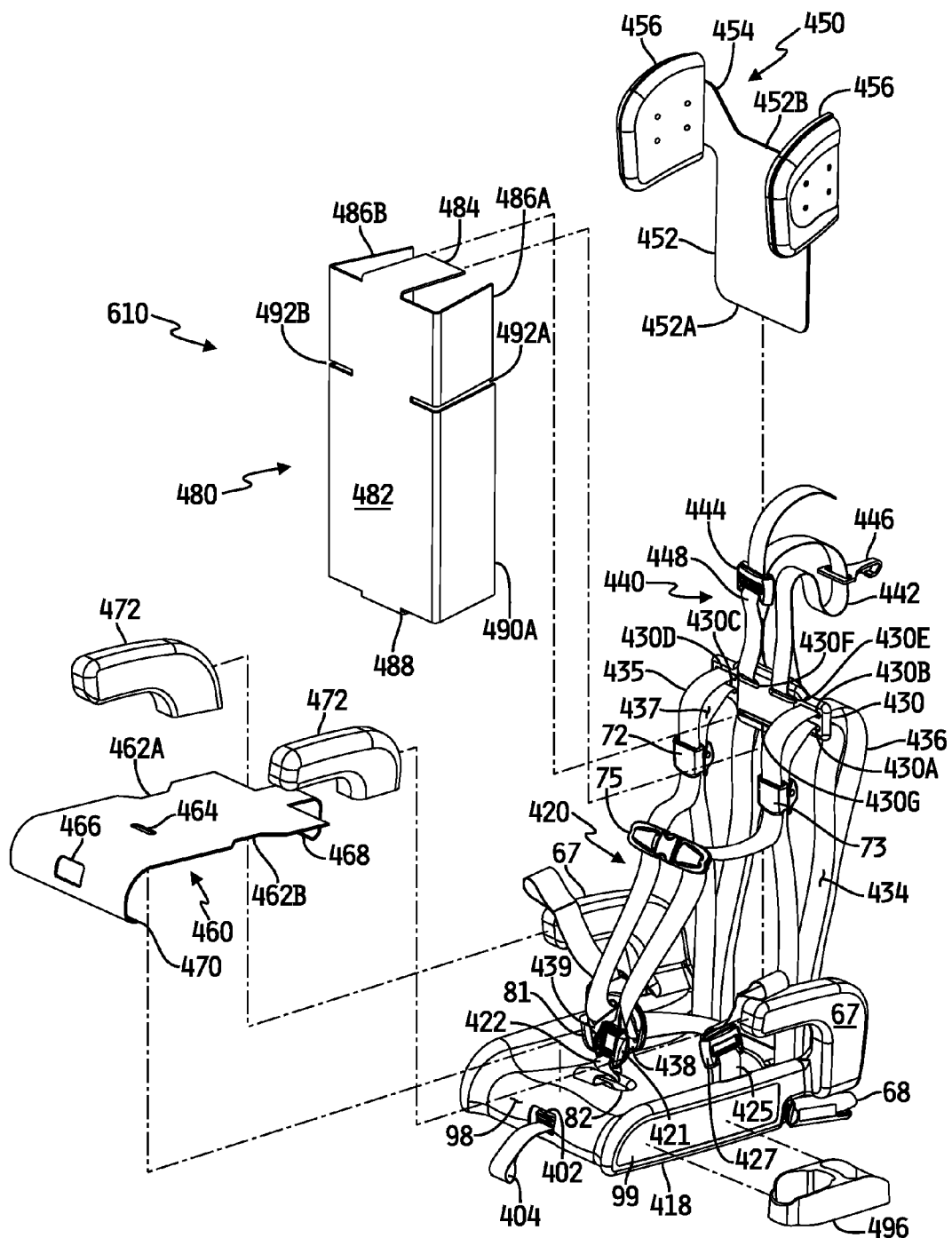
FIG. 23 is a front perspective assembly view of yet another embodiment of the portable restraint system.
Figure 34:
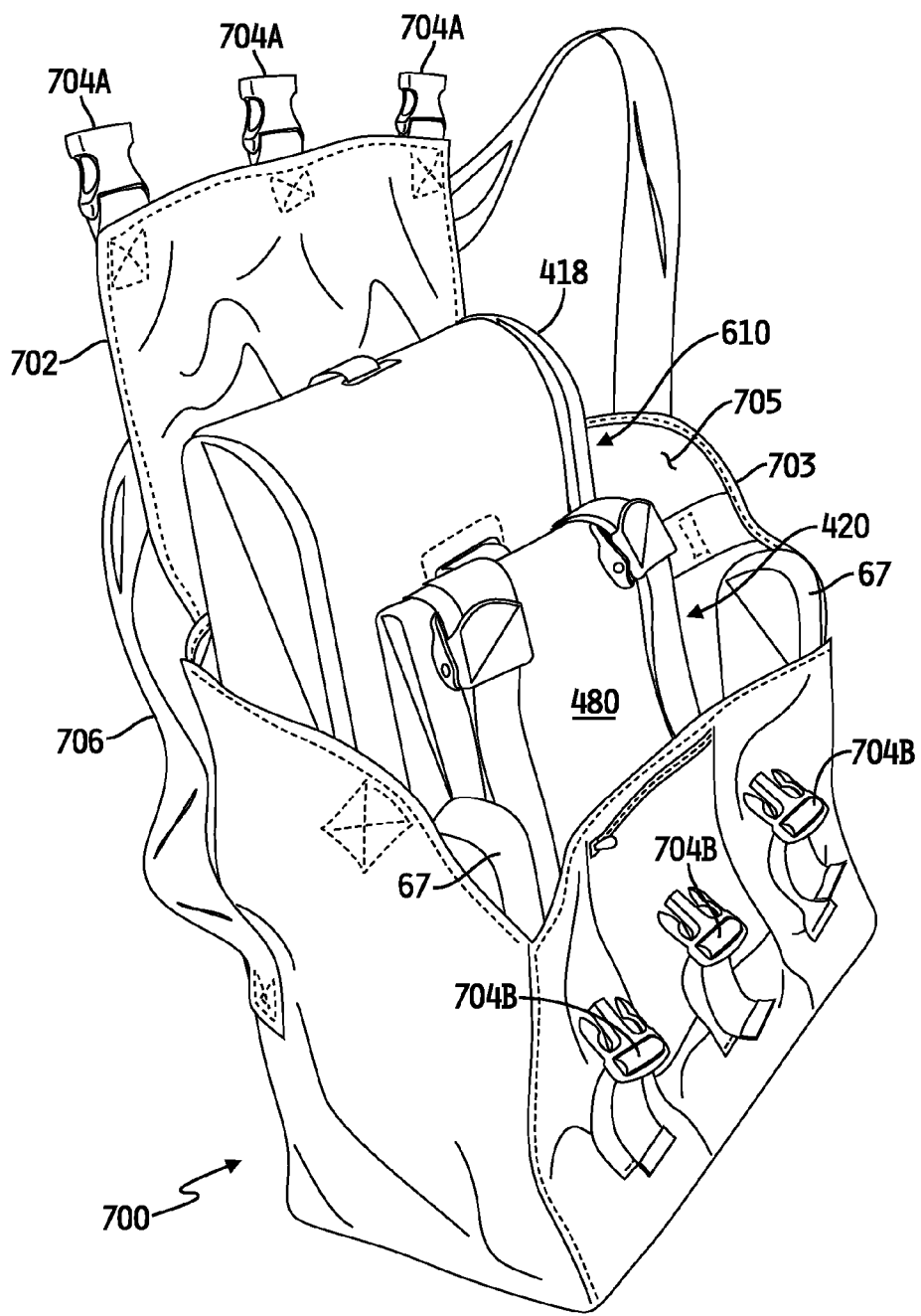
FIG. 34 is a perspective view of a carrying bag configured to receive, store and transport one or more components of the portable restraint system of FIGS. 23-25.

Referring now to FIGS. 23 and 34, assembly and assembled views respectively of another illustrative embodiment of a restraint system 610 is shown. The restraint system 610 is portable and is configured to be mounted to a vehicle seat as described hereinabove. In the illustrated embodiment, the booster seat if shown in the form of the booster seat 418 illustrated and described hereinabove with respect to FIGS. 14-15. In this regard, the restraint system 610 includes the booster seat mounting system 400 illustrated and described with respect to FIGS. 14-17, although it will be understood that the restraint system 610 may alternatively include other embodiments of the booster seat illustrated and described herein, and some such embodiments may include one or more of the alternate booster seat mounting systems illustrated and described herein. In any case, the restraint system 610 includes a multiple-point restraint harness 420 mounted to the booster seat 518.

The multiple-point restraint harness 420 is, in the illustrated embodiment, a five-point restraint harness and will be described as such with reference to FIG. 23, although it will be understood that the restraint harness 420 may alternatively include more or fewer points of attachment. In the illustrated embodiment, the restraint harness 420 includes a crotch strap 422 having one end mounted to the attachment point 82 of the booster seat 418 via a conventional web attachment member 422' (see FIGS. 16 and 17), and an opposite end attached to a conventional buckle 421. Likewise side webs 424 and 425 each have one end mounted to opposite attachment points 81 of the booster seat 418 via conventional web attachment members 424' and 425' respectively (see also FIGS. 16, 17 and 24). The opposite ends of the webs 424 and 425 are attached to conventional web length adjusters 426 and 427 respectively (see also FIG. 24).

One end of a web 434 extends through one of the recesses 87 extending into the booster seat 418 near the rear wall 100, and is attached to a conventional web attachment member 434' positioned in the recess 87 as illustrated in FIGS. 16-17. The opposite end of the web 434 extends through a height adjuster 73 of the type illustrated and described hereinabove, through a slot 430A defined through a web interface member 430, and is then also attached to the web attachment member 434'. One end of a shoulder harness 436 is likewise attached to the web attachment member 434', and an opposite end of the shoulder harness 436 extends through another slot 430B defined through the web interface member 430, through the height adjuster 73, through one side of a conventional web clamp 75, through a slot defined through a conventional tongue member 438 and then through the web length adjuster 427.

One end of another web 437 extends through the other recess 87 extending into the booster seat 418 near the rear wall 100, and is attached to a conventional web attachment member 435' positioned in the recess 87 as illustrated in FIGS. 16-17. The opposite end of the web 436 extends through a height adjuster 72 of the type illustrated and described hereinabove, through a slot 430C defined through the web interface member 430, and is then also attached to the web attachment member 435'. One end of another shoulder harness 435 is likewise attached to the web attachment member 435', and an opposite end of the shoulder harness 435 extends through another slot 430D defined through the web interface member 430, through the height adjuster 72, through the other side of the web clamp 75, through a slot defined through another conventional tongue member 439 and then through the web length adjuster 426 (see also FIG. 24).

The restraint system 610 also includes a mounting harness 440 coupled to the restraint harness 420 through the web interface member 430. In the illustrated embodiment, the mounting harness 440 includes a web 442 having a first end extending through a slot 430E defined through the web interface member 430 and then attached to itself via a conventional technique so that this end of the web 442 is attached to the web interface member 430. The opposite end of the web 442 extends through a slot defined through an anchorage engagement member 446, e.g., an open or closed hook member, and is then attached to a conventional web length adjuster 444. The web length adjuster 444 is attached to one end of another web 448 having an opposite end extending through another slot 430F defined through the web interface member 430 and then attached to itself via a conventional technique so that this end of the web 448 is attached to the web interface member 430.

In the illustrated embodiment, the booster seat 418 may or may not be secured to a vehicle seat as described hereinabove. In either case, the anchorage engagement member 446 is releasably engaged with an anchorage of the vehicle carrying the vehicle seat. In one embodiment, this anchorage is mounted to a rear face of the vehicle seat as illustrated in FIG. 4. Alternatively, this anchorage may be mounted to any surface of the seat bottom portion of the vehicle seat, such as to an underside of the seat bottom, for example. Alternatively still, this anchorage may be mounted to a rear deck located behind the vehicle seat. In passenger cars, for example, the rear deck may be a rear shelf located behind and above the vehicle seat, whereas in sport utility vehicles the rear deck may comprise the floor of a cargo area of the vehicle. Alternatively still, the anchorage may be mounted to a rear wall of the vehicle, such as a rear wall of a pickup truck. Alternatively still, the anchorage may be mounted to a ceiling or frame near the ceiling of the vehicle. This anchorage may alternatively be mounted in other locations relative to the vehicle. In any case, after the anchorage engagement member 446 is engaged with the anchorage of the vehicle, slack is taken out of the web 442 by pulling the free end of the web 442 through the web length adjuster 444. The act of taking the slack out of the web 442 also properly positions the web interface member 430, and thus the shoulder harnesses 435 and 436, relative to the vehicle seat. An occupant (not shown) may then be placed in the booster seat 418, and the restraint harness 420 may be engaged and tightened around the occupant in a conventional manner. The height adjusters 72 and 73 may be manipulated in a known manner to adjust the height, relative to the booster seat 418, that the shoulder harnesses 435 and 436 respectively extend forwardly from the webs 437 and 434 respectively. The web clamp 75 may slide relative to the shoulder harnesses 435 and 436 in a conventional manner to a desired position relative to the occupant's midsection. The tongue members 438 and 439 are releasably engageable with the buckle 421 in a conventional manner. The length of the shoulder webs 435 and 436, and therefore the tightness of the restraint harness 420 about the occupant of the booster seat 418, may be adjusted by advancing the webs 435 and 436 in either direction through the corresponding web length adjusters 426 and 427.

Figure 24:
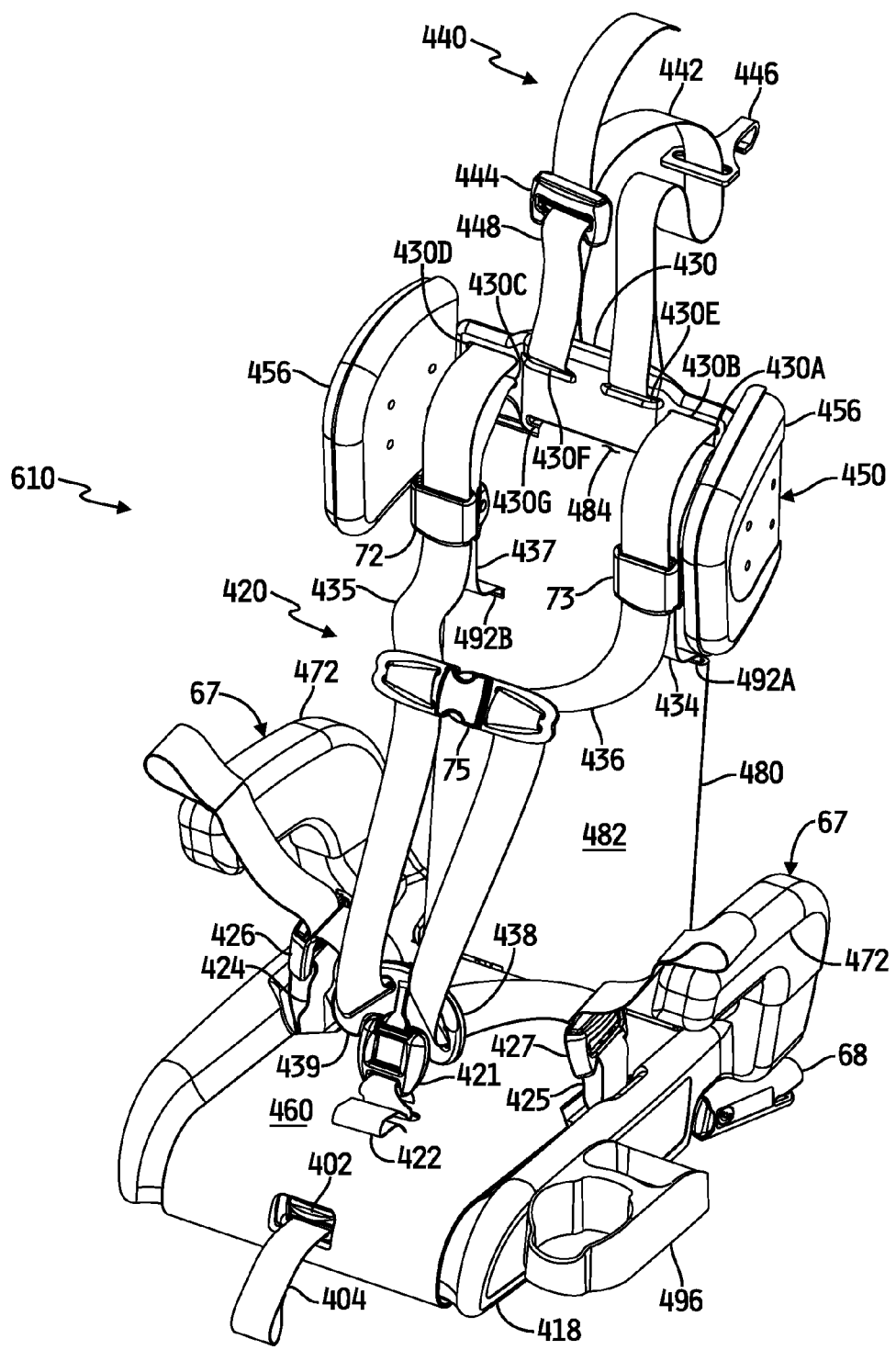
FIG. 24 is a front perspective assembled view of the embodiment illustrated in FIG. 23.
Figure 25:
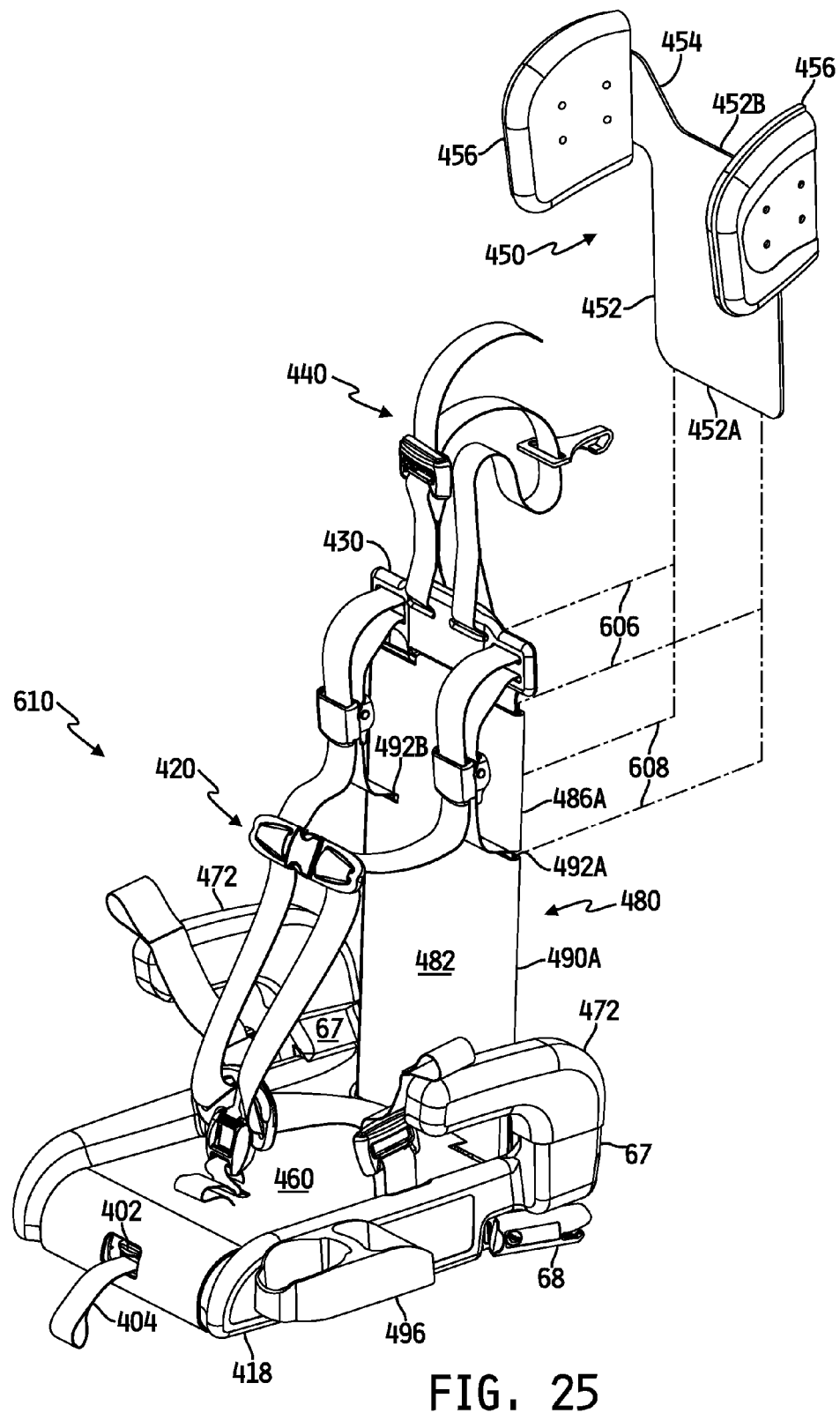
FIG. 25 is a front perspective view of the embodiment of FIGS. 23 and 24 illustrating positioning of the head rest option relative to the portable restraint system.
Figure 26:
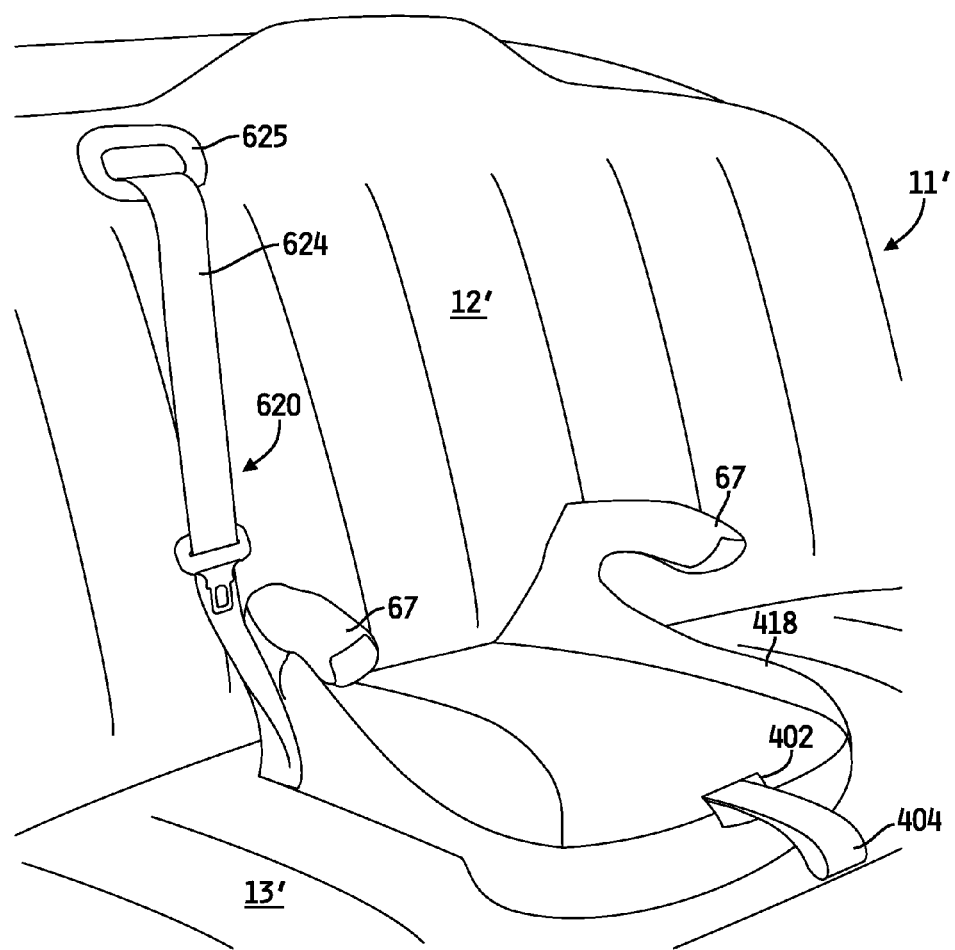
FIG. 26 is a front elevational view of the portable restraint system of FIGS. 23-25 with the restraint harness and mounting harness, as well as the optional head rest, cover, seat cover, arm rest covers and cup holder, removed.

The portable restraint system 610 may further include a number of optional components. An example of one such optional component is a cover 480 configured to be wrapped around the combination of the webs 434, 436, 435 and 437. In the illustrated embodiment, the cover 480 includes a body portion 482 defining a top flap 484 extending from one end and a bottom flap 488 extending from an opposite end. One side of the body portion 482 defines a pair side flaps 486A and 490A extending therefrom and separated by an open channel or slot 492A extending into the body portion 482. The opposite side of the body portion 482 likewise defines a pair of side flaps (only 486B shown) separated by an open channel or slot 492B extending into the body portion 482. As illustrated in FIG. 23 and in the assembled view of FIG. 24, the top flap 484 extends through yet another slot 430G defined through the web interface member 430 and is then folded downwardly. Likewise, the bottom flap is folded upwardly. The side flaps 486A, 490A, 486B and 490B (not shown) are then folded inwardly around the combination of the webs 434, 436, 435 and 437 with the web 434 extending into the slot 492A, the web 437 extending into the slot 492B, and with the remainder of the webs 434, 436, 435 and 437 above the slots 492A and 492B extending along an outer surface of the cover 480, as illustrated in FIGS. 24 and 25. One or more conventional releasable attachment structures and/or techniques may be used to releasably attach the side flaps 486A, 490A, 486B and 490B (not shown) together. In one embodiment, for example, conventional interlocking fabric strips may be attached to each of the side flaps 486A, 490A, 486B and 490B (not shown) so that the flaps may be releasably attached to each other in a conventional manner.

An example of another optional component that may be included with the portable restraint system 610 is a head rest 450 configured to be received and maintained in position by the cover 480. In the illustrated embodiment, the head rest 450 includes a body portion 452 having a bottom end 452A and an opposite top end 452B. A pair of wing-like projections 454 (only one shown) extend laterally away from the body portion 452 adjacent to the top end 452B, and head supporting protrusions 456 extend forwardly away from the projections 454 as illustrated in FIGS. 23-25. As most clearly shown in FIG. 25, the body portion 452 is sized to be slidably inserted between the upper side flaps 486A and 486B (only 486A shown) and the body portion 482 of the cover 480 as shown by the dashed lines 606, or between lower side flaps 490A and 490B (only 490A shown) and the body portion 482 of the cover 480 as shown by the dashed lines 608. In either case, after the head rest 450 is inserted into the cover 480 as shown, the head rest 450 may thereafter be adjusted upwardly or downwardly relative to the cover 480. In the illustrated embodiment, the protrusions 456 are stationary and provide some amount of head support to an occupant of the booster seat 418. Alternatively, the protrusions 456 may be configured to articulate inwardly and outwardly as described hereinabove with respect to the embodiment illustrated in FIGS. 12A-12C.

An example of yet another optional component that may be included with the portable restraint system 610 is a seat cover 460 configured and sized to fit over the booster seat 418. The seat cover 460 defines a body portion having opposing side recesses 462A and 462B that are sized to accommodate passage thereby of the webs 424 and 425 respectively of the restraint harness 420. A center slot 466 is defined through the body portion and is sized to accommodate passage therethrough of the web 422 of the restraint harness, and a front passageway is defined through the body portion to provide for access to the locking web adjuster 402. A rear flap 468 of the body portion is configured to pass over the rear wall 100 of the booster seat 418, and a front flap 470 of the body portion is configured to pass over the front face 98 of the booster seat 418. One or more conventional attachment structures and/or techniques may be used to secure the rear and front flaps 468 and 470 respectively to the underside of the booster seat 418.

An example of still other optional components that may be included with the portable restraint system 610 include arm rest covers 472 each configured to slide over, and be retained on, the arm rests 67. An example of still another optional component that may be included with the portable restraint system 610 is a cup holder and/or tray 496 that may be attached to the booster seat 418. In the illustrated embodiment, the cup holder and/or tray 496 includes a cup holder and a tray, and is attached to one of the sidewalls 99 of the booster seat 418. Alternatively, the cup holder and/or tray 496 may include only one of the cup holder or tray, and may be alternatively attached to, or integral with, a different portion of the booster seat 418, e.g., either or both of the arm rests 67.

Referring now to FIGS. 26-30, the booster seat 418 is shown mounted to a vehicle seat 11' having a seat back 12' and a seat bottom 13'. In the illustrated embodiment, the restraint harness 420 has been removed from the booster seat 418 by removing the web attachment members 422', 425', 426', 434' and 435' (see FIGS. 16 and 17) from the booster seat 418. In this embodiment, the vehicle restraint harness 620 is used to restrain a passenger 475 positioned on the booster seat 418. In the illustrated embodiment, the booster seat 418 and associated booster seat mounting system 400 is shown, although it will be understood that any of the booster seat embodiments 418, 518 and 518', along with any of the associated booster seat mounting systems, may alternatively be used.

Figure 27:
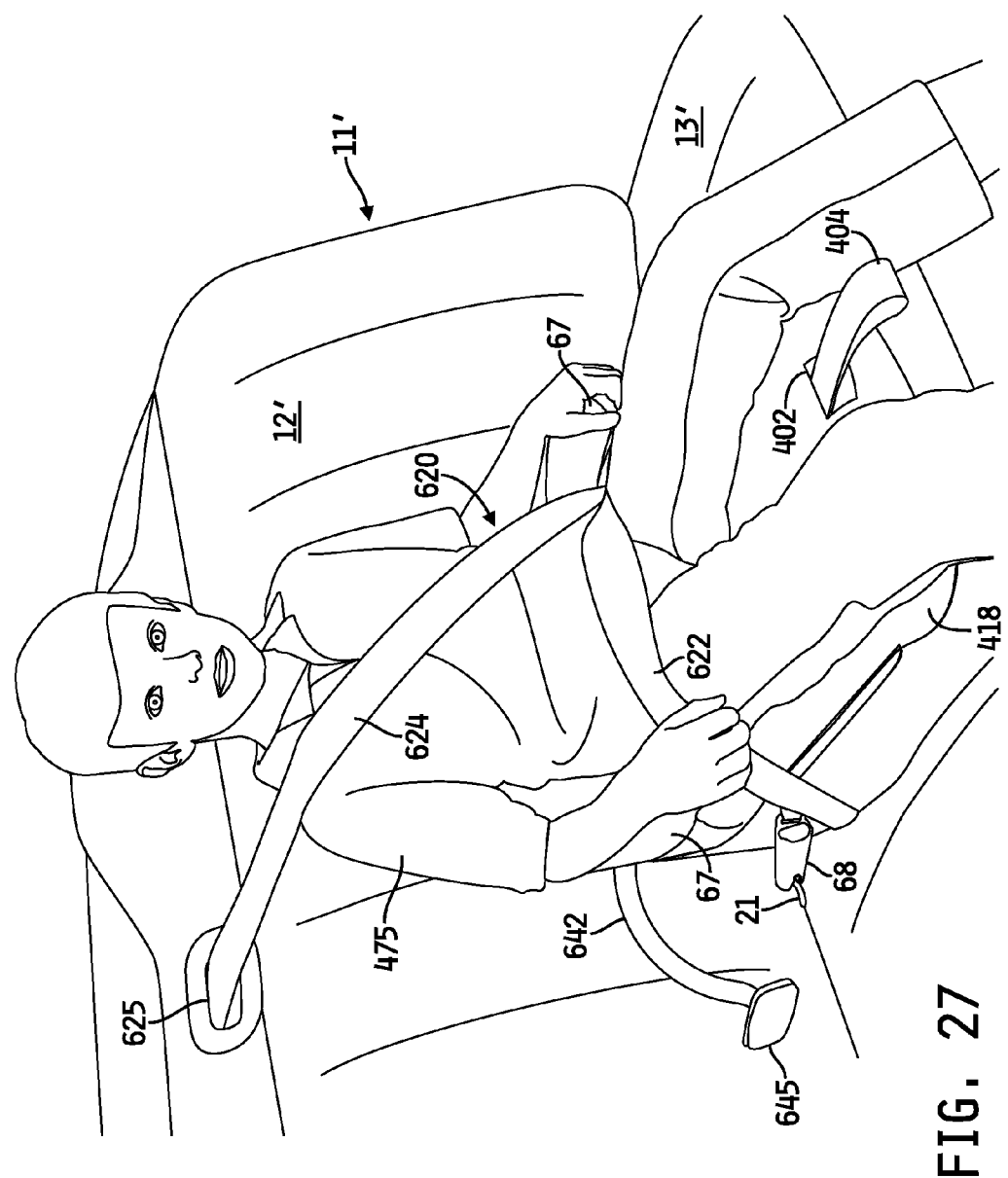
FIG. 27 is a front elevational view of the portable restraint system of FIG. 26 using the vehicle seat restraint harness to restrain the passenger positioned on the booster seat.

In the illustrated embodiment, the vehicle restraint harness 620 includes a single length of web forming a lap portion 622 having one end secured to a conventional web anchorage member mounted to the seat bottom 13' adjacent to one side thereof. The lap portion 622 passes through a slot formed through a conventional tongue member 626, and thereafter extends upwardly in the form of a shoulder portion 624 across the passenger 475. The free end of the shoulder portion 624 is attached to a conventional retractor 625 mounted to the seat back 12' adjacent to a top of the seat back 12'. The tongue member includes a conventional tongue configured to releasably engage a conventional buckle that is mounted to the seat bottom 13' adjacent to an opposite side thereof. As illustrated in FIG. 27, the vehicle restraint harness 620 is configured to extend over and about the passenger 475 with the lap portion 622 extending between the arm rests 67 and the booster seat 418 to thereby restrain the passenger 475 positioned on the booster seat 418.

Figure 28:
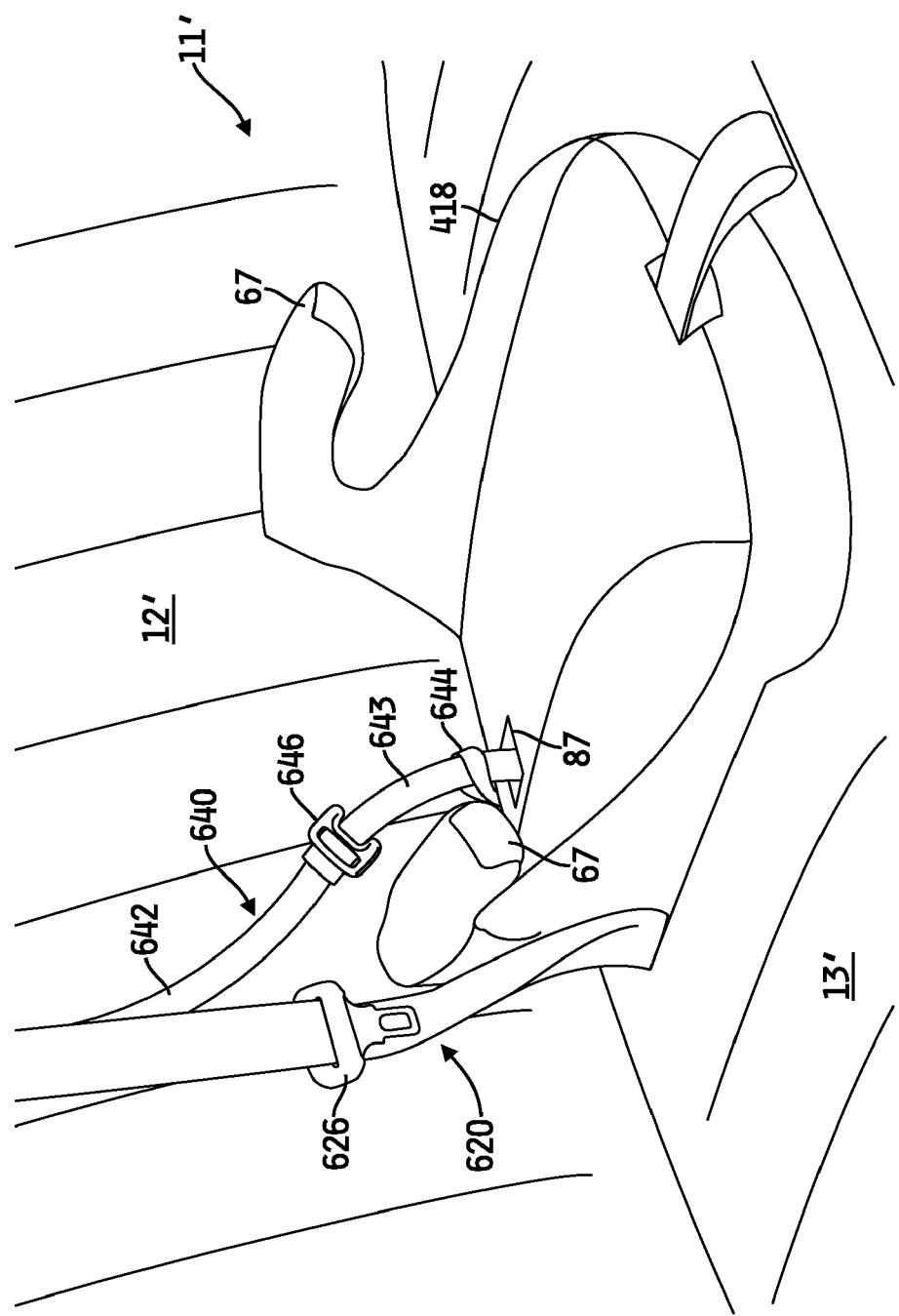
FIG. 28 is a front elevational view of a web height adjustment assembly configured for use with the portable restraint system illustrated in FIGS. 26 and 27.
Figure 29:
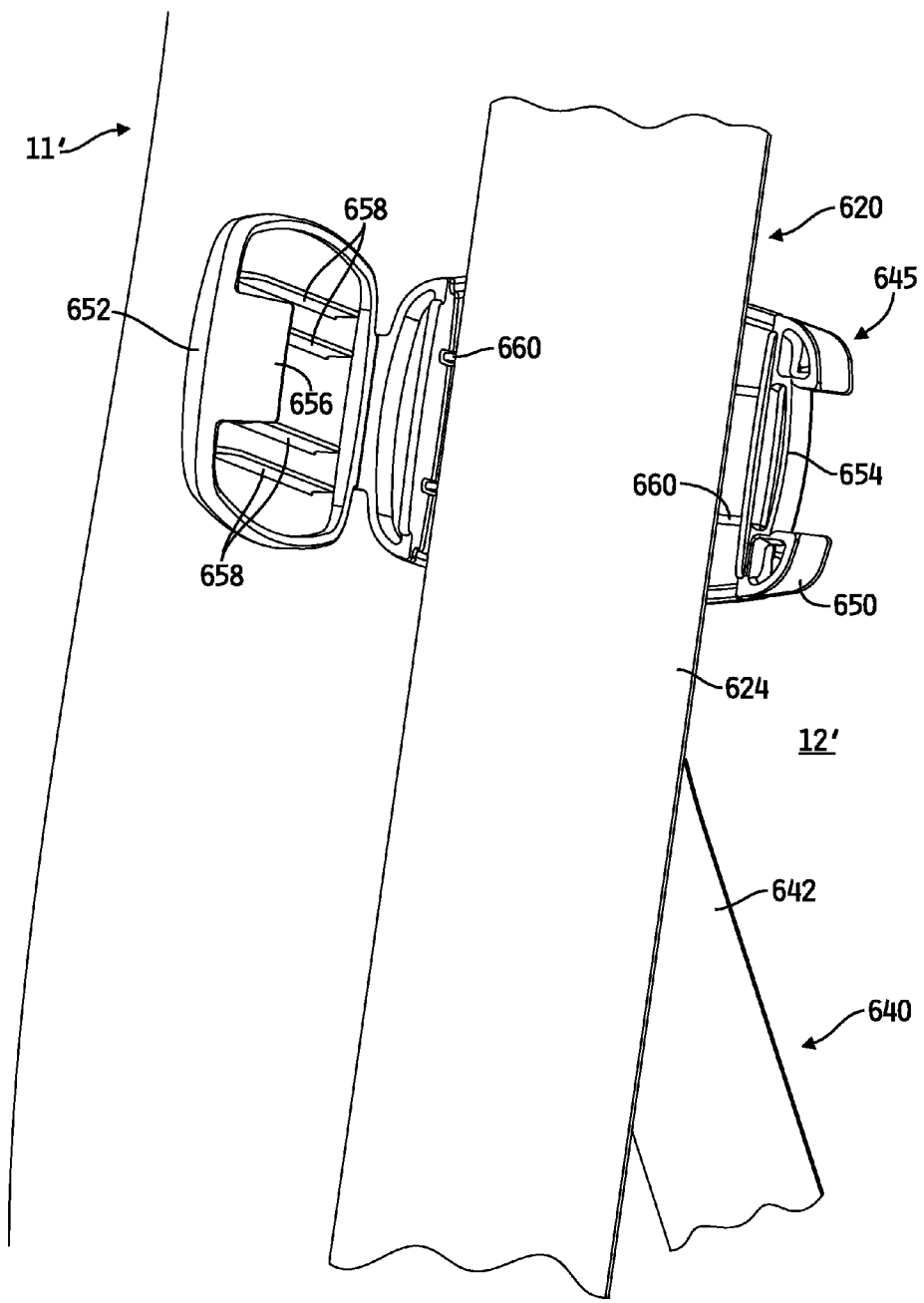
FIG. 29 is a magnified view of the web clamp portion of the height adjustment assembly of FIG. 28.
Figure 30:
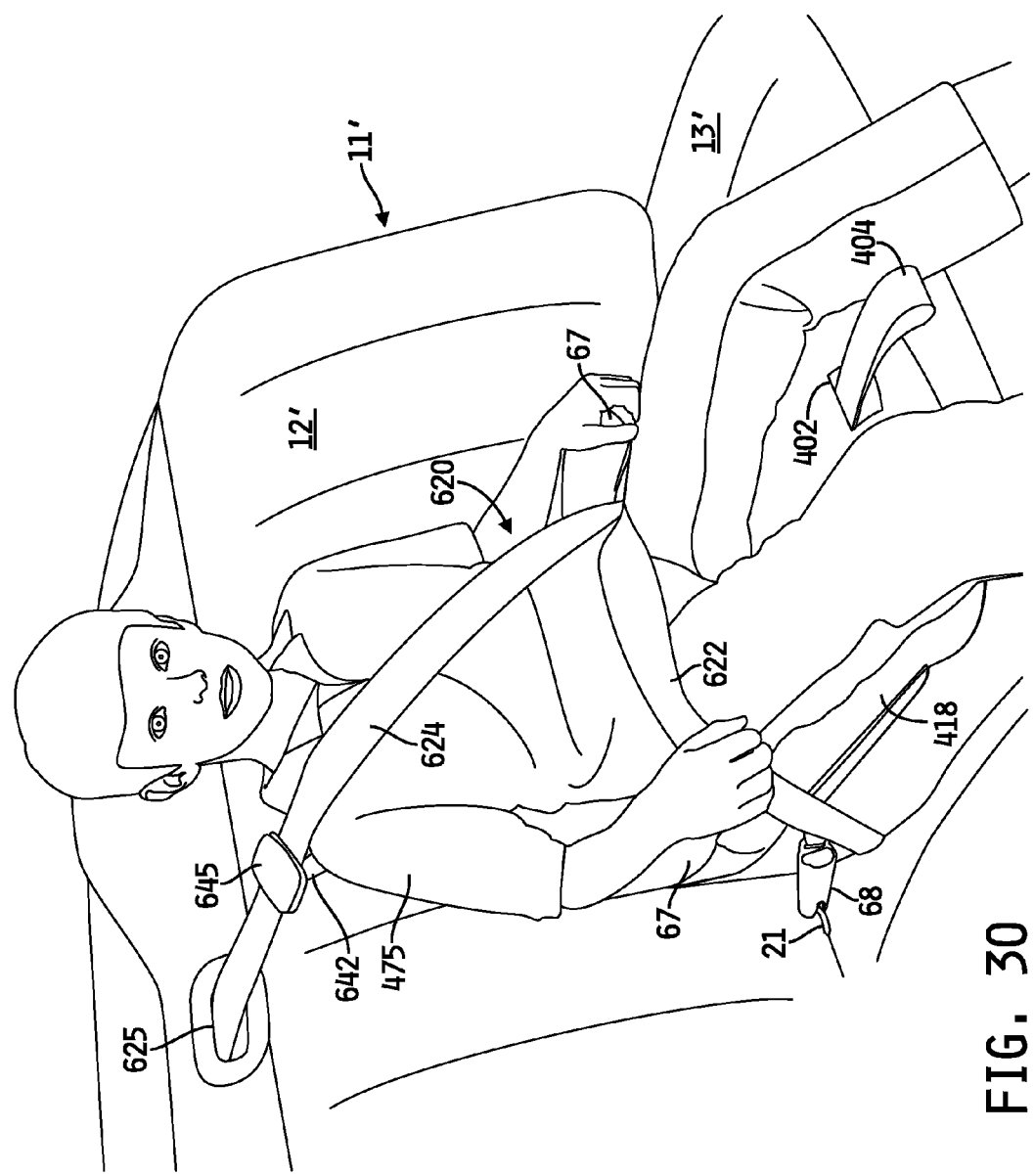
FIG. 30 is a front perspective view of the portable restraint system of FIGS. 26-27 implementing the web height adjustment assembly of FIGS. 28-29.

Referring now specifically to FIGS. 28-30, one illustrative embodiment of a height adjustment assembly 640 is shown for adjusting the position of the shoulder portion 624 of the vehicle restraint harness 620 relative to the passenger 475 of the booster seat 418. In the illustrated embodiment, the height adjuster assembly 640 includes a web 642 having one end passed through a conventional web length adjuster 646. The web length adjuster 646 is attached via a fixed length of web 643 to the booster seat 418 via a conventional attachment structure 644. In the illustrated embodiment, for example, the free end of the web 643 forms a loop, and this loop is passed through one of the voids or recesses 87 defined through the booster seat 418. The opposite end of the height adjuster assembly 640 is then passed through the loop as shown in FIG. 28 to secure the free end of the web 643 to the booster seat 418. Those skilled in the art will recognize other conventional structures and/or techniques for attaching the free end of the web 643 to the booster seat 418, and any such other conventional structures and/or techniques are contemplated by the present disclosure. In any case, the opposite end of the web 642 is attached to a web clamp 645 having a pair of closable clamp members 650 and 652 configured to close together with the shoulder portion 624 of the vehicle restraint harness 620 trapped therebetween. The clamp members 650 and 652 are hinged together on one side, and an opposite side of the clamp member 650 defines a slot 654 whereas the opposite side of the clamp member 652 defines a protrusion 656 configured to be received within the slot 654 to thereby join the clamp members 650 and 652 over the shoulder portion 624 as illustrated in FIG. 30. In one embodiment, the clamp member 652 may define a number of transverse ribs 658, and the clamp member 650 may likewise define a number of transverse ribs 660. The ribs 658 are offset from the ribs 660 to facilitate the clamping of the shoulder portion 624 of the vehicle restraint harness 620 therebetween. In any case, the web clamp 645 is slidably positionable along the shoulder portion 624 of the vehicle restraint harness 620.

In the illustrated embodiment, the length of the web 642 may be adjusted by advancing the web 642 through the web length adjuster 646 in either direction to thereby modify the height of the web clamp 645 relative to the shoulder portion 624 of the vehicle restraint harness 620. This then allows the adjustable positioning of the shoulder portion 624 of the vehicle restraint harness 620 relative to the passenger 475 of the booster seat 418. In an alternate embodiment, the attachment structure 644 may be a conventional retractor mounted to or within the booster seat 418. In this embodiment, the web 642 may extend directly into the retractor 644, and the web length adjuster 646 may be omitted.

Figure 31:
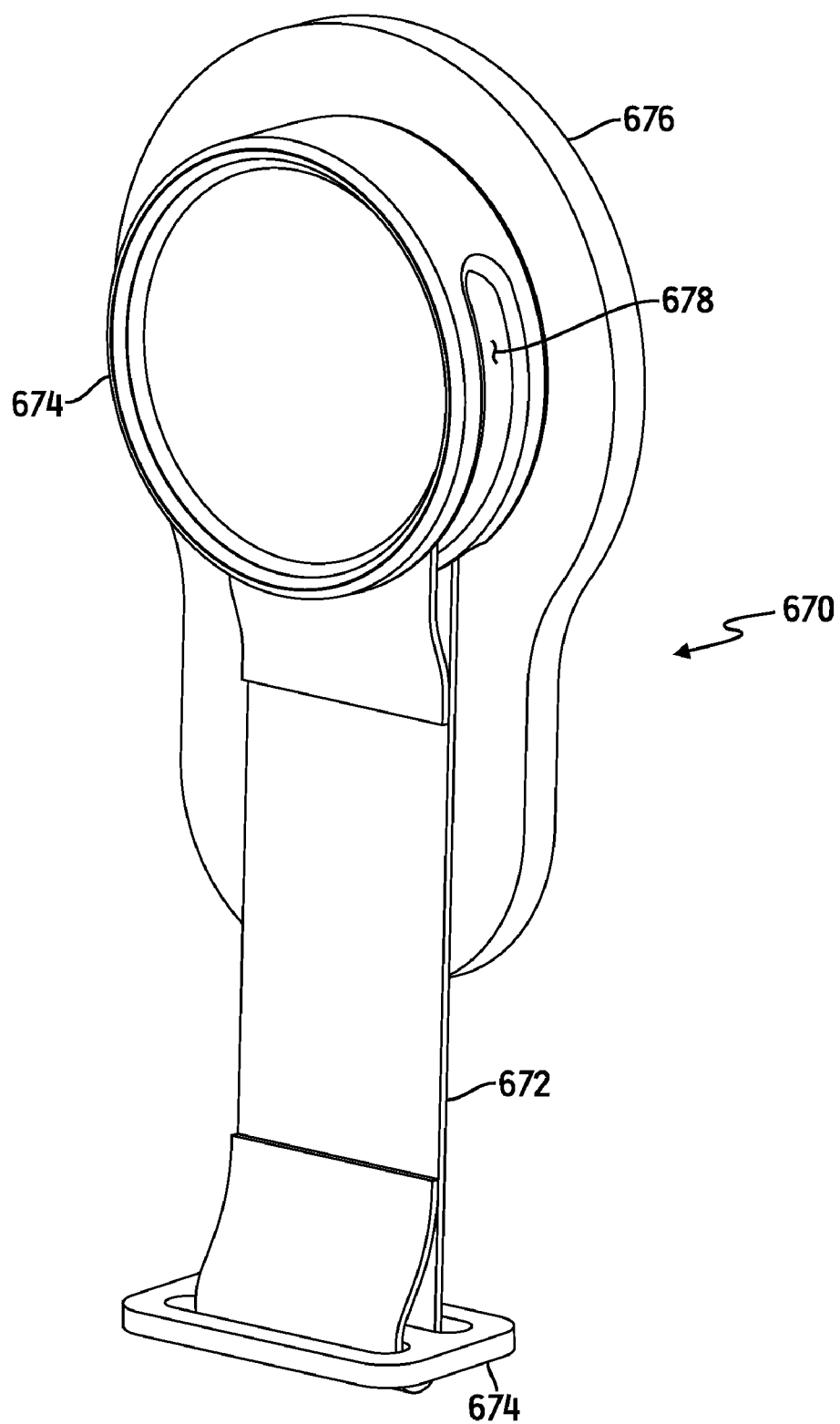
FIG. 31 is a front perspective view of an auxiliary restraint harness configured for use with the portable restraint system of FIGS. 26-27.
Figure 32:
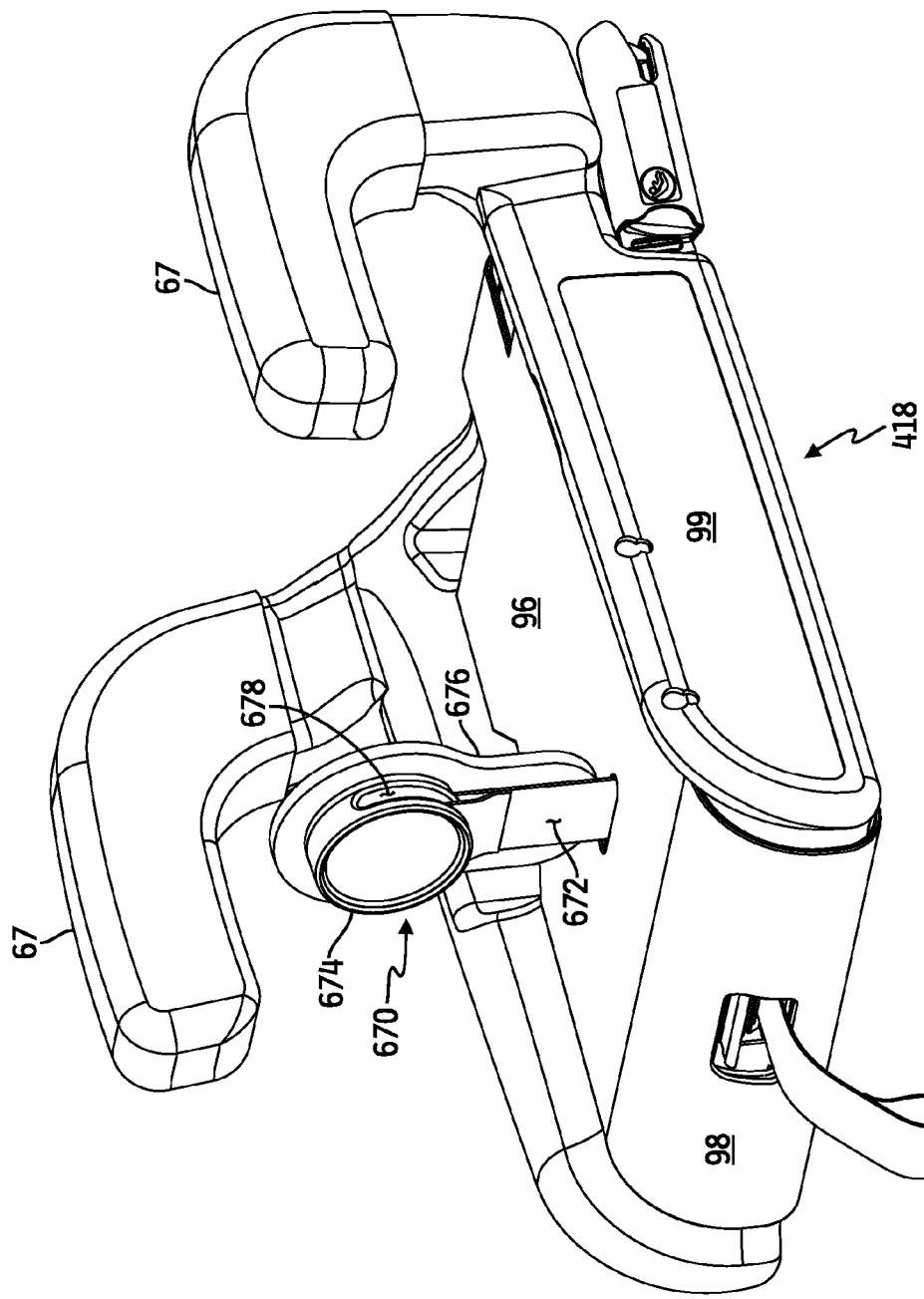
FIG. 32 is a front perspective view of the booster seat of FIGS. 26-27 with the auxiliary restraint harness of FIG. 31 mounted thereto.
Figure 33:
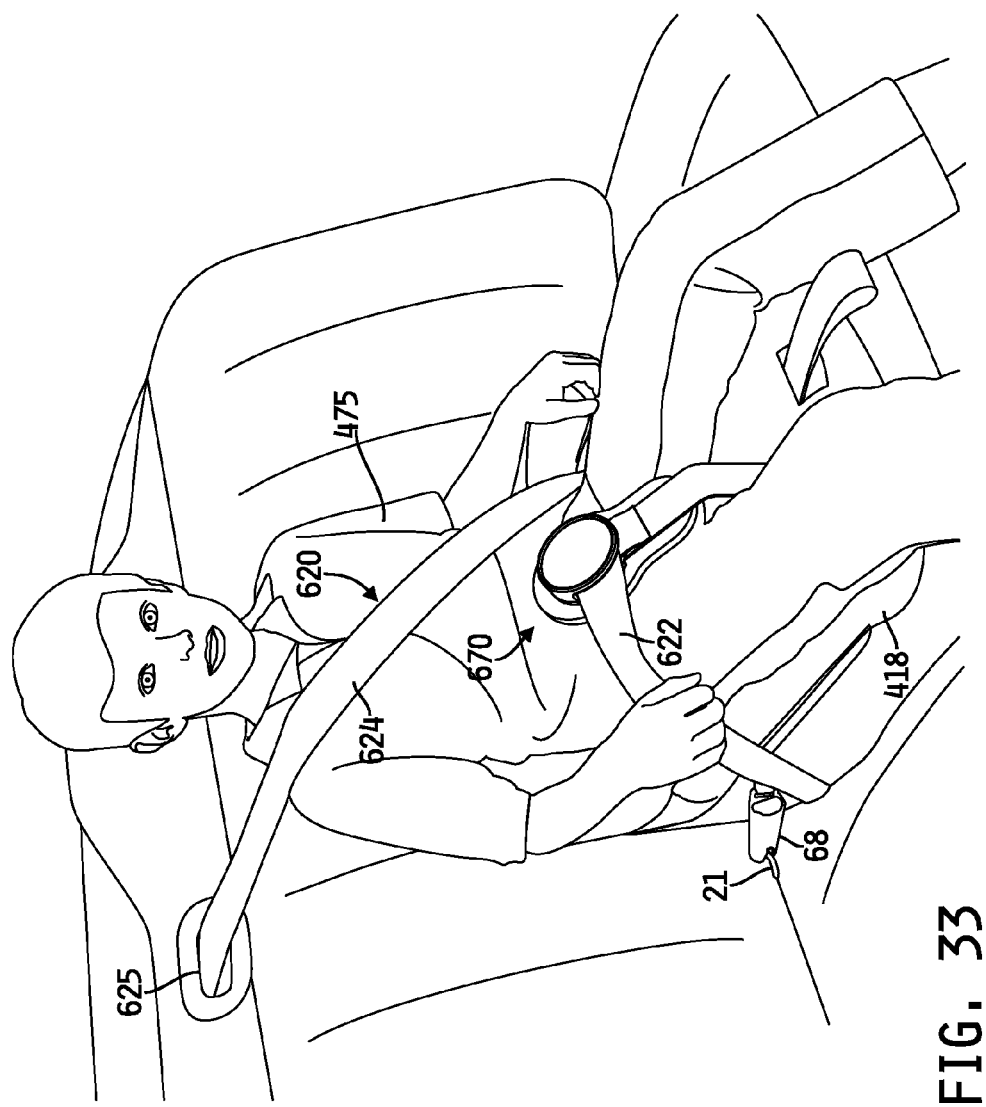
FIG. 33 is a front perspective view of the booster seat of FIG. 32 implementing the auxiliary harness in a manner that converts the vehicle seat three-point restraint harness to a four-point restraint harness.

Referring now to FIGS. 31-33, an auxiliary harness 670 is provided to convert the three-point vehicle restraint harness 620 to a four-point restraint harness relative to the booster seat 418. It will be understood that the auxiliary harness may alternatively be used with any of the booster seat embodiments 18, 118, 318, 418, 518 and 518' illustrated and described herein. In the illustrated embodiment, the auxiliary harness 670 includes a web 672 having one end mounted to a conventional web attachment member 674 configured to be mounted to the booster seat 418 via the anchor point 82. The opposite end of the web 672 is attached to a web engaging member 674 mounted to a conventional pad 676. The web engaging member 674 defines a slot 678 therein sized to receive the lap portion 622 of the vehicle restraint harness 620 therein as illustrated in FIG. 33. Those skilled in the art will recognize other structures and/or techniques for selectively securing the lap portion 622 of the vehicle restraint harness 620 to the web engaging member 674, and any such other structures and/or techniques are contemplated by this disclosure.

Figure 35:
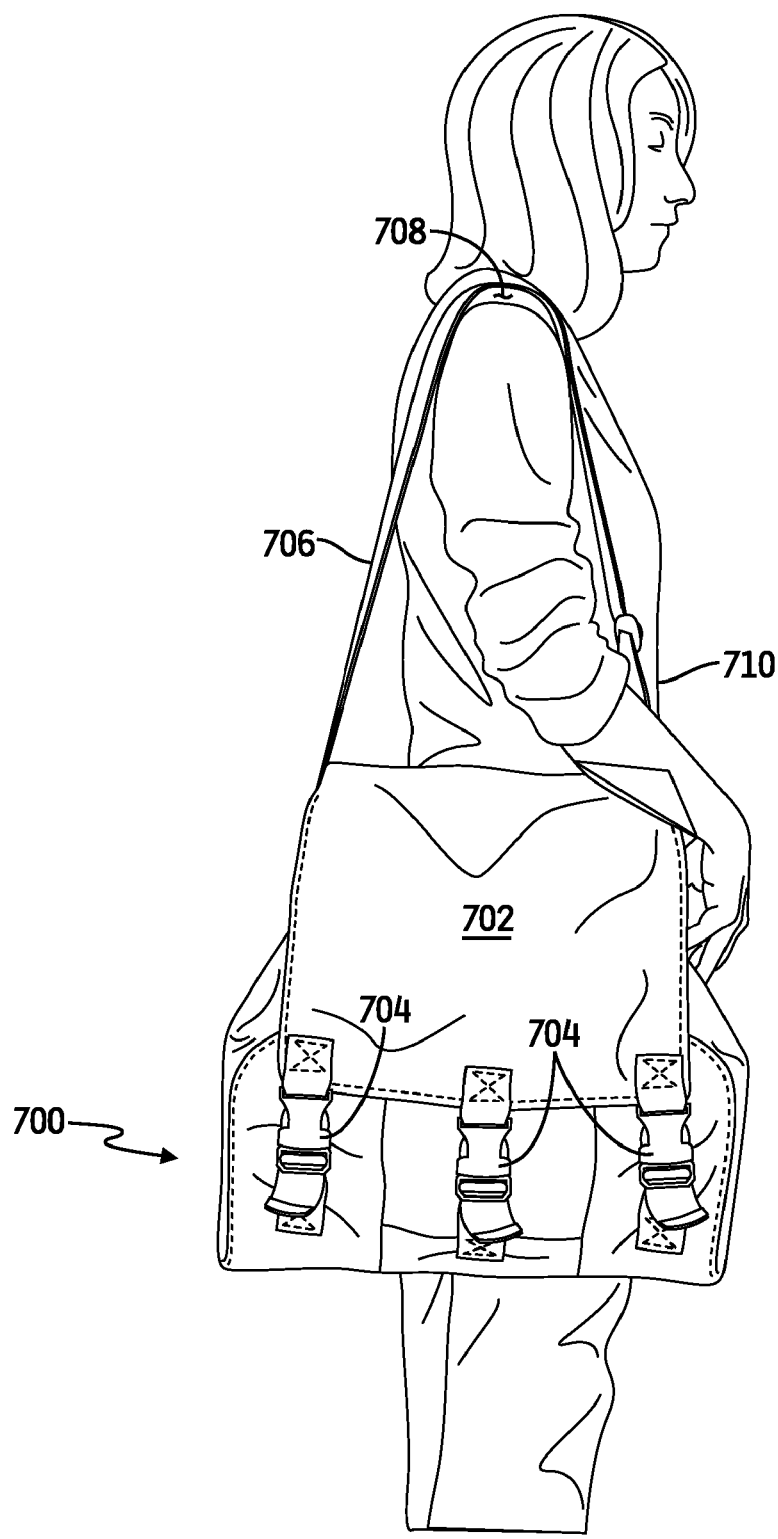
FIG. 35 is a side elevational view of the carrying bag of FIG. 34 being transported by a person.
Figure 36:
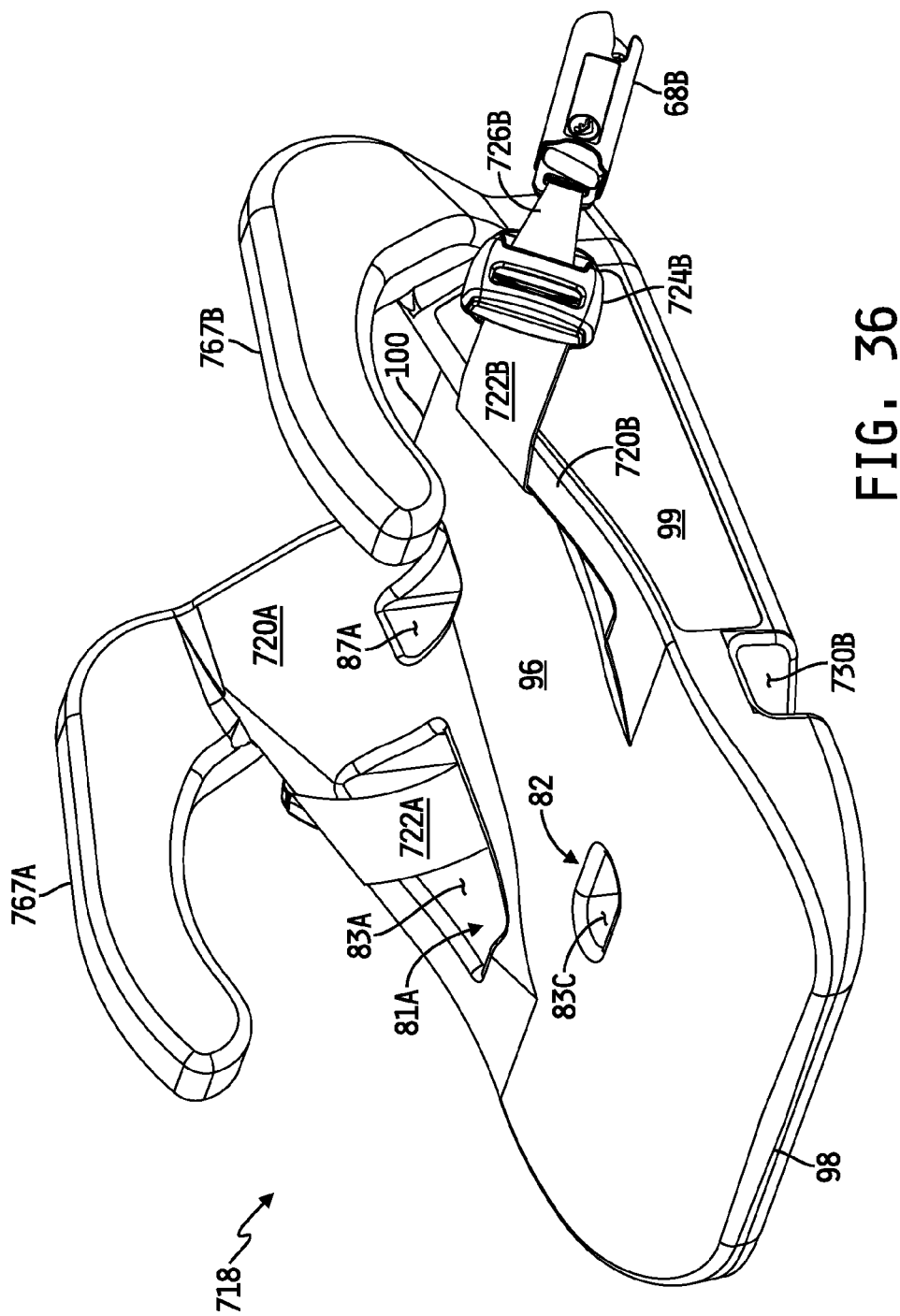
FIG. 36 is a top perspective view of another embodiment of a booster seat including a mounting system for securing the booster seat to a vehicle seat.
Figure 37:
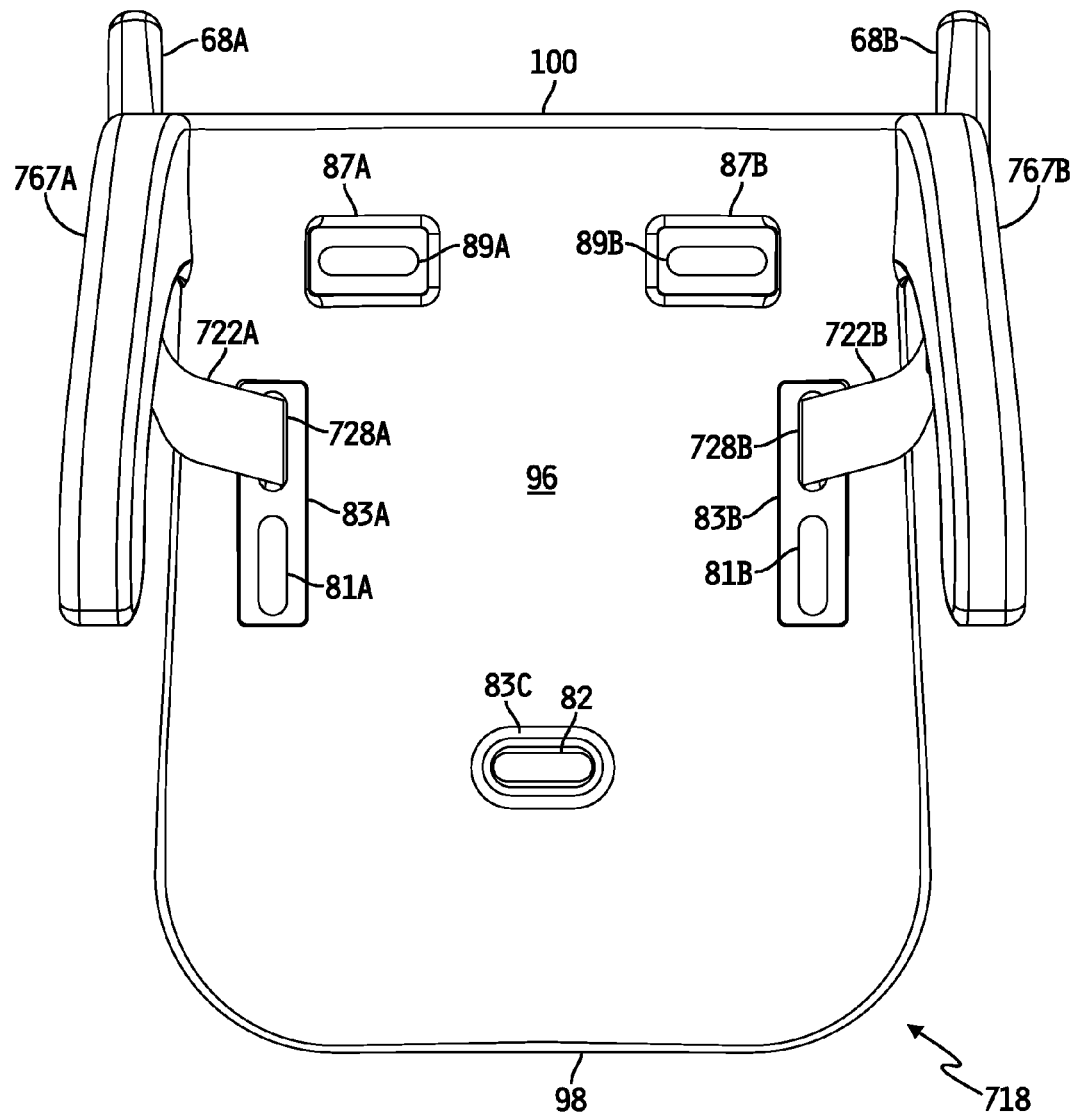
FIG. 37 is a top plan view of the embodiment illustrated in FIG. 36.

Referring now to FIGS. 34 and 35, a carrying bag 700 is provided to transport one or more components of the portable restraint system 610 illustrated in FIGS. 23-25. In the illustrated embodiment, the carrying bag 700 defines an opening 703 to an interior 705 sized to receive one or more of the components of the restraint system 610 therein, and a flap 702 configured to extend over the opening 703 of the carrying bag 700. On the flap 702 are mounted a number of attachment members 704A, and on the bag 700 there are mounted an equal number of corresponding attachment members 704B each configured to lockingly engage a corresponding one of the number of attachment members 704A. After the one or more components of the portable restraint system 610 are positioned in the carrying bag 700, the flap 702 may be extended over the opening 705, and the attachments members 704A and 704B may engage each other to lock the bag 700 in a closed state.

In one embodiment, the carrying bag 700 is sized to receive and store therein at least the booster seat 418. In another embodiment, the carrying bag 700 is sized to receive and store therein at least the combination of the booster seat 418 and restraint harness 420. In yet another embodiment, the carrying bag 700 is sized to receive and store therein at least the combination of the booster seat 418, the restraint harness 420 and the mounting harness 440. In still another embodiment, the carrying bag 700 is sized to receive and store therein at least the combination of the booster seat 418, the restraint harness 420, the mounting harness 440 and the cover 480. In a further embodiment, the carrying bag 700 is sized to receive and store therein at least the combination of the booster seat 418, the restraint harness 420, the mounting harness 422, the cover 480 and the headrest 450. The bag 700 may alternatively be sized to receive and store therein other combinations of any of the foregoing components.

The carrying bag 700 may be sized and configured to carry the one or more components of the portable restraint system 610 therein with the arm rests 67 positioned within the carrying bag 700 as illustrated in FIG. 34. Alternatively, the carrying bag 700 may be sized and configured to carry the one or more components of the portable restraint system 610 therein with the arm rests 67 extending outside of the carrying bag 700. In either case, the carrying bag 700, with any one or combination of the components of the portable restraint system 610 stored therein, is sized to be stowed under a passenger seat of a commercial air craft. Alternatively or additionally, the carrying bag 700, with any one or combination of the components of the portable restraint system 610 stored therein, is sized to be stowed in an overhead storage compartment of a commercial air craft.

The carrying bag 700 includes at least one carrying strap 706 mounted thereto. In the embodiment illustrated in FIG. 35, for example, the carrying strap 706 is sized to extend over a shoulder 708 of a person 710 transporting the carrying bag 700. Alternatively or additionally, the carrying strap 706 may be provided in the form of two shoulder straps configured to extend over each shoulder of a person transporting the carrying bag 700 in the form of a backpack. Alternatively or additionally, the carrying strap 706 may be provided in the form of a carrying handle configured to be carried by hand. Any one or combination of such carrying straps 706 may be provided.

Referring now to FIGS. 36-42, another illustrative embodiment of a booster seat mounting system 68 and 722-726 is shown for mounting another illustrative embodiment of a booster seat 718 to a vehicle seat 11. It will be understood, however, that the booster seat mounting system 68 and 722-726 may be adapted for use with any of the booster seats 18, 118, 318 and 418 illustrated and described herein. In any case, the booster seat 718 is, like the booster seats 18, 118, 318 and 418, a backless booster seat in the sense that it comprises a seat base with no back support.

In the embodiment illustrated in FIGS. 36-42, the booster seat mounting system 68 and 722-726 includes a pair of booster seat mounting webs 722A and 722B each connected to a corresponding conventional web length adjuster 724A and 724B respectively. The web length adjusters 724A and 724B are each connected to a corresponding connector 68A and 68B respectively via corresponding fixed-length webs 726A and 726B respectively. The connectors 68A and 68B may be as described hereinabove with respect to the connector 68.

As with the embodiments 18, 118, 318 and 418 of the booster seat illustrated and described herein, the booster seat 718 defines a number of recesses or channels through a top surface 96 of the booster seat 718 for attaching various components of a restraint harness; e.g., restraint harness 420 illustrated and described herein, to the booster seat 718. For example, the recesses 83A, 83B, 83C, 87A and 87B extend into the top surface 96 of the booster seat 718, and each of these recesses defines therein a respective web anchor point 81A, 81B, 82, 89A and 89B respectively for mounting the various components of a restraint harness; e.g., restraint harness 420, thereto as described hereinabove. The recesses 83A and 83B of the booster seat 718 further define therein respective web anchor points 728A and 728B for mounting web anchors affixed to respective ends of the webs 722A and 722B to the booster seat 718.

The recesses 83A, 83B, 83C, 87A and 87B each align with respective recesses 83'A, 83'B, 83'C, 87'A and 87'B extending into the bottom 784 of the booster seat 718. These recesses 83'A, 83'B, 83'C, 87'A and 87'B are configured to receive and retain web anchors, which attach in a conventional fashion to the ends of the web components defining the restraint harness; e.g., the restraint harness 420, as well as the ends of the webs 722A and 722B. Additionally, the recesses 83A, 83'A, 83B and 83'B are sized to accommodate the booster seat mounting webs 722A and 722B respectively.

The booster seat 718 defines a seat or top portion 96 that extends between a pair of upstanding sidewalls 720A and 720B. The sidewalls 720A and 720B slope generally downwardly from a back 100 of the booster seat 718 toward a front 98 of the booster seat 718. A pair of arm rests 767A and 767B extend from the sidewalls 720A and 720B respectively adjacent to the back 100 of the booster seat 718.

One end of the booster seat mounting web 722A extends into the recess 83A and is attached to the web anchor point 81A via a conventional web anchor. The opposite end of the booster seat mounting web 722A is passed through a conventional web length adjuster 724A. The web length adjuster 724A is a locking web length adjuster, and the length of the web 722A may be adjusted by pulling the web 722A through the web length adjuster 724A in either direction in a conventional manner. The web length adjuster 724A is also connected via a fixed length of web 726A to one end of a connector 68A that is configured to be releasably connectable to an anchor of the vehicle seat 11 as described hereinabove with respect to the connector 68. For example, as most clearly illustrated in FIG. 40 the seat 11 comprises a seat back 12, a seat bottom 13 and a bight 15 therebetween. A conventional round bar or other vehicle seat anchor 21 is positioned within the bight 15, and is securely mounted to the seat 11 and/or seat frame 721. In the illustrated embodiment, the connector 68A is configured to be releasably connectable to the seat anchor 21.

One end of the booster seat mounting web 722B likewise extends into the recess 83B and is attached to the web anchor point 81B via a conventional web anchor. The opposite end of the booster seat mounting web 722B is passed through a conventional web length adjuster 724B. The web length adjuster 724B is a locking web length adjuster, and the length of the web 722B may be adjusted by pulling the web 722B through the web length adjuster 724B in either direction in a conventional manner. The web length adjuster 724B is also connected via a fixed length of web 726B to one end of another connector 68B that is configured to be releasably connectable to another anchor 21 of the vehicle seat 11 as described hereinabove with respect to the connector 68A. For example, the seat 11 typically includes a pair of conventional round bars or other vehicle seat anchors 21 positioned in the bight 15 adjacent to each side of the seat. Some vehicle seats, e.g., bench-type seats, may include several sets of such round bars or other vehicle seat anchors 21 spaced along the bight 15. The pairs of round bars or other vehicle seat anchors 21 are generally spaced apart such that one connector 68A may be releasably connected to one of the anchors 21 of the pair of anchors, and the other connector 68B may be releasably connected to the other anchor 21 of the pair of anchors.

With the bottom 784 of the booster seat 718 positioned on the seat bottom 13 and the back 100 of the booster seat 718 facing the seat back 12, the connectors 68A and 68B may both be releasably connected to the vehicle seat anchors 21. The lengths of the webs 722A and/or 722B may be adjusted via the web length adjusters 724A and 724B respectively to provide sufficient slack in the webs 722A and 722B to facilitate engagement of the connectors 68A and 68B with corresponding vehicle seat anchors 21. The webs 722A and 722B extend under the arm rests 767A and 767B respectively, and over and in contact with corresponding ones of the opposing sidewalls 720A and 720B respectively when the connectors 68A and 68B engage the anchorages 21 of the vehicle seat 11. The booster seat 718 may be secured to the vehicle seat 11 by adjusting the lengths of the webs 722A and 722B; e.g., shortening the webs 722A and 722B, via the web length adjusters 724A and 724B in a conventional manner. The sloped surfaces of the sidewalls 720A and 720B facilitate the secure mounting of the booster seat 718 to the vehicle seat 11 by guiding the booster seat 718, as the lengths of the webs 722A and 722B are being shortened, toward and into the seat bottom 13, the seat back 12 and the bight 15. With the lengths of the webs 722A and 722B suitably shortened via the web length adjusters 724A and 724B respectively, the booster seat 718 will thus be securely mounted to the vehicle seat 11. The lengths of the webs 722A and 722B may be suitably adjusted; e.g., loosened, via the web length adjusters 724A and 724B respectively to facilitate releasing of the connectors 68A and 68B from the vehicle seat anchors 21.

It will be appreciated that the illustrated booster seat mounting system may be modified without departing from the scope of this disclosure. For example, the two booster seat mounting webs 722A and 722B may alternatively comprise a single web that extends into one recess 83A, B, under or through the booster seat 718 and then out of the other recess 83A, B. In this embodiment, the two opposing ends of the single booster seat mounting web may be passed through respective ones of the two web length adjusters 724A and 724B as illustrated in FIGS. 36-42. Alternatively, one of the web length adjusters 724A or 724B may be omitted in this embodiment, in which case the corresponding free end of the single booster seat mounting web may be attached directly to a corresponding one of the connectors 68A or 68B. These and other modifications or alternatives to the illustrated booster seat mounting system are contemplated by this disclosure.

Figure 38:
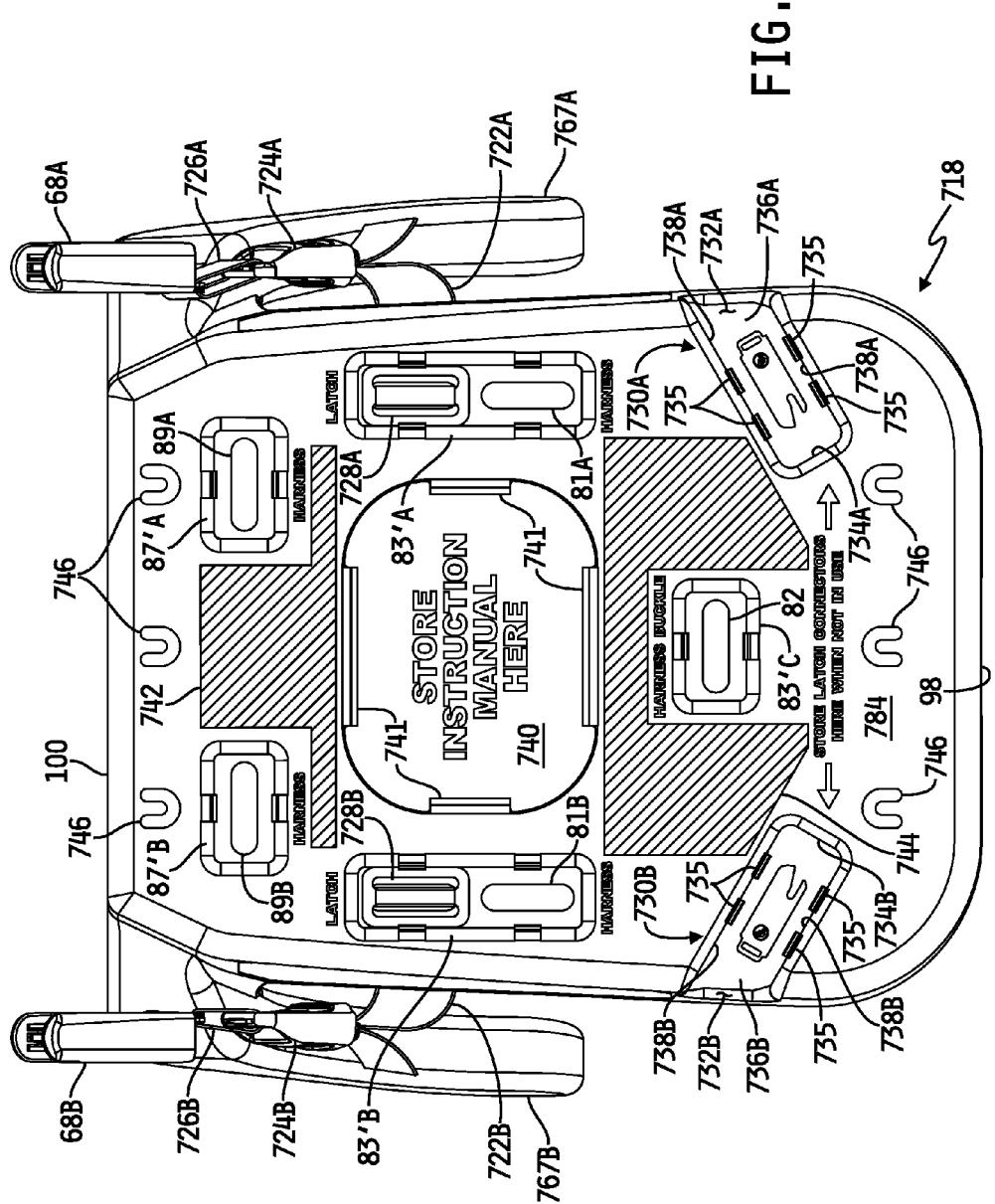
FIG. 38 is a bottom plan view of the embodiment illustrated in FIGS. 36 and 37.
Figure 39:
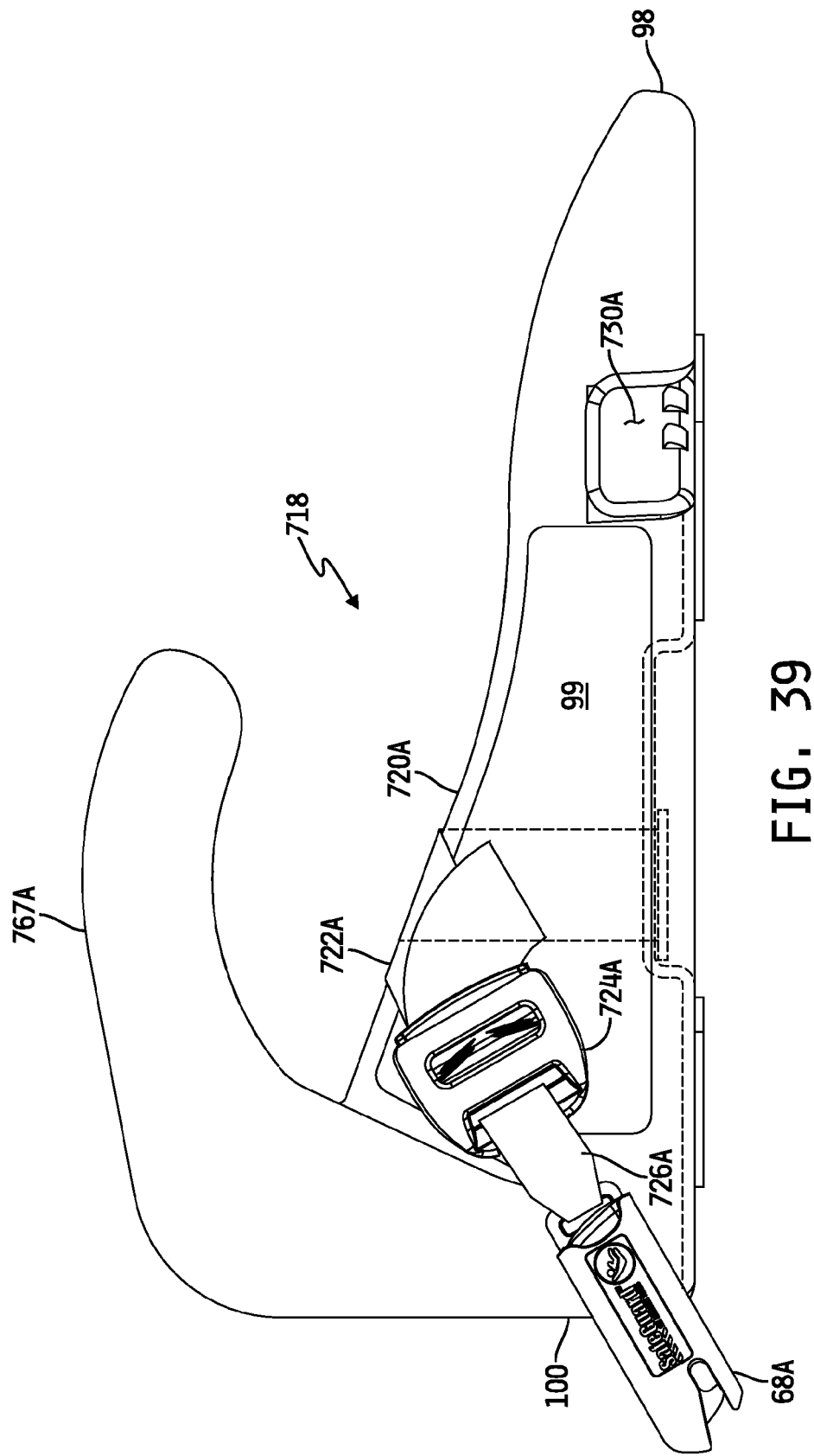
FIG. 39 is a side view of the embodiment illustrated in FIGS. 36-38.
Figure 40:
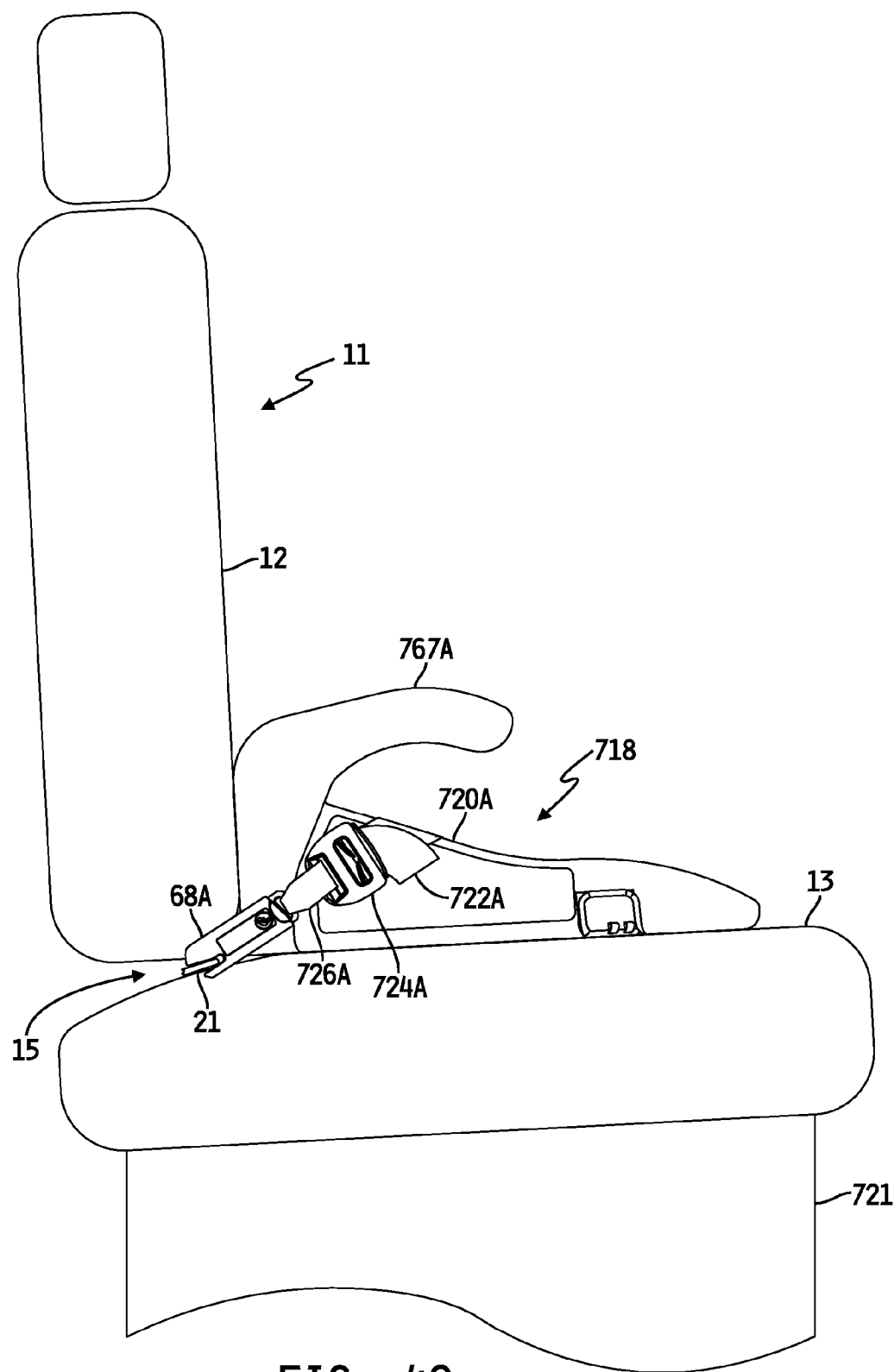
FIG. 40 is another side view of the embodiment illustrated in FIGS. 36-39 mounted to a vehicle seat.
Figure 41:
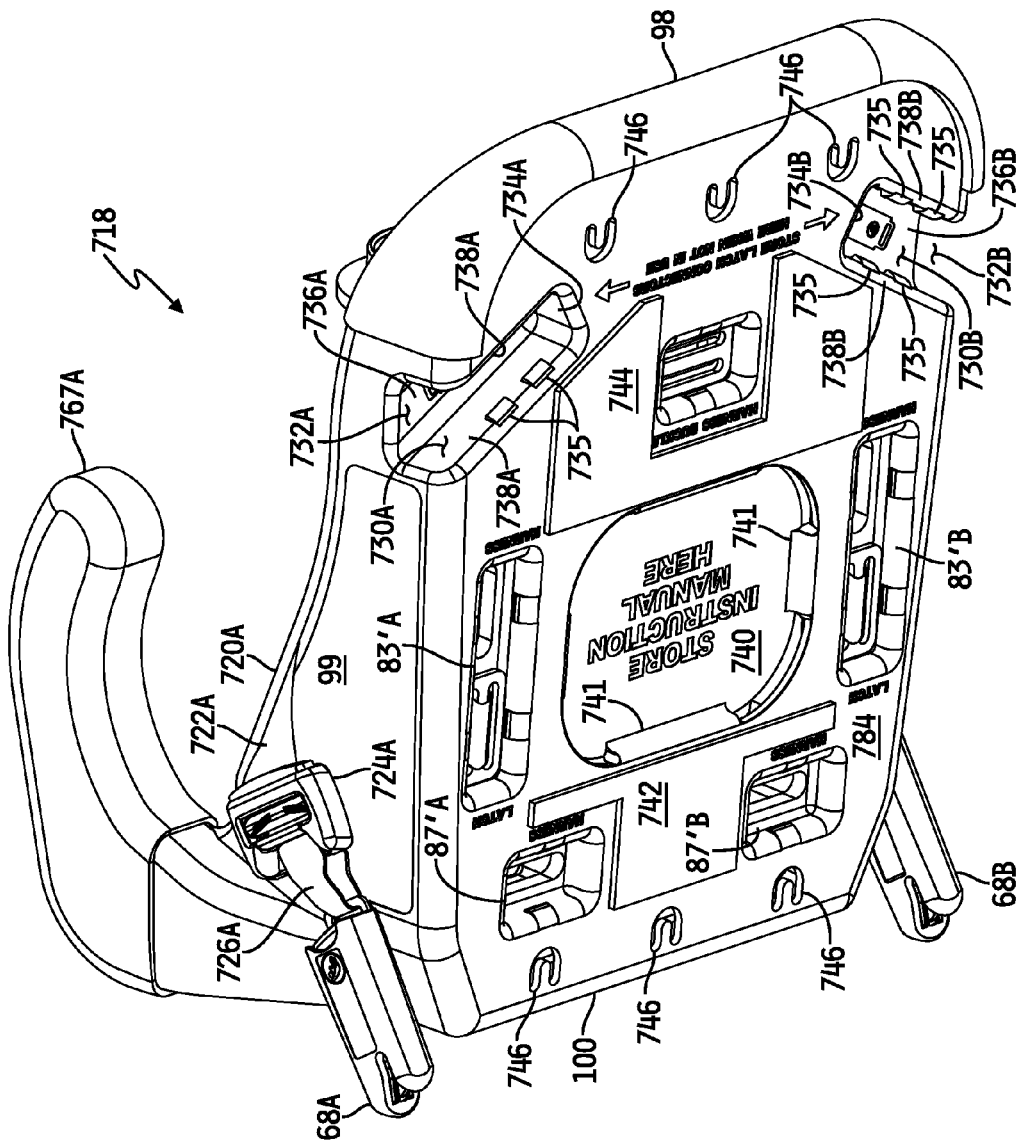
FIG. 41 is a bottom perspective view of the embodiment illustrated in FIGS. 36-40.
Figure 42:
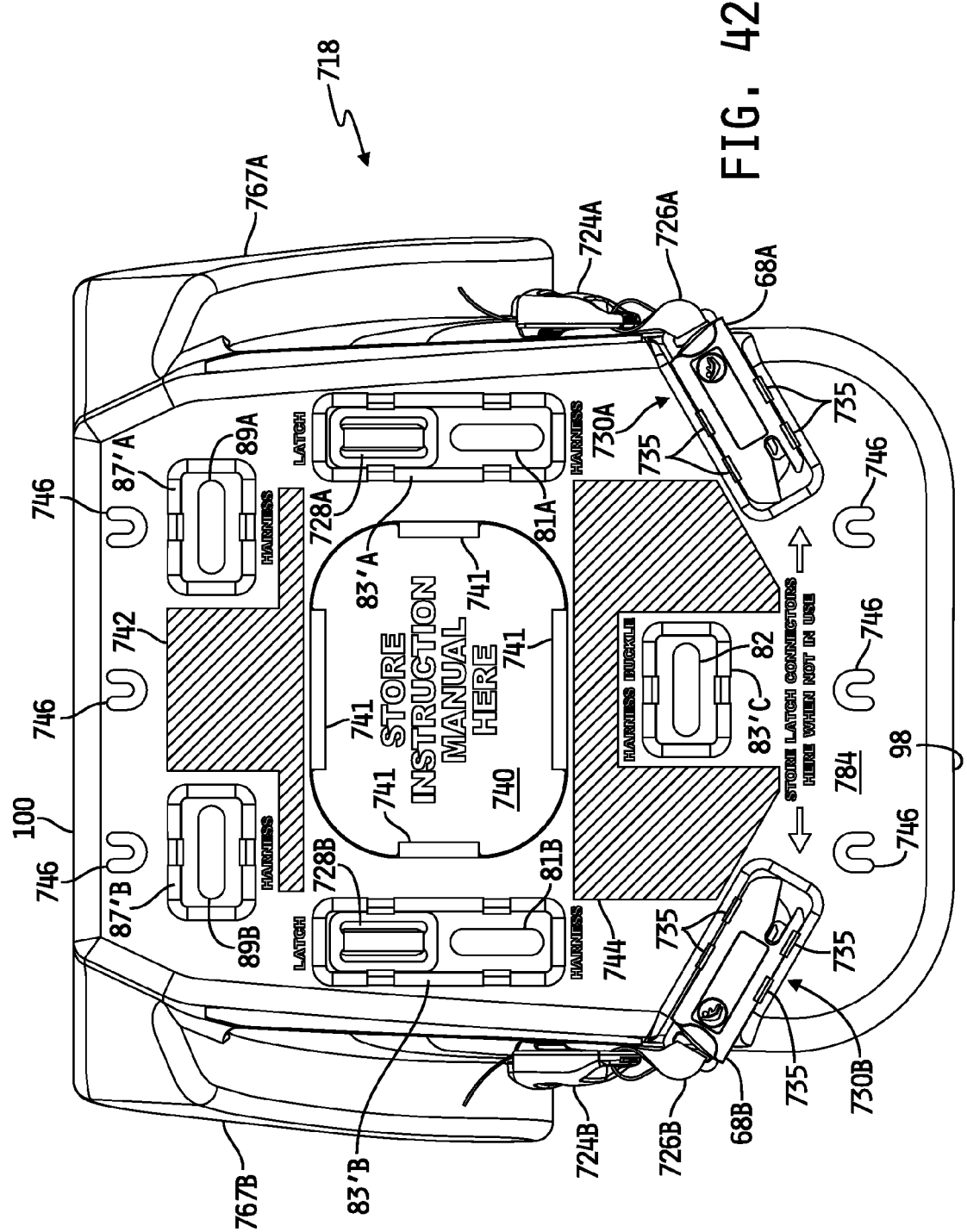
FIG. 42 is another bottom plan view of the embodiment illustrated in FIGS. 36-41 showing the seat anchor connectors stored in corresponding cavities formed in the bottom of the booster seat.

Referring now particularly to FIGS. 38, 41 and 42, the bottom 784 of the booster seat 718 includes a number of additional features. For example, the bottom 784 of the booster seat 718 defines a pair of open channels or cavities 730A and 730B therein adjacent opposite sides of the booster seat 718. The cavities 730A and 730B are configured, as will be described in greater detail hereinafter, to receive and retain therein for storage the connectors 68A and 68B respectively, as desired when the connectors 68A and 68B are not otherwise engaged with the vehicle seat anchors 21; e.g., such as when transporting the booster seat 718.

The cavity 730A defines a cavity opening 732A in one side 99 of the booster seat 718; e.g., near the front 98 of the booster seat, and the cavity 730A extends into the booster seat 718 from the cavity opening 732A to a cavity end 734A. Between the cavity opening 732A and the cavity end 734A, the cavity 730A defines a cavity bottom 736A extending between a pair of cavity sidewalls 738A. The pair of cavity sidewalls 738A are open to the bottom 784 of the booster seat 718. Near the opening of the cavity 730A in the bottom 784 of the booster seat 718, a number of retaining structures 735 extend inwardly into the channel 730A from each of the cavity sidewalls 738A. In the illustrated example, two such retaining structures in the form of opposing retaining tabs extend from each of the sidewalls 738A inwardly toward a center of the cavity 730A. The retaining structures 735 are sized and positioned relative to the sidewalls 738A and cavity bottom 736A to retain the connector 68A therein, with the web 722A extending out of the cavity opening 732A, as illustrated in FIG. 42.

The cavity 730B likewise defines a cavity opening 732B in an opposite side 99 of the booster seat 718; e.g., near the front 98 of the booster seat, and the cavity 730B extends into the booster seat 718 from the cavity opening 732B to a cavity end 734B. Between the cavity opening 732B and the cavity end 734B, the cavity 730B defines a cavity bottom 736B extending between a pair of cavity sidewalls 738B. The pair of cavity sidewalls 738B are open to the bottom 784 of the booster seat 718. Near the opening of the cavity 730B in the bottom 784 of the booster seat 718, a number of retaining structures 735 extend inwardly into the channel 730B from each of the cavity sidewalls 738B. In the illustrated example, two such retaining structures in the form of opposing retaining tabs extend from each of the sidewalls 738B inwardly toward a center of the cavity 730B. The retaining structures 735 are sized and positioned relative to the sidewalls 738B and cavity bottom 736B to retain the connector 68B therein, with the web 722B extending out of the cavity opening 732B, as illustrated in FIG. 42.

The bottom 784 of the booster seat 718 further defines a recessed storage area 740 configured to receive and retain therein an instruction manual. A number of retaining flanges or tabs 741; e.g., four, extend over the recessed storage area 740 about its periphery. The retaining flanges or tabs 741 are sized and configured to retain an instruction manual within the recessed storage area 740, while also allowing for easy removal and replacement of the manual from and into the storage area 740.

Two anti-skid members 742 and 744 are affixed to the bottom 784 of the booster seat 718. The anti-skid members 742 and 744 are formed of one or more conventional anti-skid materials, and may be attached to the bottom 784 of the booster seat 718 to inhibit movement of the booster seat 718 relative to the vehicle seat 11.

The bottom 784 of the booster seat 718 also has a number of cover engagement members 746 affixed thereto adjacent to the front 98 and to the back 100 of the booster seat 718. The engagement members 746 are, in one illustrative embodiment, fabric pieces configured to interlockingly engage fabric forming at least part of a seat cover of the type that will be described and illustrated hereinafter with respect to FIGS. 43 and 44. Alternatively, the engagement members 746 may be formed of other conventional engagement structures configured to engage a fabric seat cover or seat cover formed of one or more other materials.

Figure 43:
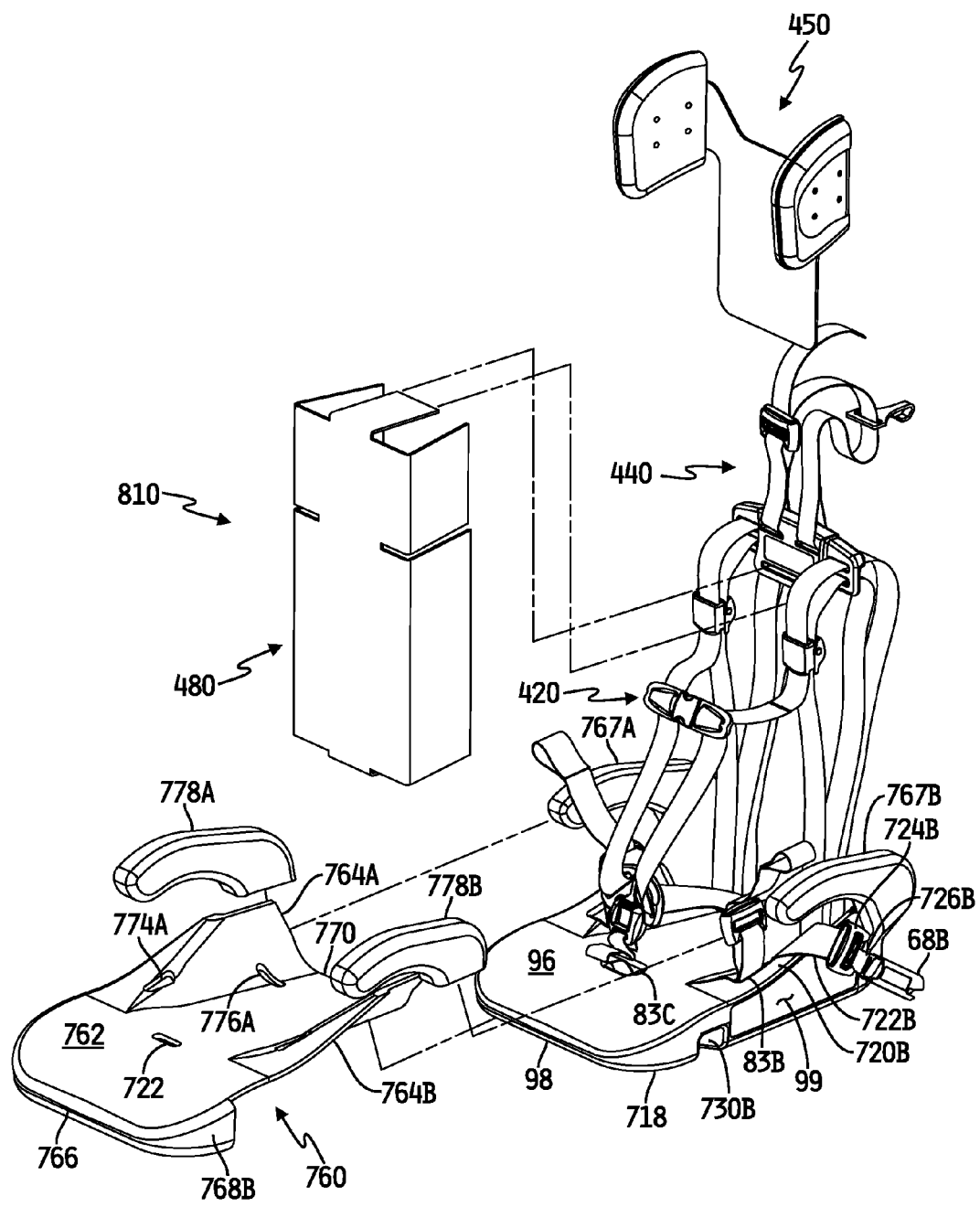
FIG. 43 is a front perspective assembly view of yet another embodiment of the portable restraint system using the booster seat illustrated in FIGS. 36-42.
Figure 44:
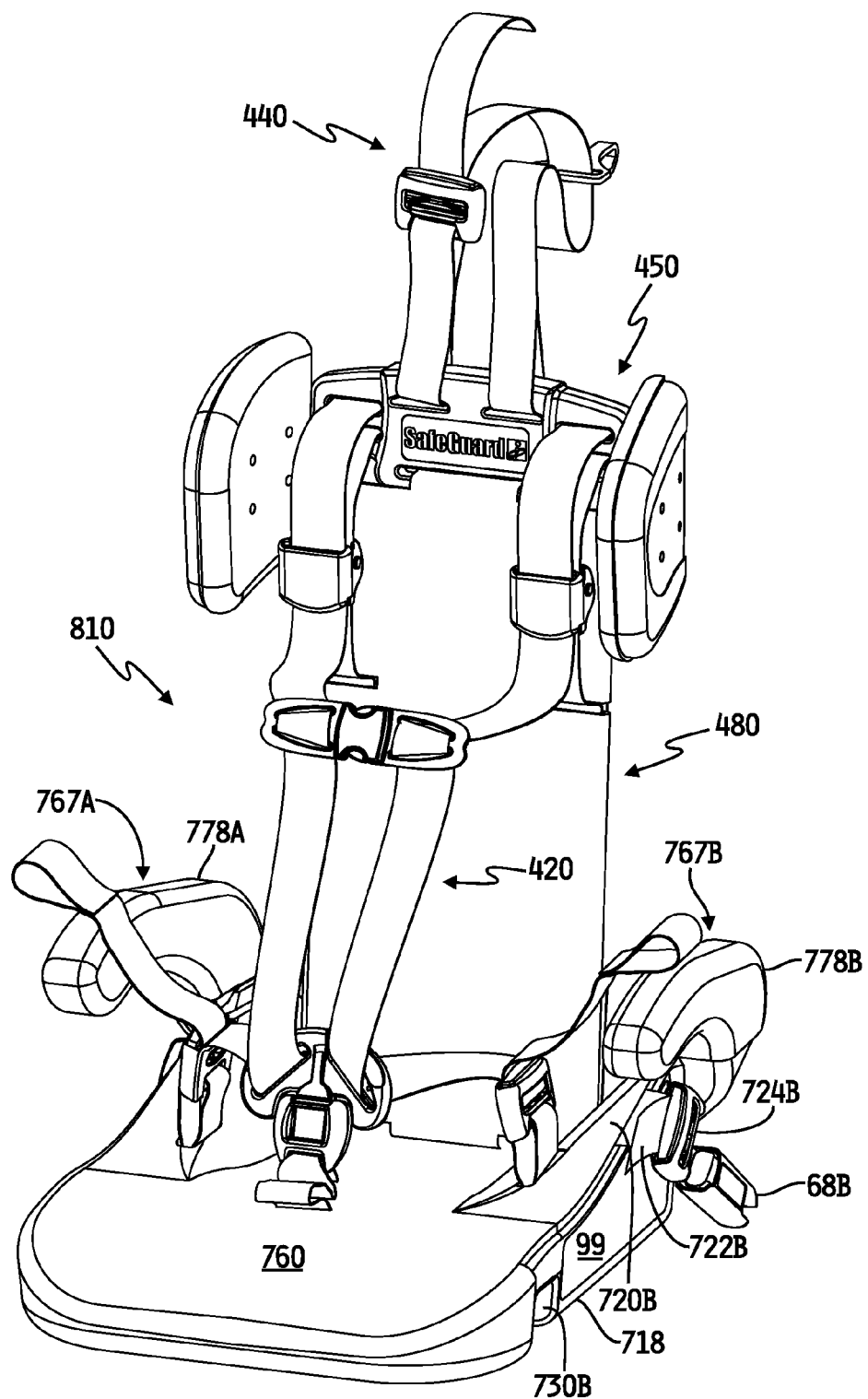
FIG. 44 is a front perspective assembled view of the embodiment illustrated in FIG. 43.

Referring now to FIGS. 43 and 44, assembly and assembled views respectively of another illustrative embodiment of a restraint system 810 is shown. The restraint system 810 is portable and is configured to be mounted to a vehicle seat as described hereinabove. In the illustrated embodiment, the booster seat is shown in the form of the booster seat 718 illustrated and described hereinabove with respect to FIGS. 36-42. In this regard, the restraint system 810 includes the booster seat mounting system 68 and 722-726, and the booster seat 718 of the restraint system 810 is accordingly mountable to a vehicle seat via the booster seat mounting system 68 and 722-726 as illustrated and described with respect to FIGS. 36-42. The restraint system 810 illustrated in FIGS. 43 and 44 is otherwise identical in many respects to the restraint system 610 illustrated and described hereinabove with respect to FIGS. 23 and 24, and like numbers are accordingly used in FIGS. 43 and 44 to identify components that are common with corresponding components of the restraint system 610.

In the embodiment illustrated in FIGS. 43 and 44, the restraint system 810 includes a multiple-point restraint harness 420 mounted to the booster seat 718. The multiple-point restraint harness 420 is, in the illustrated embodiment, a five-point restraint harness identical to that described with respect to FIGS. 23 and 24, although it will be understood that the restraint harness 420 may alternatively include more or fewer points of attachment to the booster seat 718. The illustrated restraint system 810 also includes a mounting harness 440 coupled to the restraint harness 420 through a web interface member 430, all identical to like components illustrated and described with respect to FIGS. 23 and 24.

Like the portable restraint system 610, the portable restraint system 810 may further include a number of optional components. An example of one such optional component is a cover 480 configured to be wrapped around some of the webs of the restraint harness 420 as illustrated and described hereinabove with respect to FIGS. 23 and 24. An example of another optional component that may be included with the portable restraint system 810 is a head rest 450 configured to be received within and maintained in position by the cover 480, as illustrated and described hereinabove with respect to FIGS. 23 and 24.

An example of yet another optional component that may be included with the portable restraint system 810 is a seat cover 760 configured and sized to fit over the booster seat 718. The seat cover 760 defines a body portion 762 extending in a lateral direction between a pair of opposing side walls 764A and 764B and in a longitudinal direction between a front end 766 and a back end 770. The front end 766 extends in either lateral direction to partial side covers 768A and 768B (only 768B shown). The seat cover 760 is received on the booster seat 718 with the body portion 762 covering the seat top 96, the side wall 764A covering the sidewall 720A of the booster seat 718, the side wall 764B covering the sidewall 720B of the booster seat 718, and with the partial side covers 768A and 768B extending from the front 98 of the booster seat 718 at least partially around the opposing sides 99 thereof. The front end 766 and back end 770 of the cover 760 are configured to wrap around the booster seat 718 and engage the cover engagement members 746 affixed to the bottom 784 of the booster seat 718.

With the seat cover 760 in place on the booster seat 718 as just described, a passage 772 defined through the seat cover 760 aligns with the recess 83C in the seat 718, a passage 774A defined through the seat cover 760 aligns with the recess 83A in the seat 718, a passage 774B (not shown) defined through the seat cover 760 aligns with the recess 83B in the seat 718, a passage 776A defined through the seat cover 760 aligns with recess 87A defined in the seat 718, and a passage 776B (not shown) defined through the seat cover 760 aligns with the recess 87B defined in the seat 718. The various webs forming the restraint harness 420 extend through the passages 772, 774A, 774B, 776A and 776B similarly as described in relation to the cover 460 illustrated in FIGS. 23 and 24. An example of still other optional components that may be included with the portable restraint system 810 includes arm rest covers 778A and 778B each configured to slide over, and be retained on, the respective arm rests 767A and 7678.

Figure 45:
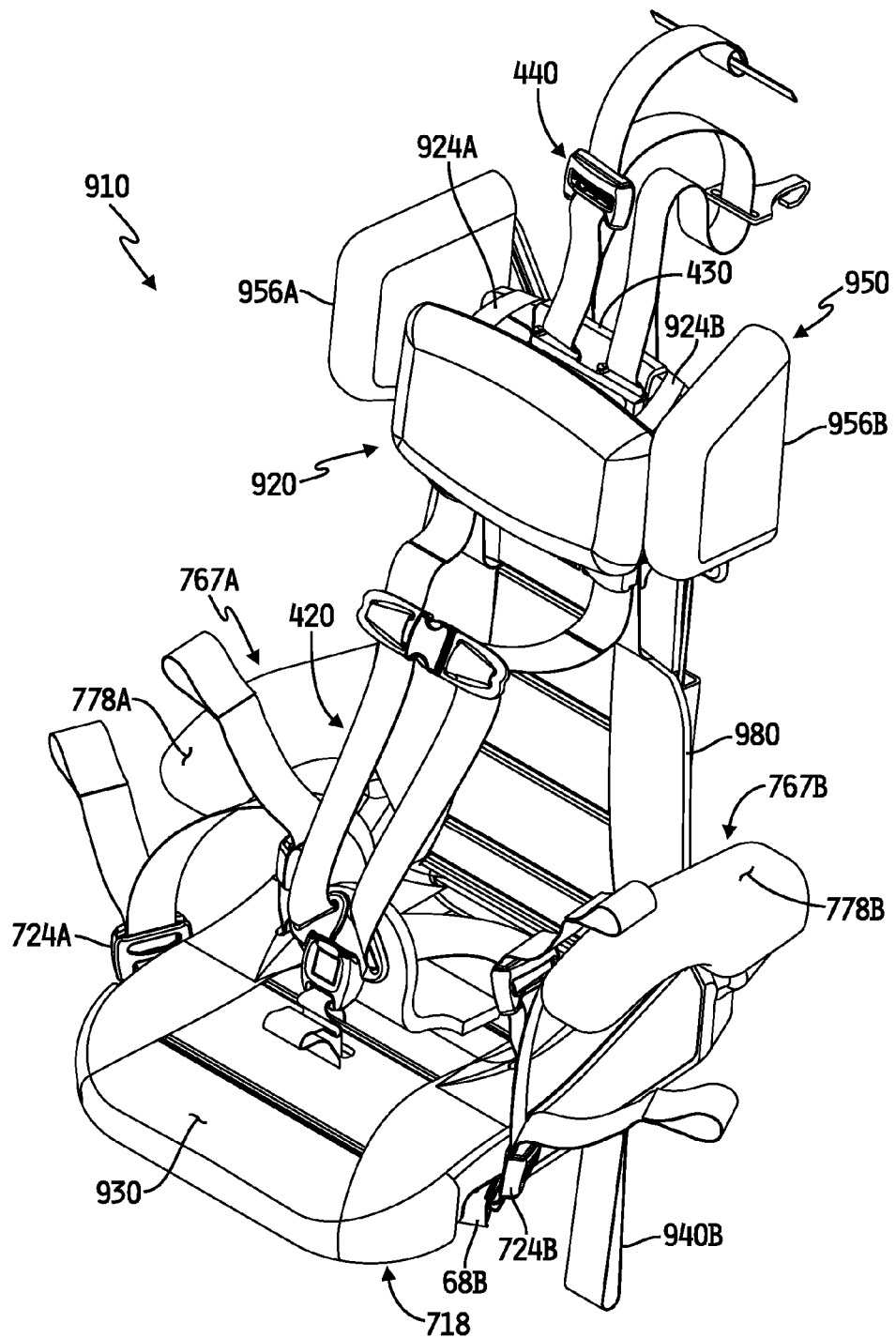
FIG. 45 is a front perspective view of yet a further embodiment of the portable restraint system using the booster seat illustrated in FIGS. 36-42.

Referring now to FIG. 45, a front perspective view of yet another illustrative embodiment of a restraint system 910 is shown. The restraint system 910 is identical in many respects to the restraint system 810 illustrated and described herein, and like numbers are therefore used to identify like components. For example, in the embodiment illustrated in FIG. 45, the booster seat is shown in the form of the booster seat 718 illustrated and described hereinabove with respect to FIGS. 36-42, and the restraint harness 420, the web interface member 430 and the mounting harness 440 are all as illustrated and described herein. The restraint system 910 further includes a seat bottom cover 930 that is sized and configured to cover the top surface of the booster seat 718 as shown in FIG. 45. One or more cushions (not shown) may be positioned between the top surface of the booster seat and the seat bottom cover 930. The restraint system further includes a cover 980 that may be used instead of the cover 480 illustrated and described hereinabove. The cover 980 may be designed for aesthetic appeal as shown in FIG. 45, and may also mount differently to the restraint harness 420 as will be described in greater detail hereinafter with respect to FIG. 48.

The restraint system 910 further includes a headrest member 950 that may be coupled to the restraint system 910 in a different manner than that described with respect to the head rest 450 that is illustrated and described herein. Additionally, a cushion 920 may be provided that can be coupled to the restraint system 910 so that it is positioned adjacent to the headrest 950 between the protrusions 956A and 956B.

Figure 46:
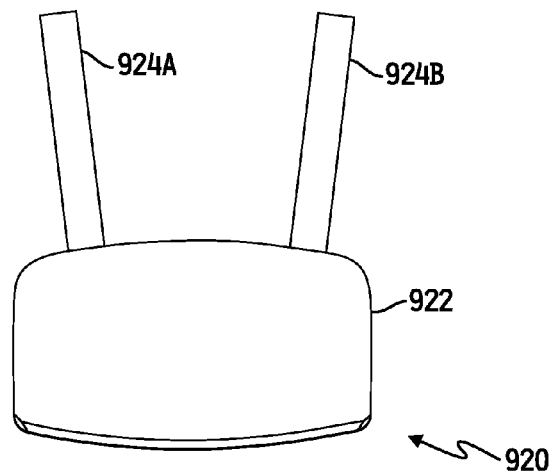
FIG. 46 is a front elevational view of the cushion illustrated in FIG. 45.

Referring now to FIG. 46, a front elevational view of the cushion 920 is shown. The cushion 920 includes a cushion body 922 that may be formed of one or more conventional cushion materials with a pair of mounting straps 924A and 924B attached thereto. The mounting straps 924A and 924B are configured to engage each other, and the cushion 920 is coupled to the restraint system 910 by extending placing the cushion member 922 adjacent to the headrest 950 and between the protrusions 956A and 956B, extending the mounting straps over the web interface member 430 on either side of the mounting harness 440, and then engaging the straps 924A and 924B near their terminal ends (see also FIG. 48). Illustratively, the mounting straps 924A and 924B may be formed of, or equipped with, conventional interlocking fabric. Alternatively, one or more other conventional attachment mechanisms may be provided to releasably attach the two terminal ends of the mounting straps 924A and 924B together.

Figure 47A:
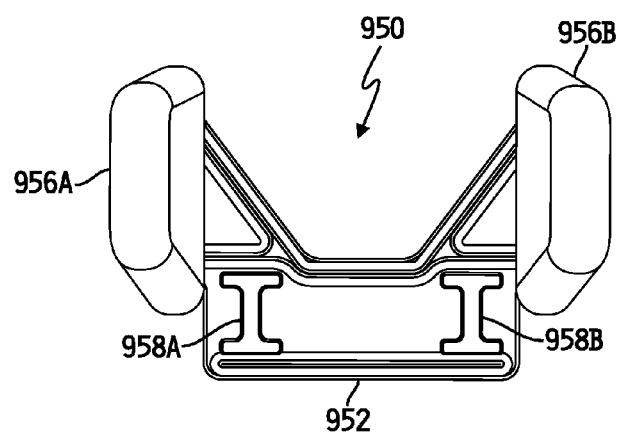
FIG. 47A is a front elevational view of the headrest member illustrated in FIG. 45.
Figure 47B:
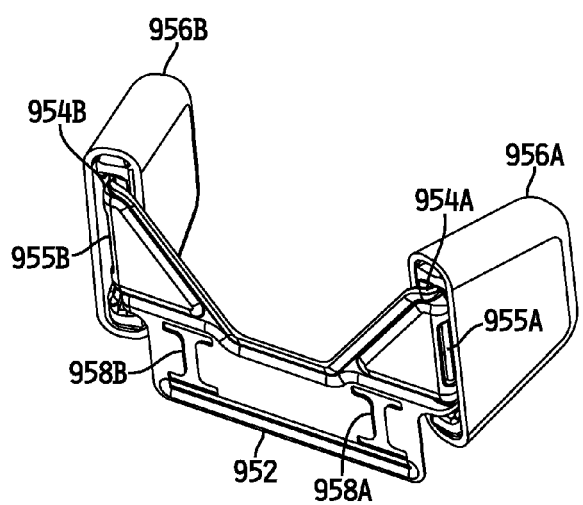
FIG. 47B is a rear perspective view of the headrest member illustrated in FIG. 45.

Referring now to FIGS. 47A and 47B, front elevational and rear perspective views of the headrest 950 of FIG. 45 is shown. The headrest 950 includes a body or plate 952 that is generally V-shaped as illustrated in FIGS. 47A and 47B. A protrusion 954A extends forwardly from one side of the plate 952, and another protrusion 954B extends forwardly from an opposite side of the plate 952. The protrusions 954A and 954B are movably attached to the body or plate 952 via hinge members 955A and 955B respectively so that the protrusions 954A and 954B are each independently movable or pivotable inwardly toward each other and outwardly away from each other. Cushion members 956A and 956B are sized to fit over the protrusions 954A and 954B respectively. Illustratively, the plate 952 and the protrusions 954A and 954B may be formed of a conventional plastic material, although the present disclosure contemplates that the plate 952 and protrusions 954A and 954B may be formed of any suitable material that is at least somewhat flexible. The protrusions 954A and 954B are positioned relative to the plate 952 to accommodate an occupant's head therebetween, and are configured to be adjustably positionable toward and away from each other so that they may be adjusted toward and away from the occupant's head. The plate 952 defines a pair of slots 958A and 958B therethrough that are configured to receive and retain corresponding portions of the restraint harness 420. Illustratively, the slots 958A and 958B are "I"-shaped so that the headrest 950 may be mounted to and removed from the portions of the restraint harness 420 without disassembling the restraint harness 420 or detaching the restraint harness 420 from the restraint system 910.

Figure 48:
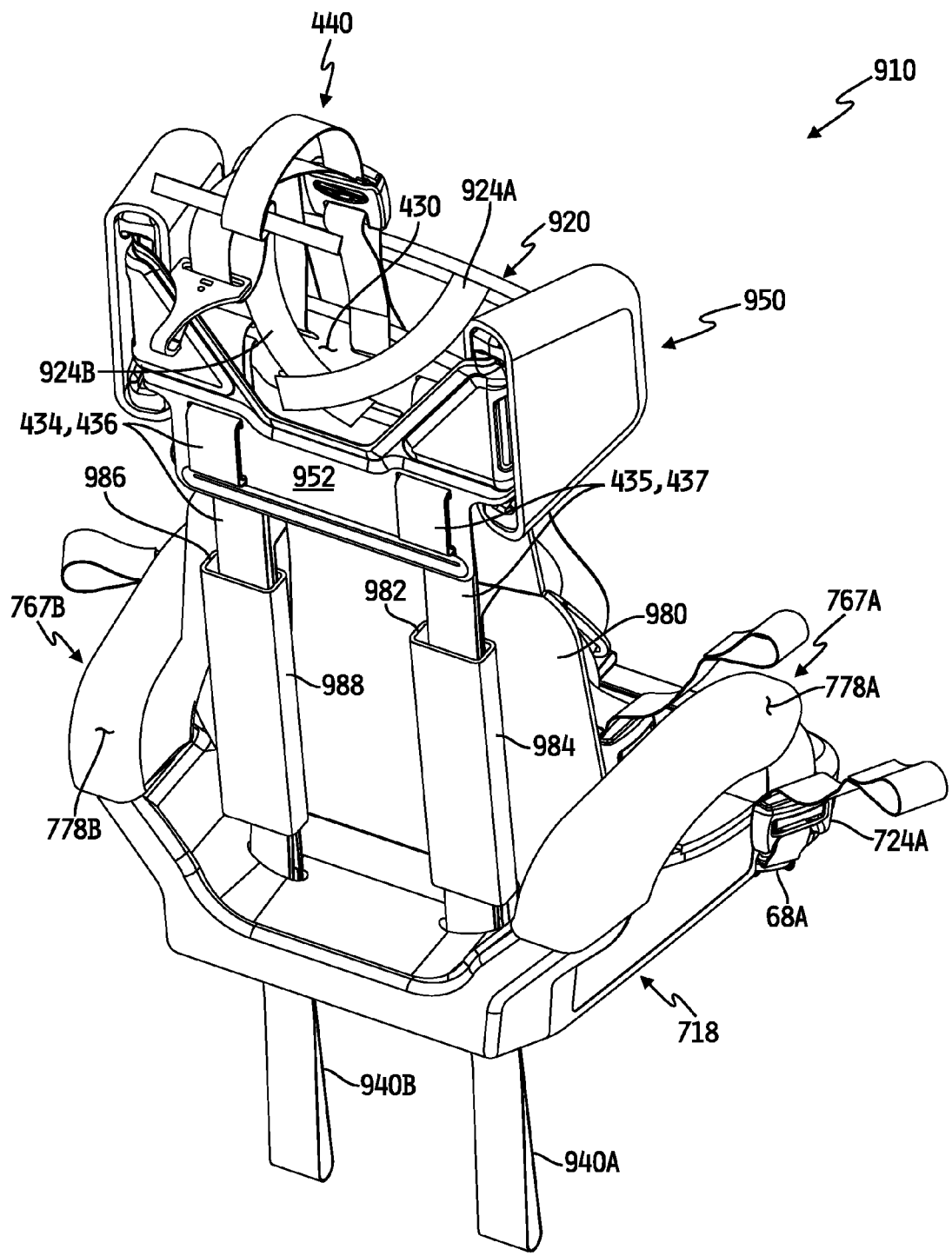
FIG. 48 is a rear perspective view of the portable restraint system of FIG. 45.

Referring now to FIG. 48, a rear perspective view of the restraint system 910 of FIG. 45 is shown. In this view, the headrest 950 is shown mounted to the restraint harness 420 with the restraint harness webs 435 and 437 (see, for example, FIG. 24) received and retained within the slot 958A, and with the restraint harness webs 434 and 436 received and retained within the slot 958B. Additionally, the cover 980 is shown as having a first set of mounting wings 982 and 984 being wrapped around the restraint harness webs 435 and 437, and a second set of mounting wings 986 and 988 being wrapped around the restraint harness webs 434 and 436. The pairs of mounting wings 982,984 and 986, 988 are illustratively formed of, or equipped with, conventional interlocking fabric. Alternatively, one or more other conventional attachment mechanisms may be provided to allow the first set of mounting wings 982, 984 to be attached or affixed to each other and to allow the second set of mounting wings 986, 988 to also be attached or affixed to each other.

Also shown in FIG. 48 are a pair of webs 940A and 940B extending downwardly from the bottom of the booster seat 718. The webs 940A and 940B each have one end attached to the booster seat in a conventional manner, and an opposite end defining a web loop. The webs 940A and 940B may be used in cooperation with an existing restraint harness that is mounted to the vehicle seat, e.g., an existing, conventional two or three-point vehicle seat restraint harness, to secure the booster seat 718 to the vehicle seat in cases where the connectors 68A and/or 68B are not or cannot be used to secure the booster seat 718 to the vehicle seat. In the illustrated embodiment, for example, the combination web and engagement member, e.g., conventional tongue or buckle, of the vehicle seat restraint harness may be passed through the loops defined at the ends of the webs 940A and 940B, and the engagement member may then engage a complementary engagement member, e.g., conventional buckle or tongue, mounted to the vehicle seat to secure the booster seat 718 to the vehicle seat. It will be appreciated that the loops defined at the ends of the webs 940A and 940B may be replaced with one or more other conventional engagement mechanisms to thereby allow the vehicle seat restraint harness to engage the webs 940A and 940B to thereby secure the booster seat 718 to the vehicle seat. It will be further appreciated that more or fewer webs may be attached to the booster seat 718 to allow the booster seat 718 to be secured to the vehicle seat as just described.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. In the various illustrative embodiments shown and described, the portable restraint system with the restraint harness included is intended to be used by infants and children up to about 65 pounds. The portable restraint system without the restraint harness included, and wherein instead the existing restraint harness of the vehicle seat is used, is intended to be used by children between about 30 and about 100 pounds.

What is claimed is:

1. A portable restraint system mountable to a vehicle seat having a bottom seat portion and an upwardly extending seat back portion, comprising:

a child seat restable atop the bottom seat portion of the vehicle seat, a strap assembly a portion of which extends upwardly from said child seat, said strap assembly includes restraint straps forming a multiple-point restraint harness with said restraint straps positionable adjacent a child to be restrained atop said child seat and further having a mounting assembly extendable adjacent the seat back portion of the vehicle seat to be secured to hold said child seat to the vehicle seat, said strap assembly includes length adjusters for said restraint straps to effectively lengthen or shorten said restraint straps relative to the size of the child, said strap assembly further having a crotch connector mounted to said child seat with said strap assembly further having a pair of connectors mounted to said restraint straps that are releasably engageable with said crotch connector to secure said restraint straps to a crotch strap, a child seat back having an erect in-use position relative to said child seat and a folded storage position atop said child seat, said child seat back extending upwardly from said child seat and concealing at least a portion of said mounting assembly, said restraint straps extending upwardly from said child seat adjacent said child seat back to an in-use position and connected to said mounting assembly, and a carrying bag configured to receive the child seat, said strap assembly and said child seat back therein, the carrying bag having at least one carrying strap attached thereto.

2. The portable restraint system of claim 1 wherein said child seat back includes a channel that extends at least partially around at least a portion of said mounting assembly.

3. The portable restraint system of claim 1 further comprising:

a head rest having one end configured to be slidably received within said child seat back and an opposite end defining first and second head rest protrusions each extending from opposite sides of the head rest, said carrying bag is configured to receive said head rest therein.

4. The portable restraint system of claim 3 wherein said head rest is slidably mounted to the multiple-point restraint harness and to the mounting assembly, said head rest defining first and second head rest protrusions each extending from opposite sides of said head rest.

5. The portable restraint system of claim 4 wherein said carrying bag is configured to receive said child seat, said multiple-point restraint harness, said child seat back, said mounting assembly and said head rest and is sized to be stowed under a passenger seat of a commercial air craft.

6. The portable restraint system of claim 4 wherein said carrying bag further comprises means for securely closing said carrying bag with the combination of said child seat, said multiple-point restraint harness, said child seat back, said mounting harness and said head rest received therein.

7. The portable restraint system of claim 1 wherein said child seat has first and second arm rests that extend outside of said carrying bag when the child seat is received within the carrying bag.

8. The portable restraint system of claim 1 wherein said child seat has first and second arm rests that are received within said carrying bag when said child seat is received within said carrying bag.

9. A portable restraint system mountable to a vehicle seat with a vehicle seat bottom and a vehicle seat back with a vehicle seat back rear surface thereof, comprising:

a child seat having a child seat bottom restable on a vehicle seat and further having a child seat back with a front surface and a rear surface, a restraint harness mounted to the child seat, the restraint harness configured to restrain a passenger positioned on the child seat, said restraint harness having a crotch connector on said child seat bottom and a chest strap extendable upwardly from said child seat bottom and in front of said front surface of said child seat back, said chest strap having a chest strap connector releasable lockable to said crotch connector, and a mounting harness having a mounting strap positioned in back of said rear surface of said child seatback and being at least partially concealed thereby with said mounting strap coupled to the restraint harness, said mounting harness having a height adjuster engaged with said chest strap and said mounting strap to position said chest strap relative to child height, said chest strap having a length adjuster to control the length of said chest strap extending from said child seat bottom to said height adjuster, and said mounting harness further having a mounting connector attached thereto configured to releasably engage an anchorage of the vehicle.

10. The restraint system of claim 9 further comprising a carrying bag sized to receive the child seat including child seat back which is foldable against said child seat bottom, restraint harness and mounting harness therein.

11. The restraint system of claim 9 further comprising a web interface member configured to be slidably coupled to the restraint harness and slidable on said mounting strap.

12. A safety restraint system for mounting a child to a vehicle seat which has a vehicle back portion and a vehicle seat portion comprising:

a child seat restable atop a vehicle seat, said child seat providing a base positionable atop a vehicle seat portion of a vehicle seat, said base supporting a child thereatop;

a mounting assembly having a mounting strap, said mounting assembly connected to said child seat and having a portion extendable on a vehicle back portion of the vehicle seat to secure said child seat to the vehicle seat;

a restraint assembly connected to said child seat to secure a child thereto, said restraint assembly having a restraint strap with a top end and a bottom portion, said restraint assembly further having a crotch connector mounted to said base, said restraint strap having a strap connector between said top end and said bottom portion that is releasably lockable with said crotch connector to secure the child to said child seat, and wherein said bottom portion is connected to said child seat and said top end is coupled to said mounting strap; and, a child seat back extending upwardly from said child seat and at least partially concealing said mounting strap;

said child seat back, said restraint assembly and said mounting assembly extendable upwardly from said base to an in-use position but are foldable enabling collapsing of said restraint assembly and said mounting assembly adjacent said child seat when in a stored condition.

13. A portable restraint system mountable to a vehicle having a vehicle seat to secure a passenger thereto and further having anchorages comprising:

a child seat with a child seat connector attachable to an anchorage of a vehicle;

a restraint harness for securing a passenger on said child seat and having a pair of upwardly extending straps each with opposite ends mounted to said child seat and further having strap connectors positioned on said straps between said opposite ends;

a crotch connector mounted to said child seat to releasably receive said strap connectors;

a frame receiving said straps to hold said straps upwardly;

a mounting harness attached to said frame and attachable to an anchorage of the vehicle to secure said frame to the vehicle while holding said frame in an elevated position to hold said straps upwardly; and, a belt assembly having a pair of belts with opposite ends secured to said child seat, said pair of belts each extend from said child seat through said frame adjacent said pair of straps; wherein:

said restraint harness, said mounting harness, and said belt assembly are flexible allowing collapsing thereof adjacent said child seat with said frame to allow said child seat, restraint harness, crotch connector, frame, mounting harness and belt assembly to be stored in a collapsed condition.

14. The portable restraint system of claim 13 and further comprising:
   a carrying bag into which said child seat, restraint harness, crotch connector, frame, mounting harness, and belt assembly may be stored and carried in said collapsed condition; and, a child seat back having an erect in-use position relative to said child seat and a folded storage position atop said child seat, said child seat back extending upwardly from said child seat and concealing at least a portion of said belt assembly.

15. The portable restraint system of claim 14 and further comprising:
   a headrest assembly slidably mounted to said child seat back being positionable in a position adjacent the passenger's head.

16. The portable restraint system of claim 15 wherein:
   each of said pair of straps form a loop with a top end portion located adjacent said frame and said opposite ends connected to said child seat; and further comprising:
   a pair of clamps through which said pair of straps and said pair of belts slidably and releasably extend to releasably hold said pair of straps against said pair of belts adjustably adjacent the passenger and to control the length of said pair of straps from said child seat to said clamps.

17. The portable restraint system of claim 16 wherein:
   said child seat back includes a pair of channels through which said belt assembly extends.

* * * * *